United States Patent
Kubo et al.

(10) Patent No.: US 8,546,808 B2
(45) Date of Patent: Oct. 1, 2013

(54) LIQUID CRYSTAL DISPLAY DEVICE

(75) Inventors: Masumi Kubo, Nara (JP); Akihiro Yamamoto, Nara (JP); Takashi Ochi, Nara (JP); Tetsuhiro Yamaguchi, Mie (JP); Naoshi Yamada, Mie (JP); Katsuhiko Morishita, Mie (JP); Kiyoshi Ogishima, Mie (JP); Kazuhiro Maekawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 230 days.

(21) Appl. No.: 13/137,951

(22) Filed: Sep. 22, 2011

(65) Prior Publication Data

US 2012/0075541 A1 Mar. 29, 2012

Related U.S. Application Data

(60) Continuation of application No. 12/656,129, filed on Jan. 19, 2010, now Pat. No. 8,053,775, which is a continuation of application No. 11/507,516, filed on Aug. 22, 2006, now Pat. No. 7,755,087, which is a continuation of application No. 10/839,333, filed on May 6, 2004, now Pat. No. 7,145,624, which is a division of application No. 09/923,344, filed on Aug. 8, 2001, now Pat. No. 7,215,395.

(30) Foreign Application Priority Data

Aug. 11, 2000 (JP) .................................. 2000-244648
Apr. 27, 2001 (JP) .................................. 2001-131142
May 24, 2001 (JP) .................................. 2001-155928
Jul. 19, 2001 (JP) .................................. 2001-219632

(51) Int. Cl.
*H01L 29/04* (2006.01)

(52) U.S. Cl.
USPC .................. 257/59; 257/79; 349/144; 349/33

(58) Field of Classification Search
USPC ................................ 257/59, 79; 349/144, 33
See application file for complete search history.

(56) References Cited

U.S. PATENT DOCUMENTS

| 4,955,698 A | 9/1990 | Knoll et al. |
| 5,179,456 A | 1/1993 | Aizawa et al. |

(Continued)

FOREIGN PATENT DOCUMENTS

| JP | 03-209440 | 9/1991 |
| JP | 04-139402 | 5/1992 |

(Continued)

OTHER PUBLICATIONS

U.S. Appl. No. 12/656,129, filed Jan. 19, 2010; Kubo et al.

(Continued)

*Primary Examiner* — Long Pham
(74) *Attorney, Agent, or Firm* — Nixon & Vanderhye P.C.

(57) ABSTRACT

The liquid crystal display device of this invention includes picture element regions each defined by a first electrode provided on a first substrate and a second electrode provided on a second substrate so as to oppose the first electrode via a liquid crystal layer sandwiched therebetween. In each of the picture element regions, the first electrode includes a solid portion and a nonsolid portion. The liquid crystal display device further includes a pair of polarizing plates disposed with polarization axes thereof crossing each other substantially perpendicularly. The polarization axis of one of the pair of polarizing plates is substantially parallel to a direction in which the solid portion extends. When a voltage is applied between the first electrode and the second electrode, in each of the picture element regions, liquid crystal molecules of the liquid crystal layer are in a radially-inclined orientation state.

7 Claims, 45 Drawing Sheets

(56) References Cited

U.S. PATENT DOCUMENTS

| | | |
|---|---|---|
| 5,309,264 A | 5/1994 | Lien et al. |
| 5,363,294 A | 11/1994 | Yamamoto et al. |
| 5,558,927 A | 9/1996 | Aruga et al. |
| 5,627,665 A | 5/1997 | Yamada et al. |
| 5,636,043 A | 6/1997 | Uemura et al. |
| 5,673,092 A | 9/1997 | Horie et al. |
| 5,995,176 A | 11/1999 | Sibahara |
| 6,061,117 A | 5/2000 | Horie et al. |
| 6,097,464 A | 8/2000 | Liu |
| 6,175,398 B1 | 1/2001 | Yamada et al. |
| 6,222,599 B1 | 4/2001 | Yoshida et al. |
| 6,266,122 B1 | 7/2001 | Kishimoto et al. |
| 6,384,887 B1 | 5/2002 | Yasuda et al. |
| 6,384,889 B1 | 5/2002 | Miyachi et al. |
| 6,504,592 B1 | 1/2003 | Takatori et al. |
| 6,512,564 B1 | 1/2003 | Yoshida et al. |
| 6,542,212 B2 | 4/2003 | Yoshida et al. |
| 6,573,965 B1 | 6/2003 | Liu et al. |
| 6,657,695 B1 | 12/2003 | Song et al. |
| 6,822,723 B2 | 11/2004 | Song et al. |
| 6,950,160 B2 | 9/2005 | Kubo et al. |
| 6,965,422 B2 | 11/2005 | Kubo et al. |
| 7,145,624 B2 | 12/2006 | Kubo et al. |
| 7,215,395 B2 | 5/2007 | Kubo et al. |
| 7,755,087 B2 | 7/2010 | Kubo et al. |
| 2002/0036744 A1 | 3/2002 | Kubo et al. |

FOREIGN PATENT DOCUMENTS

| | | |
|---|---|---|
| JP | 04-293018 | 10/1992 |
| JP | 04-318816 | 11/1992 |
| JP | 06-043461 | 2/1994 |
| JP | 7-281176 | 2/1994 |
| JP | 6-301036 | 10/1994 |
| JP | 07-234400 | 9/1995 |
| JP | 08-292423 | 11/1996 |
| JP | 09-258266 | 10/1997 |
| JP | 10-186330 | 7/1998 |
| JP | 2000-47217 | 2/2000 |
| KR | 1999-0048949 | 7/1999 |

OTHER PUBLICATIONS

Jignesh Gandhi et al., "Performance Enhancement of reflective CMOS Twistes Nematic Disp Projection Applications Using Compensating Films", pp. 1-6, reprinted from http://www.hanoah.com/publications/sid99 paper Jignesh final pdf. (1999).

Korean Office Action mailed Jan. 30, 2004 (w/translation).

Thomson—CSFILR—Jan. 2000, Optical compensation for displays (2pgs).

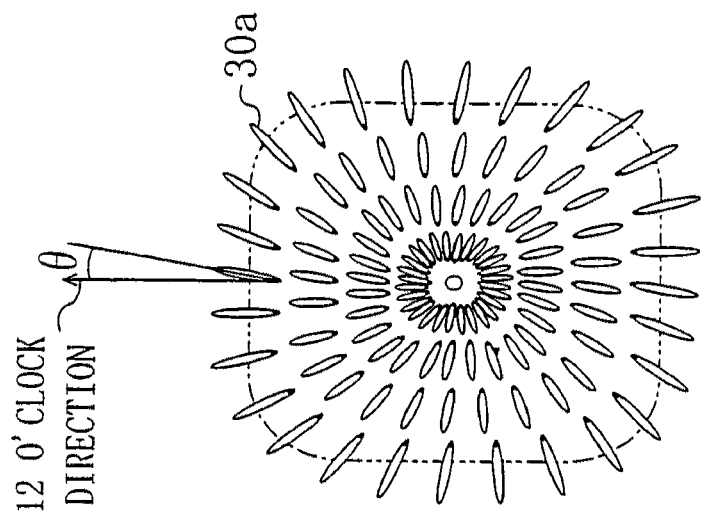
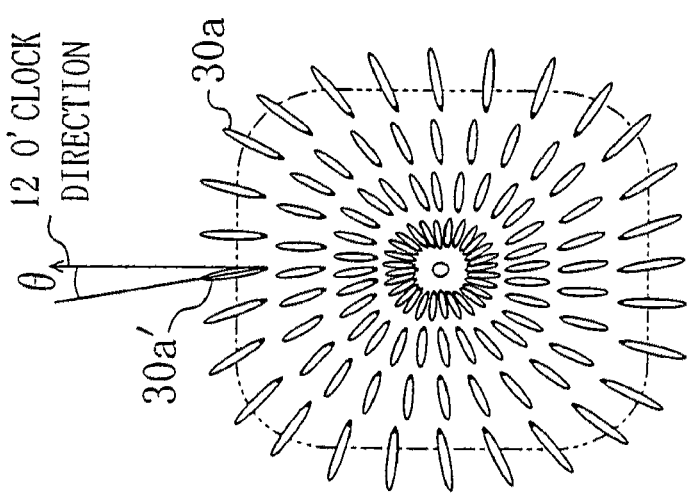
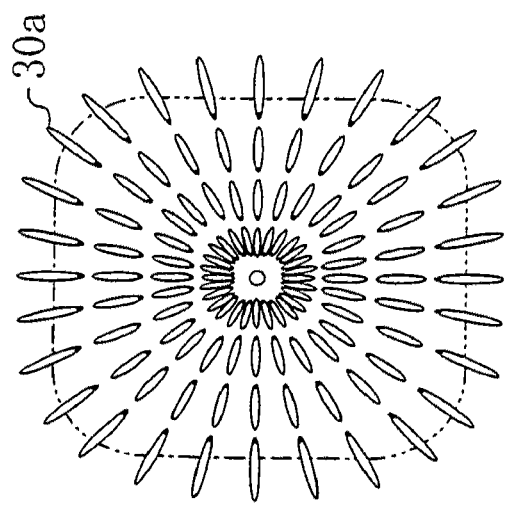

FIG. 23
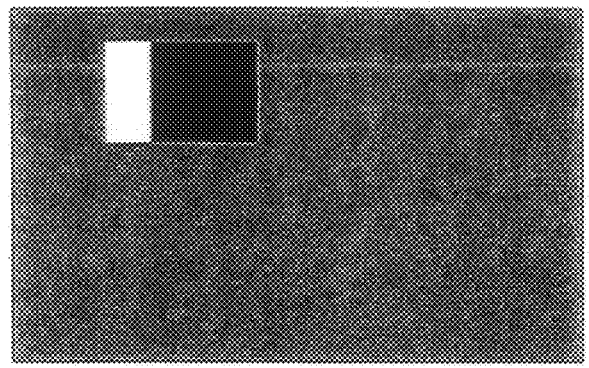
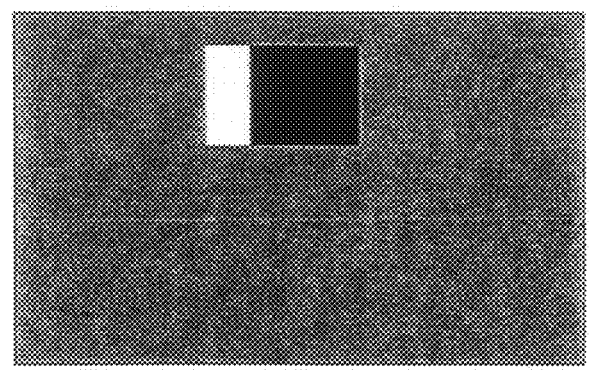
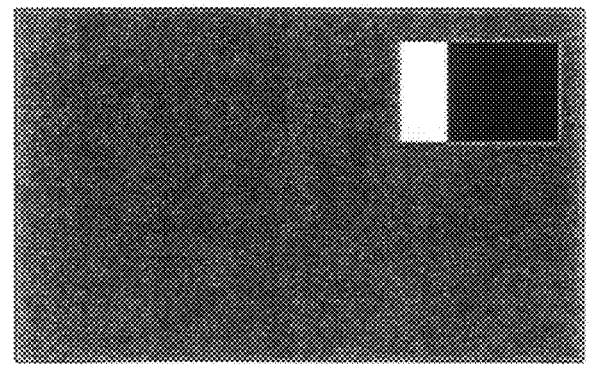

FIG. 28A
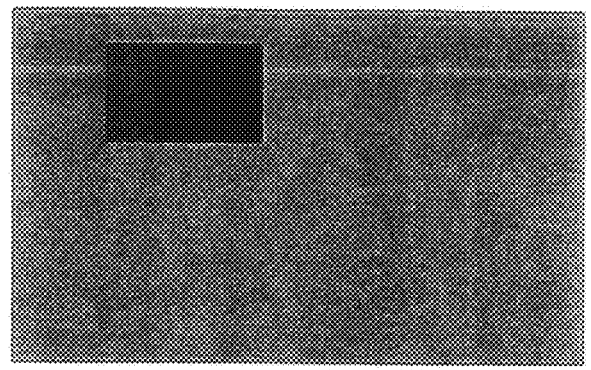
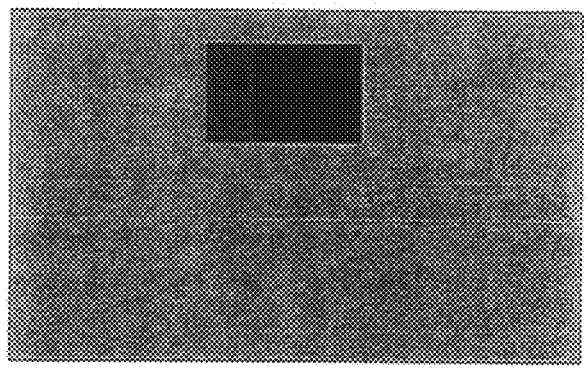
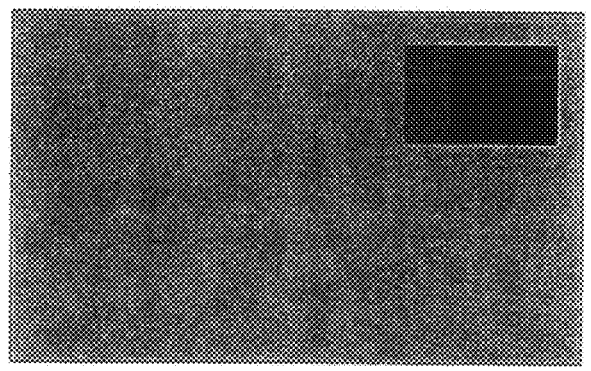

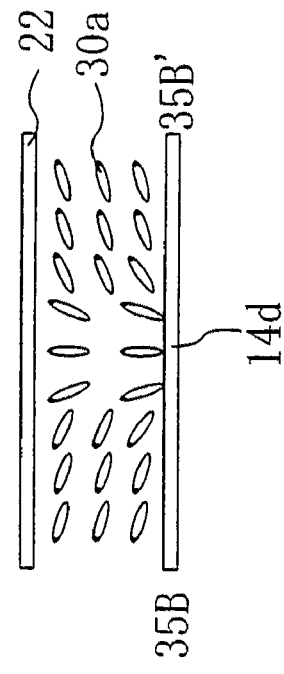
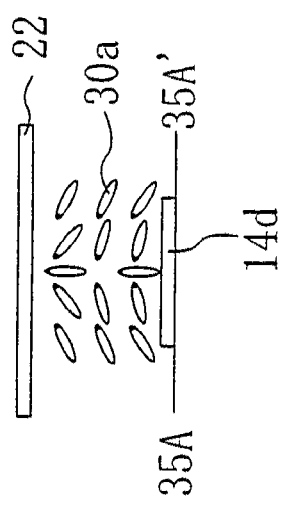

LIQUID CRYSTAL DISPLAY DEVICE

This application is a Continuation of Ser. No. 12/656,129, filed Jan. 19, 2010, now U.S. Pat. No. 8,053,775 which is a Continuation of Ser. No. 11/507,516, filed Aug. 22, 2006 (now U.S. Pat. No. 7,755,087), which is a Continuation of Ser. No. 10/839,333, filed May 6, 2004, (now U.S. Pat. No. 7,145,624), which is a divisional of application Ser. No. 09/923,344 filed Aug. 8, 2001, (now U.S. Pat. No. 7,215,395) the entire contents of which are hereby incorporated herein by reference in this application.

BACKGROUND OF THE INVENTION

The present invention relates to a liquid crystal display device, and more particularly, it relates to a liquid crystal display device having a wide viewing angle characteristic capable of producing a high quality display.

Recently, a thin and light liquid crystal display device is used as a display device for a display of a personal computer and a display unit of portable information terminal equipment. Conventional twist nematic (TN) or super twist nematic (STN) liquid crystal display devices have, however, a disadvantage of a narrow viewing angle, and various techniques have been developed for overcoming this disadvantage.

A typical technique to improve the viewing angle characteristic of a TN or STN liquid crystal display device is a method of additionally providing an optical compensator. Another technique is a lateral field method of applying, through a liquid crystal layer, an electric field in a direction horizontal to the substrate surface. Liquid crystal display devices of the lateral field method are recently mass-produced and regarded as promising devices. A still another technique is DAP (deformation of vertical aligned phase) in which a nematic liquid crystal material with negative dielectric anisotropy is used as a liquid crystal material and a vertical alignment film is used as an alignment film. The DAP is a kind of an ECB (electrically controlled birefringence) method, and the transmittance is controlled by utilizing the birefringent property of the liquid crystal molecules.

Although the lateral field method is one of effective methods for increasing the viewing angle, the production margin is very small in the production process as compared with that of a general TN liquid crystal display device, and hence, there is a difficulty in stable production of this type of liquid crystal display devices. This is because gap irregularity between substrates and shift of the transmission axis of a polarizing plate (polarization axis) from the orientation axis of a liquid crystal molecule largely affect the luminance and the contrast ratio of display. In order to stably produce the liquid crystal display devices of the lateral field method by highly precisely controlling these factors, the technique should be further highly developed.

In order to produce an even display free from display unevenness by a liquid crystal display device of the DAP method, it is necessary to control orientation. For controlling the orientation, an alignment treatment is carried out by rubbing the surface of an alignment film. When the surface of a vertical alignment film is subjected to a rubbing treatment, however, rubbing streaks are easily caused in a displayed image. Therefore, this treatment is not suitable to mass-production.

On the other hand, for controlling the orientation without the rubbing treatment, a method for controlling the orientation direction of liquid crystal molecules by an inclined electric field generated by forming a slit (opening) in an electrode has been proposed (as described in, for example, Japanese Laid-Open Patent Publication Nos. 6-301036 and 2000-47217). However, the present inventors have found the following as a result of examination: The orientation state of a region of a liquid crystal layer corresponding to the opening of the electrode is not specified in the methods disclosed in these publications, and the continuity of the orientation of the liquid crystal molecules is not sufficient. Therefore, it is difficult to obtain a stable orientation state over an entire picture element, and hence, a displayed image becomes disadvantageously uneven.

SUMMARY OF THE INVENTION

The present invention was devised to overcome the aforementioned disadvantages, and an object of the invention is providing a liquid crystal display device having a wide viewing angle characteristic and high display quality.

The liquid crystal display device of this invention includes a first substrate; a second substrate; a liquid crystal layer disposed between the first substrate and the second substrate; and a plurality of picture element regions each defined by a first electrode provided on a face of the first substrate facing the liquid crystal layer and a second electrode provided on the second substrate so as to oppose the first electrode via the liquid crystal layer sandwiched therebetween, and the first electrode includes a plurality of openings and a solid portion in each of the plurality of picture element regions, the liquid crystal layer is in a vertical orientation state in each of the plurality of picture element regions when no voltage is applied between the first electrode and the second electrode, and when a voltage is applied between the first electrode and the second electrode, a plurality of liquid crystal domains each in a radially-inclined orientation state are formed in the plurality of openings and the solid portion by inclined electric fields generated at respective edge portions of the plurality of openings of the first electrode, for producing a display by changing orientation states of the plurality of liquid crystal domains in accordance with the applied voltage. Owing to this structure, the aforementioned object is achieved.

Preferably, at least some of the plurality of openings have substantially the same shape and the same size, and form at least one unit lattice arranged so as to have rotational symmetry.

Preferably, each of the at least some of the plurality of openings is in a rotationally symmetrical shape.

Each of the at least some of the plurality of openings may be in a substantially circular shape.

Each region of the solid portion surrounded with the at least some of the plurality of openings (a unit solid portion) may be in a substantially circular shape.

Each region of the solid portion surrounded with the at least some of the plurality of openings (a unit solid portion) may be in a substantially rectangular shape with substantially arc-shaped corners.

Preferably, in each of the plurality of picture element regions, a total area of the plurality of openings of the first electrode is smaller than an area of the solid portion of the first electrode.

The liquid crystal display device may further include a protrusion within each of the plurality of openings, a cross-sectional shape of the protrusion taken along a plane direction of the substrate may be the same as a shape of the corresponding opening, and a side face of the protrusion may have an orientation-regulating force for orienting liquid crystal molecules of the liquid crystal layer in the same direction as an orientation-regulating direction obtained by the inclined electric field.

Preferably, the plurality of liquid crystal domains are in a spirally radially-inclined orientation state.

The liquid crystal display device may further include a pair of polarizing plates respectively provided outside of the first substrate and the second substrate and disposed with polarizing axes thereof crossing each other substantially perpendicularly, and in each of the plurality of liquid crystal domains, assuming that a liquid crystal molecule included in the liquid crystal layer and positioned in a 12 o'clock direction on a display surface in regard to a center of each of said plurality of liquid crystal domains is inclined against the 12 o'clock direction on the display surface by an angle θ, the polarization axis of one of the pair of polarizing plates is preferably inclined in the same direction as inclination of the liquid crystal molecule positioned in the 12 o'clock direction on the display surface by an angle exceeding 0 degree and smaller than 2θ against the 12 o'clock direction on the display surface.

More preferably, the polarization axis of one of the pair of polarizing plates is inclined by an angle exceeding 0 degree and equal to θ or less. Alternatively, the polarization axis of one of the pair of polarizing plates may be inclined by an angle substantially the same as θ/2 or the polarization axis of one of the pair of polarizing plates may be inclined by an angle substantially the same as θ.

The solid portion may include a plurality of island portions arranged in the form of an m×n matrix and a plurality of branch portions for electrically connecting adjacent pairs of the plurality of island portions, and the number of the plurality of branch portions may be smaller than (2mn−m−n).

The first substrate can further include an active element provided correspondingly to each of the plurality of picture element regions, and the first electrode may correspond to a picture element electrode provided in each of the plurality of picture element regions to be switched by the active element and the second electrode may correspond to at least one counter electrode opposing the plurality of picture element electrodes.

The other liquid crystal display device of this invention includes a first substrate; a second substrate; a liquid crystal layer disposed between the first substrate and the second substrate; and a plurality of picture element regions each defined by a first electrode provided on a face of the first substrate facing the liquid crystal layer and a second electrode provided on the second substrate so as to oppose the first electrode via the liquid crystal layer sandwiched therebetween, and in each of the plurality of picture element regions, the liquid crystal layer is in a vertical orientation state when no voltage is applied between the first electrode and the second electrode, and the first electrode includes a plurality of openings disposed at least corners of each of the plurality of picture element regions and a solid portion. Owing to this structure, the aforementioned object is achieved.

Preferably, a region of the solid portion surrounded with at least some of the plurality of openings is in a rotationally symmetrical shape.

Alternatively, a region of the solid portion surrounded with at least some of the plurality of openings may be in a substantially circular shape.

Alternatively, a region of the solid portion surrounded with at least some of the plurality of openings may be in a substantially rectangular shape with substantially arc-shaped corners.

The solid portion may include a plurality of island portions arranged in the form of an m×n matrix and a plurality of branch portions for electrically connecting adjacent pairs of the plurality of island portions, and the number of the plurality of branch portions may be smaller than (2mn−m−n).

The functions of the present invention are as follows:

In the present liquid crystal display device, one of a pair of electrodes for applying a voltage through a liquid crystal layer in a picture element region includes a plurality of openings (where no conducting film is present in the electrode) and a solid portion (a portion other than the openings where a conducting film is present in the electrode). The solid portion is typically formed from a continuous conducting film. The liquid crystal layer is in a vertical orientation state when no voltage is applied, and when a voltage is applied, a plurality of liquid crystal domains each in a radially-inclined orientation state are formed by inclined electric fields generated at the respective edge portions of the openings of the electrode. Typically, the liquid crystal layer is formed from a liquid crystal material having negative dielectric anisotropy and is controlled in its orientation by vertical alignment films sandwiching the liquid crystal layer.

The liquid crystal domains formed by the inclined electric fields are formed in regions corresponding to the openings and the solid portion of the electrode, and a display is produced by changing the orientation states of these liquid crystal domains in accordance with the applied voltage. Since each of the liquid crystal domains is oriented axially symmetrically, the viewing angle dependency of display quality can be reduced so as to attain a wide viewing angle characteristic.

Furthermore, since the liquid crystal domains formed correspondingly to the openings and the liquid crystal domains formed correspondingly to the solid portion are formed owing to the inclined electric fields generated at the respective edge portions of the openings, these liquid crystal domains are formed adjacently and alternately and the orientations of liquid crystal molecules of the adjacent liquid crystal domains are substantially continuous. Accordingly, no disclination line is formed between a liquid crystal domain formed correspondingly to an opening and a liquid crystal domain formed correspondingly to a solid portion. Therefore, degradation in the display quality due to a disclination line can be avoided, and the orientation of the liquid crystal molecules is highly stable.

In the present liquid crystal display device, the liquid crystal molecules are placed in the radially-inclined orientation state not only in a region corresponding to the solid portion of the electrode but also in regions corresponding to the openings. Therefore, as compared with the aforementioned conventional liquid crystal display device, the continuity in the orientations of the liquid crystal molecules is higher and the orientation state is more stable, so as to realize even display free from unevenness. In particular, it is necessary to allow the inclined electric field for controlling the orientation of the liquid crystal molecules to work on a large number of liquid crystal molecules in order to realize a good response characteristic (namely, a high response speed), and for this purpose, it is necessary to form a large number of openings (edge portions). In the present liquid crystal display device, liquid crystal domains that can be placed in a stable radially-inclined orientation state can be formed correspondingly to the openings, and hence, even when a large number of openings are formed for improving the response characteristic, the degradation of display quality (occurrence of unevenness) can be avoided.

When at least some of the plural openings have substantially the same shape and the same size so as to form at least one unit lattice rotationally symmetrically arranged, the plurality of liquid crystal domains can be highly symmetrically arranged by using the unit lattice as a unit, resulting in improving the viewing angle dependency of the display quality. Furthermore, when the entire picture element region is divided into unit lattices, the orientation of the liquid crystal layer can be stabilized over the entire picture element region. For example, the openings are arranged so that the centers of the respective openings can form a square lattice. In the case where one picture element region is divided by opaque composing elements such as a storage capacitance line, a unit lattice is disposed in each region that makes contribution to the display.

When each of at least some of the plurality of openings (typically, the openings together forming a unit lattice) is in a rotationally symmetrical shape, the stability of the radially-inclined orientation of the liquid crystal domain formed correspondingly to the opening can be improved. For example, the shape (seen from the substrate normal direction) of each opening is a circle or a regular polygon (such as a square). The opening may be in a shape not rotationally symmetrical (such as an ellipse) depending upon the shape (the ratio between width and length) of a picture element. Furthermore, when a region of the solid portion substantially surrounded with the openings ("a unit solid portion"; described below) is in a rotationally symmetrical shape, the stability of the radially-inclined orientation of the liquid crystal domain formed correspondingly to the solid portion can be improved. For example, in the case where the openings are disposed in a square lattice arrangement, the opening may be in a substantially star-shape or cross-shape and the solid portion may be in a substantially circular or square shape. Needless to say, both the opening and the portion of the solid portion surrounded with the openings may be in a substantially square shape.

In order to stabilize the radially-inclined orientation of the liquid crystal domain formed correspondingly to the opening of the electrode, the liquid crystal domain formed correspondingly to the opening is preferably in a substantially circular shape. Conversely speaking, the shape of the opening is designed so as to form a substantially circular liquid crystal domain correspondingly to the opening.

Needless to say, in order to stabilize the radially-inclined orientation of the liquid crystal domain formed correspondingly to the solid portion of the electrode, the region of the solid portion substantially surrounded with the openings is preferably in a substantially circular shape. One liquid crystal domain formed in the solid portion made from a continuous conducting film is formed correspondingly to the region of the solid portion substantially surrounded with the plural openings (unit solid portion). Accordingly, the shapes and the arrangement of the openings are determined so that the region of the solid portion (unit solid portion) can be in a substantially circular shape.

In any of the aforementioned cases, the sum of the areas of the openings formed in the electrode is preferably smaller than the area of the solid portion in each of the picture element regions. As the area of the solid portion is larger, the area of the liquid crystal layer (defined on a plane seen from the substrate normal direction) directly affected by the electric fields generated by the electrodes is larger, and hence, the optical characteristic (such as transmittance) of the liquid crystal layer against voltage can be improved.

It is preferably determined whether the opening is formed in a substantially circular shape or the unit solid portion is formed in a substantially circular shape depending upon the area of the solid portion is larger in which structure. It is appropriately selected which structure is preferred depending upon the pitch of picture elements. Typically, in the case where the pitch exceeds approximately 25 µm, the openings are preferably formed so as to form substantially circular unit solid portions, and in the case where the pitch is smaller than approximately 25 µm, the openings are preferably formed in substantially circular shape.

When the region of the solid portion substantially surrounded with the openings is formed in a substantially rectangular shape with substantially arc-shaped corners, the radially-inclined orientation can be stabilized and the transmittance (effective aperture ratio) can be improved.

The orientation-regulating force caused by the inclined electric field generated at the edge portion of the opening of the electrode works merely under voltage application. Therefore, when, for example, an external force is applied to the liquid crystal panel under application of no voltage or a comparatively low voltage, the radially-inclined orientation of the liquid crystal domain sometimes may not be kept. In order to overcome this problem, in one preferred embodiment, the liquid crystal display device includes a protrusion formed within the opening of the electrode and having orientation-regulating force on the liquid crystal molecules of the liquid crystal layer in the same direction as the orientation-regulating direction of the inclined electric field. The cross-sectional shape of the protrusion taken on a plane direction of the substrate is the same as the opening, and is preferably in a rotationally symmetrical shape similarly to the shape of the opening.

When the plurality of liquid crystal domains can be placed in a spiral radially-inclined orientation state, the orientation can be further stabilized, further even display free from unevenness can be realized and the response speed is increased. The spiral radially-inclined orientation state can be realized by using a nematic liquid crystal material having negative dielectric anisotropy including a chiral agent. It depends upon the kind of chiral agent whether the spiral direction is the clockwise direction or the counterclockwise direction.

In the case where the liquid crystal display device having the aforementioned structure further includes a pair of polarizing plates provided on the outside of the first and second substrates to have their polarization axes crossing substantially perpendicularly, the display quality can be further improved as follows:

Specifically, when a liquid crystal molecule positioned in the 12 o'clock direction on the display surface in regard to the center of the liquid crystal domain is assumed to be inclined against the 12 o'clock direction on the display surface by an angle θ, the polarizing plates are arranged so that the polarization axis of one of the polarizing plates is inclined in the same direction as the incline direction of the liquid crystal molecule against the 12 o'clock direction on the display surface by an angle exceeding 0 degree and smaller than 2θ. Thus, the light transmittance obtained when the liquid crystal domain is in the spiral radially, inclined orientation state can be improved, resulting in realizing bright display. In particular, when the polarizing plates are arranged so that the polarization axis of one polarizing plate is inclined at an angle substantially the same as θ, the light transmittance can be further increased, resulting in further bright display. Furthermore, when the polarizing plates are arranged so that the polarization axis of one polarizing plate is inclined by an angle exceeding 0 degree and equal to θ or less, not only bright display can be realized but also occurrence of a tailing phenomenon (including a white tailing phenomenon and a black tailing phenomenon) can be suppressed, resulting in realizing display with high quality. In particular, when the polarizing plates are arranged so that the polarization axis of one polarizing plate is inclined at an angle substantially the same as θ/2, the occurrence of the white tailing phenomenon and the black tailing phenomenon can be substantially avoided, resulting in realizing display with further higher quality.

The solid portion of the electrode is composed of, for example, a plurality of island portions and a plurality of branch portions each for electrically connecting an adjacent pair of the plurality of island portions. Since each branch portion present between the adjacent island portions degrades the orientation-regulating effect attained by the inclined electric field, the degradation of the orientation-regulating effect can be suppressed so as to improve the response characteristic as the width of each branch portion is smaller and the number of branch portions is smaller.

In the case where the plurality of island portions are arranged in the form of an m×n matrix, if the branch portions are provided between all the adjacent pairs of island portions, the number of branch portions is (2mn−m−n). When the number of plurality of branch portions is smaller than (2mn−m−n), the degradation of the orientation-regulating effect can be suppressed so as to improve the response characteristic.

The liquid crystal display device of this invention is, for example, an active matrix liquid crystal display device equipped with a switching element such as a TFT in each picture element region, and the electrode having the openings corresponds to a picture element electrode connected to the switching element and the other electrode corresponds to at least one counter electrode opposing a plurality of picture element electrodes. In this manner, merely by forming openings in one of the pair of electrodes opposing each other via the liquid crystal layer sandwiched therebetween, stable radially-inclined orientation can be realized. Specifically, the present liquid crystal display device can be fabricated by a known fabrication method merely by modifying a photomask used in patterning a conducting film into a pattern of picture element electrodes so as to form openings in a desired shape in desired arrangement. Needless to say, a plurality of openings may be formed in the counter electrode.

In the other liquid crystal display device of this invention, one of the pair of electrodes for applying a voltage through the liquid crystal layer in a picture element region includes a plurality of openings disposed at least at corners of the picture element region and a solid portion. Therefore, when a voltage is applied between the pair of electrodes, inclined electric fields are generated at the edge portions of the openings of the electrode. Accordingly, owing to the inclined electric fields generated at the edge portions of the plurality of openings disposed at least at the corners, the liquid crystal layer is formed into liquid crystal domains each in a radially-inclined orientation state under voltage application, resulting in attaining a wide viewing angle characteristic.

A unit solid portion (a region of the solid portion substantially surrounded with the openings) present in a given picture element region may be a plurality of unit solid portions or a single unit solid portion surrounded with the openings disposed at the corners. In the case where a unit solid portion present in a given picture element region is a single unit solid portion, the openings surrounding the unit solid portion may be a plurality of openings disposed at the corners or a substantially single opening continuously formed from a plurality of openings disposed at the corners.

When the region of the solid portion substantially surrounded with the openings (unit solid portion) is in a rotationally symmetrical shape, the stability of the radially-inclined orientation of the liquid crystal domain formed in the solid portion can be improved. For example, the unit solid portion may be in a substantially circular shape, a substantially square shape or a substantially rectangular shape.

When the unit solid portion is in a substantially circular shape, the radially-inclined orientation of the liquid crystal domain formed in the solid portion of the electrode can be stabilized. Since a liquid crystal domain formed in the solid portion made from a continuous conducting film is formed correspondingly to the unit solid portion, the shape and the arrangement of the openings are determined so that the unit solid portion can be formed in a substantially circular shape.

Furthermore, when the unit solid portion is in a substantially rectangular shape with substantially arc-shaped corners, the radially-inclined orientation can be stabilized and the transmittance (effective aperture ratio) can be improved.

The solid portion of the electrode is composed of, for, example, a plurality of island portions and a plurality of branch portions each for electrically connecting an adjacent pair of the plurality of island portions. Since each branch portion present between the adjacent island portions degrades the orientation-regulating effect attained by the inclined electric field, the degradation of the orientation-regulating effect can be suppressed so as to improve the response characteristic as the width of each branch portion is smaller and the number of branch portions is smaller.

In the case where the plurality of island portions are arranged in the form of an m×n matrix, if the branch portions are provided between all the adjacent pairs of island portions, the number of branch portions is (2mn−m−n). When the number of plurality of branch portions is smaller than (2mn−m−n), the degradation of the orientation-regulating effect can be suppressed so as to improve the response characteristic.

BRIEF DESCRIPTION OF THE DRAWINGS

FIG. 18A is a top view thereof and FIG. 188 is a cross-sectional view thereof taken along line 18B-18B' of FIG. 18A;

FIG. 19A is a diagram for schematically showing ark orientation state of liquid crystal molecules obtained immediately after voltage application, and FIGS. 19B and 19C are top views for schematically showing orientation sates of liquid crystal molecules in orientation stable time (stationary state);

FIG. 23 is a diagram for schematically showing a white tailing phenomenon;

FIG. 28 is a diagram for schematically showing a black tailing phenomenon;

FIGS. 35A and 35B are cross-sectional views respectively taken along lines 35A-35A' and 35B-35B' of FIG. 34 for schematically showing the orientation state of the liquid crystal molecules under voltage application;

DETAILED DESCRIPTION OF THE INVENTION

Preferred embodiments of the invention will now be described with reference to the accompanying drawings.

Embodiment 1

First, the electrode structure of a liquid crystal display device of this invention and the function thereof, will be described. The liquid crystal display device of this invention is suitably used in an active matrix liquid crystal display device owing to its excellent display characteristic. Active matrix liquid crystal display devices using thin film transistors (TFTs) will be exemplified in the following preferred embodiments, which does not limit the invention. The invention is also applicable to an active matrix liquid crystal display device using MIMs and a passive matrix liquid crystal display device. Also, in the following embodiments, transmission type liquid crystal display devices are exemplified, which does not limit the invention. The invention is also applicable to a reflection type liquid crystal display device and a transmission/reflection type liquid crystal display device described later.

Herein, a region of a liquid crystal display device corresponding to a "picture element", that is, a minimum unit of display, is designated as a "picture element region". In a color liquid crystal display device, three picture elements of R, G and B together correspond to one pixel. In an active matrix liquid crystal display device, one picture element region is defined by a picture element electrode and a counter electrode opposing the picture element electrode. Alternatively, in a passive matrix liquid crystal display device, each intersection region between column electrodes in a stripe shape and row electrodes provided perpendicularly to, the column electrodes is defined as a picture element region. In a structure employing a black matrix, strictly speaking, a region corresponding to an opening of the black matrix in the entire region to which a voltage is applied in accordance with a state to be displayed corresponds to a picture element region.

Figure 1A:
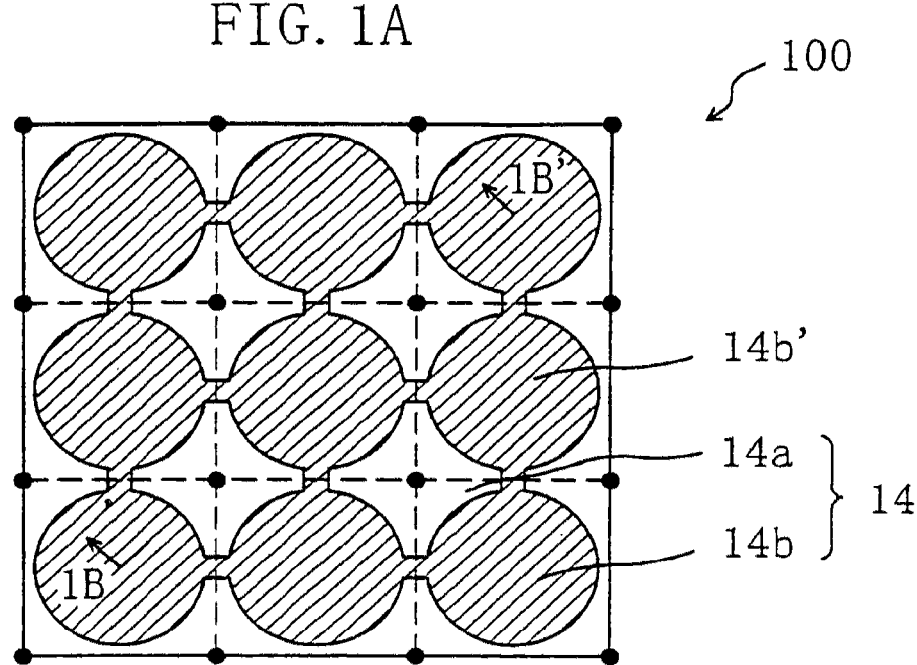
FIG. 1A is a top view for schematically showing the structure of one picture element region of a liquid crystal display device 100 according to Embodiment 1 of the invention.
Figure 1B:
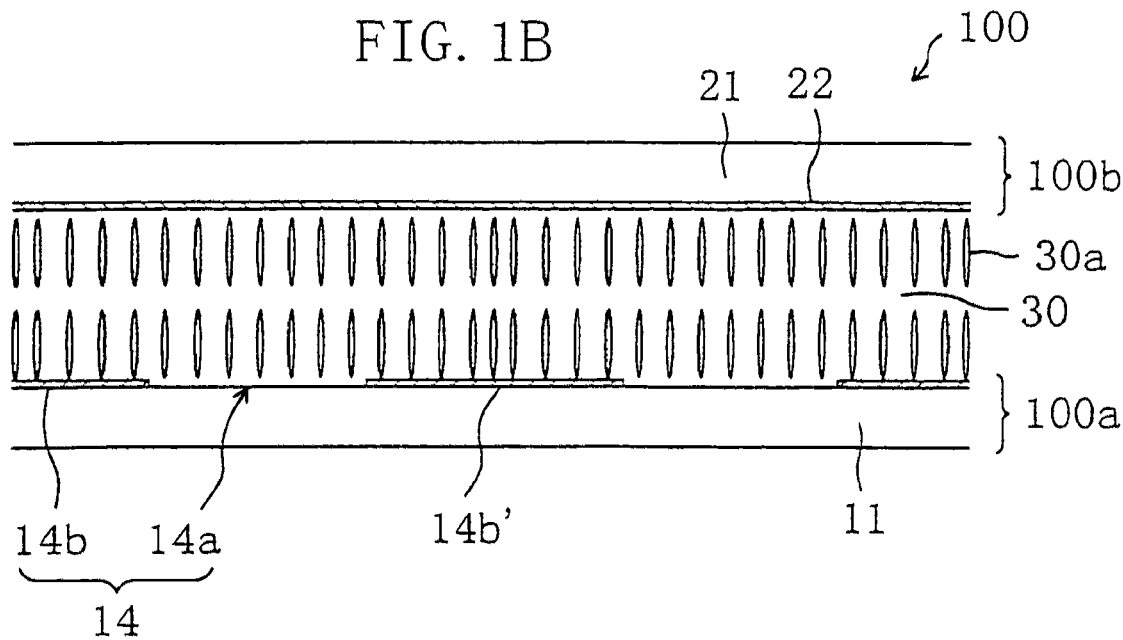
FIG. 1B is a cross-sectional view thereof taken along line 1B-1B' of FIG. 1A.

Now, the structure of one picture element region of a liquid crystal display device 100 according to Embodiment 1 of the invention will be described with reference to FIGS. 1A and 1B. In the following description, a color filter and a black matrix are omitted for simplification. Also, in the drawings referred to in the following embodiments, like reference numerals are used to refer to like elements having substantially the same functions as those of the liquid crystal display device 100, so as to omit the description. FIG. 1A is a top view seen from the substrate normal direction and FIG. 18 is a cross-sectional view taken along line 1B-1B' of FIG. 1A. In FIG. 1B, no voltage is applied through a liquid crystal layer.

The liquid crystal display device 100 includes an active matrix substrate (hereinafter referred to as the TFT substrate) 100a, a counter substrate (also designated as the color filter substrate) 100b and a liquid crystal layer 30 disposed between the TFT substrate 100a and the counter substrate 100b. Liquid crystal molecules 30a of the liquid crystal layer 30 have negative dielectric anisotropy, and owing to vertical alignment films serving as vertical alignment layers (not shown) provided on the surfaces of the TFT substrate 100a and the counter substrate 100b facing the liquid crystal layer 30, the liquid crystal molecules 30a are oriented vertically to the surface of the vertical alignment films as shown in FIG. 1B when no voltage is applied through the liquid crystal layer 30. Such a state of the liquid crystal layer 30 is designated as a vertical orientation state. However, depending upon the kinds of the vertical alignment film and the liquid crystal material, the liquid crystal molecules 30a of the liquid crystal layer 30 in the vertical orientation state may be slightly inclined against the normal line of the surface of the vertical alignment film (substrate surface). In general, a state where a liquid crystal molecule is oriented with the liquid crystal molecular axis (also designated as the axial direction) inclined at an angle of approximately 85 degrees or more against the surface of a vertical alignment film is designated as the vertical orientation state.

The TFT substrate 100a of the liquid crystal display device 100 includes a transparent substrate (such as a glass substrate) 11 and a picture element electrode 14 formed thereon. The counter substrate 100b includes a transparent substrate (such as a glass substrate) 21 and a counter electrode 22 formed thereon. In accordance with a voltage applied to each pair of picture element electrode 14 and counter electrode 22 opposing each other via the liquid crystal layer 30 sandwiched therebetween, the orientation state of the liquid crystal layer 30 in each picture element region is changed. A display is produced by utilizing a phenomenon that the polarizing state and the quantity of light transmitting the liquid crystal layer 30 are changed in accordance with the change of the orientation state of the liquid crystal layer 30.

The picture element electrode 14 of the liquid crystal display device 100 has a plurality of openings 14a and a solid portion 14b. The opening 14a corresponds, in the picture element electrode 14 formed from a conducting film (such as an ITO film), to a portion where the conducting film is removed, and the solid portion 14b corresponds to a portion where the conducting film remains (a portion other than the openings 14a). A plurality of openings 14a are formed in each picture element electrode, and the solid portion 14b is basically formed from a single continuous conducting film.

The plural openings 14a are arranged so that their centers form a square lattice, and a region of the solid portion (hereinafter referred to as the unit solid portion) 14b' substantially surrounded with four openings 14a whose, centers are positioned on four lattice points forming one unit lattice is in a substantially circular shape. Each opening 14a is in a substantially star-shape with four quarter arc-shaped edges having a four-fold rotation axis at its center. The unit lattices are preferably formed up to the edges of the picture element electrode 14 in order to stabilize the orientation over the entire picture element region. Accordingly, as shown in the drawing, the edge of the picture element electrode is preferably patterned into a shape corresponding to approximately a half of the opening 14a (at the side edge of the picture element electrode) or approximately a quarter of the opening 14a (at the corner edge of the picture element electrode).

The openings 14a positioned in the center part of the picture element region have substantially the same shape and the same size. The unit solid portions 14b' positioned in the unit lattices formed by the openings 14a are in a substantially circular shape and have substantially the same shape and the same size. The unit solid portions 14b' adjacent to each other are connected to each other, so as to work as the solid portion 14b functioning as a substantially single conducting film.

When a voltage is applied between the picture element electrode 14 having the aforementioned structure and the counter electrode 22, a plurality of liquid crystal domain; each having radially-inclined orientation are formed due to inclined electric fields generated at the edge portions of the openings 14a. The liquid crystal domains are formed in each region corresponding to each opening 14a and each region corresponding to each unit solid portion 14b' within the unit lattice.

In this embodiment, the picture element electrode 14 in a square shape is exemplified, but the shape of the picture element electrode 14 is not limited to the square. The general shape of the picture element electrode 14 is approximate to a rectangle (including a square), and hence, the openings 14a can be regularly disposed in square lattice arrangement. The effect of the invention can be attained even when the picture element electrode 14 is in a shape other than the rectangular shape as far as the openings 14a are disposed regularly (for example, in the square lattice arrangement as described above) so as to form the liquid crystal domains over the entire picture element region.

Figure 2A:
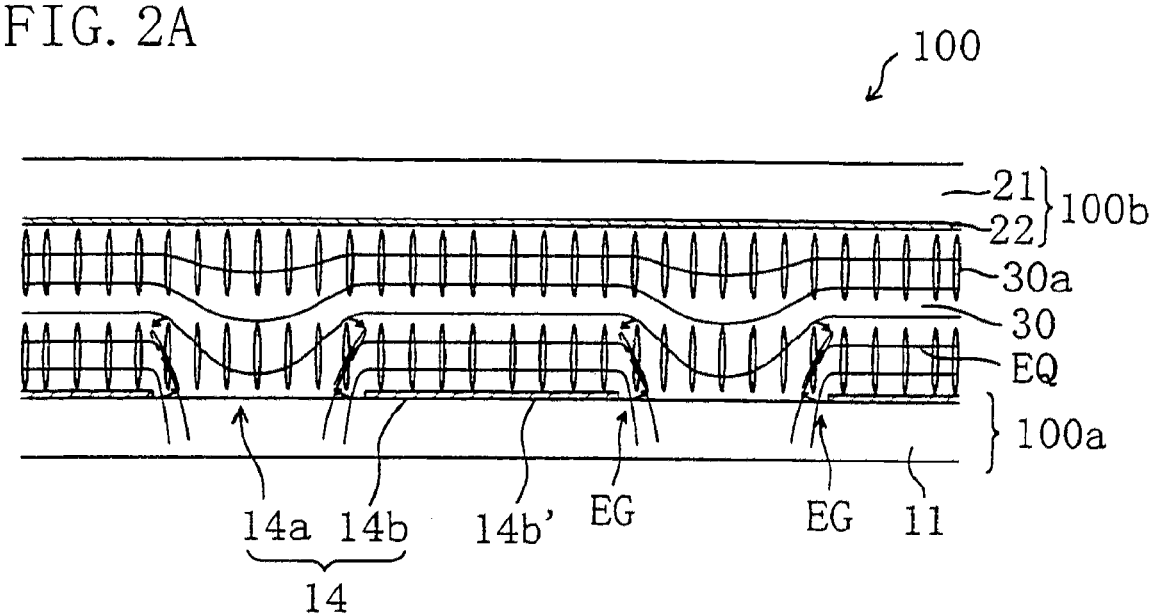
FIGS. 2A and 2B are diagrams for showing states where a voltage is applied through a liquid crystal layer 30 of the liquid crystal display device 100, and specifically FIG. 2A schematically shows a state where orientation starts to change (ON initial state) and FIG. 2B schematically shows a stationary state.
Figure 2B:
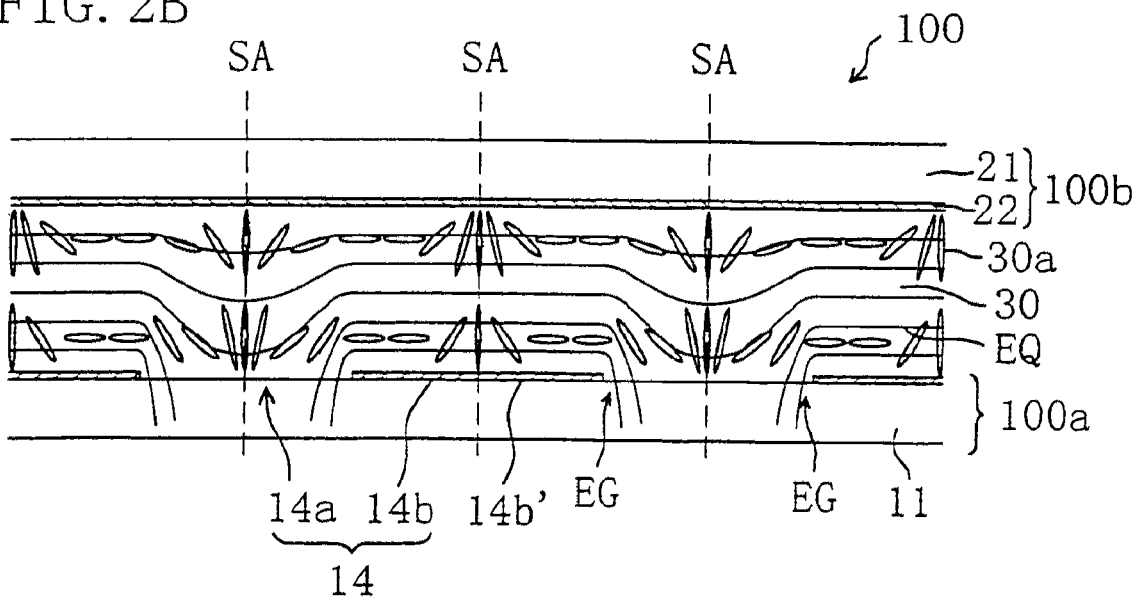

The mechanism of formation of the liquid crystal domains by the inclined electric fields will now be described with reference to FIGS. 2A and 2B. FIGS. 2A and 2B show the states attained by applying a voltage through the liquid crystal layer 30 of FIG. 1B, and specifically, FIG. 2A schematically shows the state where the orientation of the liquid crystal molecules 30a starts to change in accordance with the voltage applied through the liquid crystal layer 30 (ON initial state) and FIG. 2B schematically shows the state where the orientation of the liquid crystal molecules 30a changed in accordance with the applied voltage attains the stationary state. In FIGS. 2A and 2B, a line EQ denotes an equipotential line.

When the picture element electrode 14 and the counter electrode 22 have the same potential (which corresponds to the state where no voltage is applied through the liquid crystal layer 30), the liquid crystal molecules 30a within the picture element region are oriented vertically to the surfaces of the substrates 11 and 21 as shown in FIG. 1B.

When a voltage is applied, potential gradient expressed by the equipotential line EQ (perpendicularly crossing a line of electric force) of FIG. 2A is formed. The equipotential line EQ is parallel to the surfaces of the solid portion 14b and the counter electrode 22 within a region of the liquid crystal layer 30 positioned between the solid portion 14b of the picture element electrode 14 and the counter electrode 22, and drops in a region corresponding to the opening 14a of the picture element electrode 14. Therefore, the inclined electric field expressed by an inclined portion of the equipotential line EQ is formed in a region of the liquid crystal layer 30 on the edge portion EG of the opening 14a (that is, the inside periphery of the opening 14a including the boundary thereof).

To the liquid crystal molecules 30a having the negative dielectric anisotropy, torque for orienting the axial direction of the liquid crystal molecules 30a parallel to the equipotential line EQ (vertical to the line of electric force) is applied. Accordingly, the liquid crystal molecules 30a disposed on the edge portions EG are inclined (rotated) in the clockwise direction at the edge portion EG on the right hand side in the drawing and in the counterclockwise direction at the edge portion EG on the left hand side in the drawing as shown with arrows in FIG. 2A, so as to orient parallel to the equipotential line EQ.

Now, the change of the orientation of the liquid crystal molecules 30a will be described in detail with reference to FIGS. 3A, 3B, 3C and 3D.

Figure 3A:
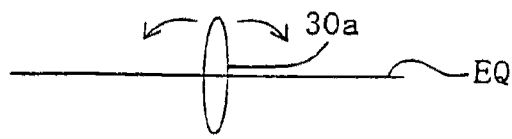
FIGS. 3A, 3B, 3C and 3D are diagrams for schematically showing the relationship between a line of electric force and orientation of liquid crystal molecules.

When the electric field is generated in the liquid crystal layer 30, torque for orienting the axial direction of the liquid crystal molecule 30a parallel to the equipotential line EQ is applied to the liquid crystal molecule 30a having the negative dielectric anisotropy. As shown in FIG. 3A, when an electric field expressed by an equipotential line EQ vertical to the axial direction of a liquid crystal molecule 30a is generated, torque is applied to the liquid crystal molecule 30a for inclining it in the clockwise direction or in the counterclockwise direction in the same probability. Accordingly, in a region of the liquid crystal layer 30 disposed between the parallel plate electrodes opposing each other, the torque is applied in the clockwise direction to some liquid crystal molecules 30a and in the counterclockwise direction to other liquid crystal molecules 30a. As a result, the orientation sometimes may not be smoothly changed in accordance with a voltage applied through the liquid crystal layer 30.

Figure 3B:
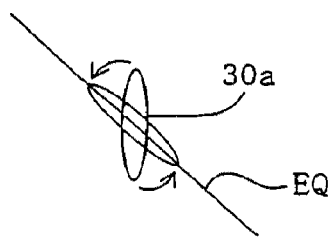
Figure 3C:
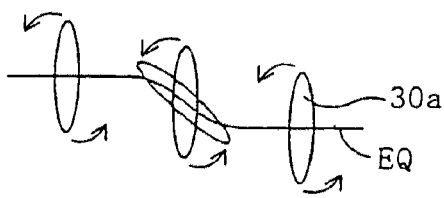
Figure 3D:
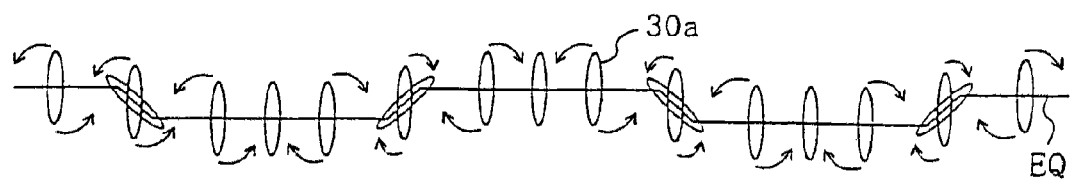

When the electric field inclined against the axial direction of the liquid crystal molecules 30a as expressed by the equipotential line EQ (inclined electric field) is generated at the edge portion EG of the opening 14a of the present liquid crystal display device 100 as shown in FIG. 2A, a liquid crystal molecule 30a is inclined, as shown in FIG. 3B, in a direction for orienting parallel to the equipotential line EQ with smaller inclination (in the counterclockwise direction in the drawing). Furthermore, a liquid crystal molecule 30a positioned in a region where an electric field expressed by an equipotential line EQ vertical to the axial direction is generated is inclined, as shown in FIG. 3C, in the same direction as another liquid crystal molecule 30a positioned on the inclined portion of the equipotential line EQ so as to make continuous (match) their orientations. When an electric field expressed by an equipotential line EQ with continuous irregularities as shown in FIG. 3D is applied, liquid crystal molecules 30a positioned on a flat portion of the equipotential line EQ are oriented in a direction matching with the orientation direction of other liquid crystal molecules 30a positioned on inclined portions of the equipotential line EQ. Herein, "to be positioned on an equipotential line EQ" means "to be positioned within an electric field expressed by an equipotential line EQ".

When the change of the orientation starting from the liquid crystal molecules 30a positioned on the inclined portion of the equipotential line EQ is proceeded as described above and the stationary state is attained, the orientation state as schematically shown in FIG. 2B is obtained. The liquid crystal molecules 30a positioned in the vicinity of the center of the opening 14a are substantially equally affected by the orientations of the liquid crystal molecules 30a positioned at the opposing edge portions EG of the opening 14a, and hence, they keep the orientation state vertical to the equipotential line EQ. The liquid crystal molecules 30a positioned in a region away from the center of the opening 14a are inclined owing to the influence of the orientation of the liquid crystal molecules 30a positioned at the closer edge portion EG, so as to form inclined orientation symmetrically about the center SA of the opening 14a. When this orientation state is seen from the vertical direction to the display surface of the liquid crystal display device 100 (in the vertical direction to the surfaces of the substrates 11 and 21), the axial directions of the liquid crystal molecules 30a are oriented radially about the center of the opening 14a (not shown). This orientation state is herein designated as "radially-inclined orientation". Also, a region of the liquid crystal layer in which the radially-inclined orientation is obtained about one center is herein designated as a liquid crystal domain.

Also in a region corresponding to the unit solid portion 14b' substantially surrounded with the openings 14a, a liquid crystal domain where the liquid crystal molecules 30a are in the radially-inclined orientation state is formed. The liquid crystal molecules 30a positioned in the region corresponding to the unit solid portion 14b' are affected by the orientations of the liquid crystal molecules 30a positioned at the edge portions EG of the openings 14a, so as to form the radially-inclined orientation symmetrical about the center SA of the unit solid portion 14b' (corresponding to the center of the unit lattice formed by the openings 14a).

The radially-inclined orientation obtained in a liquid crystal domain formed in the unit solid portion 14b' and the radially-inclined orientation obtained in the opening 14a are continuous, and the liquid crystal molecules 30a positioned in these regions are oriented so as to match with the orientation of the liquid crystal molecules 30a positioned at the edge portions EG of the opening 14a. The liquid crystal molecules 30a in the liquid crystal domain formed in the opening 14a are oriented in the shape of a cone opening upward (toward the substrate 100b), and the liquid crystal molecules 30a in the liquid crystal domain formed in the unit solid portion 14b' are oriented in the shape of a cone opening downward (toward the substrate 100a). In this manner, the radially-inclined orientation obtained in the liquid crystal domain formed in the opening 14a and the radially-inclined orientation obtained in the liquid crystal domain formed in the unit solid portion 14b' are mutually continuous. Therefore, a disclination line (orientation defect) is never formed on the boundary thereof, resulting in preventing the display quality from lowering due to the occurrence of a disclination line.

In order to improve the viewing angle dependency of the display quality of a liquid crystal display device in all the azimuths, the existing probabilities of liquid crystal molecules oriented in the respective azimuth directions in each picture element region are preferably rotationally symmetrical and are more preferably axially symmetrical. In other words, all the liquid crystal domains formed in the entire picture element region are preferably rotationally symmetrically arranged and more preferably axially, symmetrically arranged. However, it is not necessary to attain the rotation symmetry in the entire picture element region but the liquid crystal layer of the picture element region is formed as a collection of liquid crystal domains rotationally symmetrically (or axially symmetrically) arranged (for example, a plurality of liquid crystal domains disposed in the square lattice arrangement). Accordingly, all the plurality of openings 14a formed in the picture element region should not be necessarily rotationally symmetrically arranged in the entire picture element region as far as they are expressed as a collection of openings rotationally symmetrically (or axially symmetrically) arranged (for example, a plurality of openings disposed in the square lattice arrangement). Needless to say, the unit solid portions 14b' each surrounded with the plural openings 14a are similarly arranged. Furthermore, since the shape of each liquid crystal domain is also preferably rotationally symmetrical and more preferably axially symmetrical, the shape of each of the openings 14a and the unit solid portions 14b' is preferably rotationally symmetrical and more preferably axially symmetrical.

In some cases, a sufficient voltage cannot be applied through a portion of the liquid crystal layer 30 in the vicinity of the center of the opening 14a, so that the portion of the liquid crystal layer 30 in the vicinity of the center of the opening 14a cannot make contribution to display. In other words, even when the radially-inclined orientation in the portion of the liquid crystal layer 30 in the vicinity of the opening 14a is slightly disturbed (for example, when the center axis is slightly shifted from the center of the opening 14a), the display quality may not be lowered. Accordingly, at least the liquid crystal domains formed correspondingly to the unit solid portions 14b' should be rotationally symmetrically or axially symmetrically arranged.

As described with reference to FIGS. 2A and 2B, the picture element electrode 14 of the liquid crystal display device 100 of this invention has a plurality of openings 14a, and the electric fields expressed by the equipotential line EQ having the inclined portions are formed in the liquid crystal layer 30 within the picture element region. The liquid crystal molecules 30a disposed in the liquid crystal layer 30 and having the negative dielectric anisotropy, which are in the vertical orientation state when no voltage is applied, are changed in their orientation directions by being triggered by the orientation change of the liquid crystal molecules 30a positioned on the inclined portions of the equipotential line EQ, so as to form the liquid crystal domains having the stable radially-inclined orientation in the openings 14a and the solid portion 14b. The display is produced by changing the orientations of the liquid crystal, molecules within the liquid crystal domains in accordance with the voltage applied through the liquid crystal layer.

The shape (seen from the substrate normal direction) and the arrangement of the openings 14a of the picture element electrode 14 of the liquid crystal display device 100 of this embodiment will now be described.

The display characteristic of a liquid crystal display device exhibits azimuth angle dependency derived from the orientation state (optical anisotropy) of liquid crystal molecules. In order to reduce the azimuth angle dependency of the display characteristic, the liquid crystal molecules are preferably oriented in the respective azimuth angles in equivalent probabilities. Furthermore, the liquid crystal molecules within each picture element region are preferably oriented in the respective azimuth angles in equivalent probabilities. Accordingly, the opening 14a preferably has such a shape that the liquid crystal domains can be formed so as to orient the liquid crystal molecules 30a in each picture element region in the respective azimuth angles in equivalent probabilities. Specifically, the shape of the opening 14a is preferably rotationally symmetrical (preferably with a rotation axis of two or more folds) having its center (along the normal line) as a symmetry axis, and the plural openings 14a are preferably arranged so as to be rotationally symmetrical. Also, the shape of the unit solid portion 14b', substantially surrounded with the openings is preferably rotationally symmetrical, and the unit solid portions 14b' are preferably arranged so as to be rotationally symmetrical.

However, it is not necessary to arrange the openings 14a and the unit solid portions 14b' so as to be rotationally symmetrical all over the picture element region, but when, for example, a square lattice (symmetrical with a four-fold rotation axis) is used as a minimum unit so as to form a picture element region from the combination of the square lattices as is shown in FIG. 1A, the liquid crystal molecules can be oriented in all the azimuth angles in substantially equivalent probabilities in the entire picture element region.

The orientation state of the liquid crystal molecules 30a obtained when the rotationally symmetrical star-shaped openings 14a and the substantially circular unit solid portions 14b are disposed in the square lattice arrangement as shown in FIG. 1A will now be described with reference to FIGS. 4A, 4B and 4C.

Figure 4A:
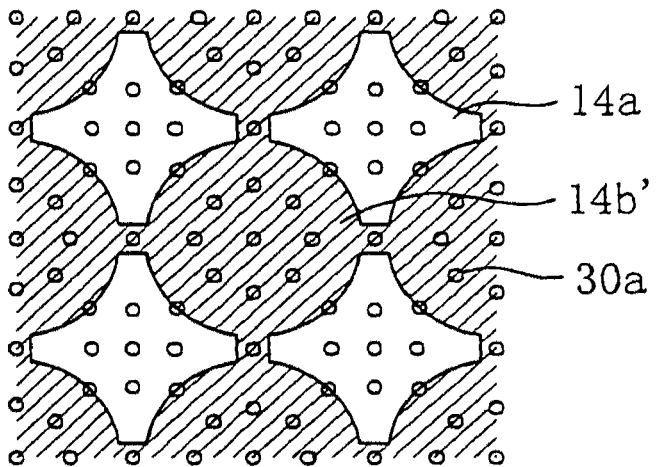
FIGS. 4A, 4B and 4C are diagrams for schematically showing orientation states of liquid crystal molecules seen from a substrate normal direction in the liquid crystal display device 100 of Embodiment 1.
Figure 4B:
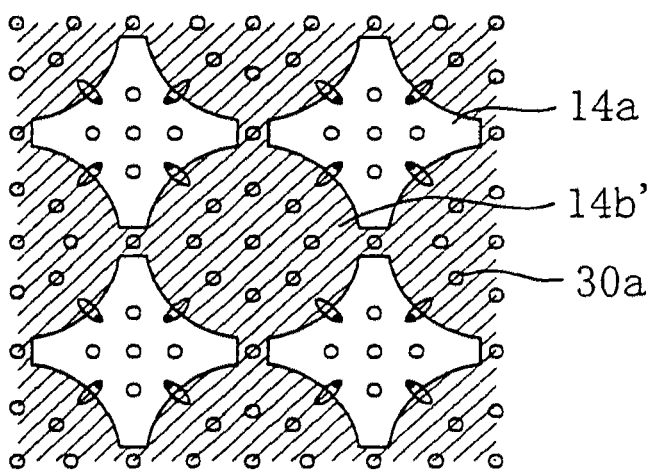
Figure 4C:
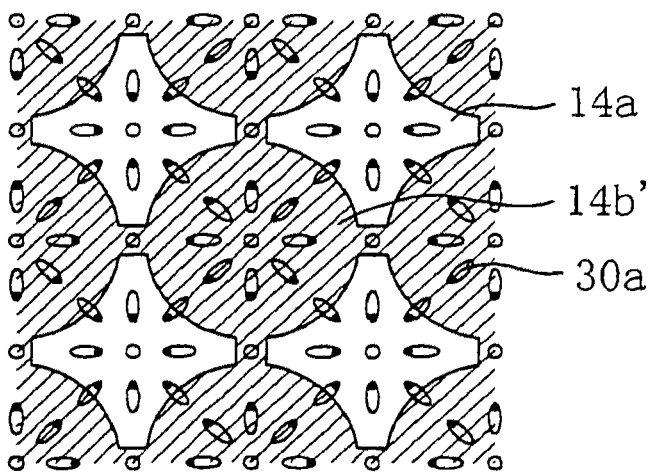

FIGS. 4A, 4B and 4C schematically show the orientation states of the liquid crystal molecules 30a seen from the substrate normal direction. In a drawing for showing the orientation state of the liquid crystal molecules 30a seen from the substrate normal direction like FIGS. 4B and 4C, a black end of each liquid crystal molecule 30a drawn in the shape of an ellipse means that the liquid crystal molecule 30a is inclined so that the black end be closer to the substrate where the picture element electrode 14 having the openings 14a is formed than the other end. This also applies to other drawings mentioned below. Herein, one unit lattice (formed by the four openings 14a) within the picture element region shown in FIG. 1A will be described. The cross-sectional views of FIGS. 4A, 4B and 4C taken along their diagonals respectively correspond to FIGS. 1B, 2A and 2B, which are also referred to in the following description.

When the picture element electrode 14 and the counter electrode 22 have the same potential, namely, when no voltage is applied through the liquid crystal layer 30, the liquid crystal molecules 30a controlled in their orientation direction by the vertical alignment films (not shown) provided on the faces of the TFT substrate 100a and the counter substrate 100b facing the liquid crystal layer 30 are in the vertical orientation state as shown in FIG. 4A.

When the electric field expressed by the equipotential line EQ of FIG. 2A is generated by applying a voltage through the liquid crystal layer 30, the torque is applied to the liquid crystal molecules 30a having the negative dielectric anisotropy so that their axial directions can be parallel to the equipotential line EQ. As described with reference to FIGS. 3A and 3B, in a liquid crystal molecule 30a positioned in the electric field expressed by an equipotential line EQ vertical to the molecular axis of the liquid crystal molecule 30a, the direction for inclining (rotating) the liquid crystal molecule 30a is not uniquely determined (as shown in FIG. 3A), and hence, the orientation change (inclination or rotation) cannot be easily caused. In contrast, in a liquid crystal molecule 30a positioned on an equipotential line EQ inclined against the molecular axis of the liquid crystal molecule 30a, the inclination (rotation) direction is uniquely determined, and hence, the orientation change is easily caused. Accordingly, as shown in FIG. 4B, the liquid crystal molecules 30a start to incline from the edge portions of the openings 14a where the molecular axes of the liquid crystal molecules 30a are inclined against the equipotential line EQ. Then, as described with reference to FIG. 3C, the liquid crystal molecules 30a positioned around the inclined liquid crystal molecules 30a at the edge portions of the openings 14a are also inclined so as to match their orientations. As a result, the axial directions of the liquid crystal molecules 30a become stable in a state as shown in FIG. 4C (in the radially-inclined orientation).

In this manner, when the opening 14a has the rotationally symmetrical shape, the liquid crystal molecules 30a within the picture element region are inclined from the edge portions of the opening 14a toward the center of the opening 14a by applying a voltage. Therefore, the liquid crystal molecules 30a positioned in the vicinity of the center of the opening 14a, where the orientation-regulating forces for the liquid crystal molecules 30a working from the respective edge portions are balanced, are kept to be vertically oriented, with the liquid crystal molecules 30a positioned around continuously inclined radially around the liquid crystal molecules 30a positioned in the vicinity of the center of the opening 14a.

Also, the liquid crystal molecules 30a positioned in the region corresponding to the substantially circular unit solid portion 14b' surrounded with the substantially star-shaped four openings 14a disposed in the square lattice arrangement are inclined so as to match their orientations with the orientation of the liquid crystal molecules 30a inclined owing to the inclined electric fields generated at the edge portions of the opening 14a. The liquid crystal molecules 30a positioned in the vicinity of the center of the unit solid portion 14b', where the orientation-regulating forces for the liquid crystal molecules 30a working from the edge portions are balanced, keep their vertical orientation to the substrate surface, with the liquid crystal molecules 30a positioned around continuously inclined radially around the liquid crystal molecules 30a positioned in the vicinity of the center of the unit solid portion 14b'.

When the liquid crystal domains in which the liquid crystal molecules 30a are in the radially-inclined orientation state are disposed in the square lattice arrangement in the entire picture element region in this manner, the existing probability of the axial directions of the liquid crystal molecules 30a is rotationally symmetrical, and hence, a high quality display free from unevenness can be realized in all the viewing directions. In order to reduce the viewing angle dependency of the liquid crystal domain with the radially-inclined orientation, the liquid crystal domain is preferably highly rotationally symmetrical (with a rotation axis preferably of two or more folds and more preferably of four or more folds). Furthermore, in order to reduce the viewing angle dependency of the entire picture element region, the plural liquid crystal domains formed in the picture element region are preferably disposed in arrangement (of, for example, a square lattice) expressed by a combination of a unit (of, for example, a unit lattice) that is highly rotationally symmetrical (with a rotation axis preferably of two or more folds and more preferably of four or more folds).

Figure 5A:
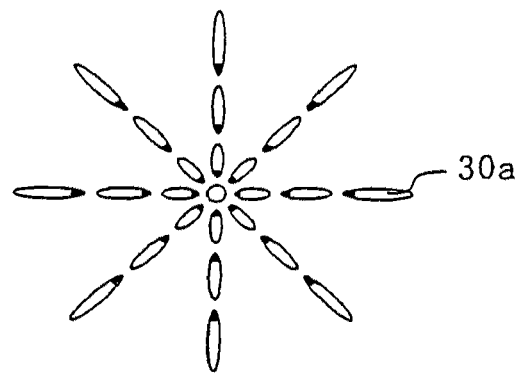
FIGS. 5A, 5B and 5C are diagrams for schematically showing examples of radially-inclined orientation of liquid crystal molecules.
Figure 5B:
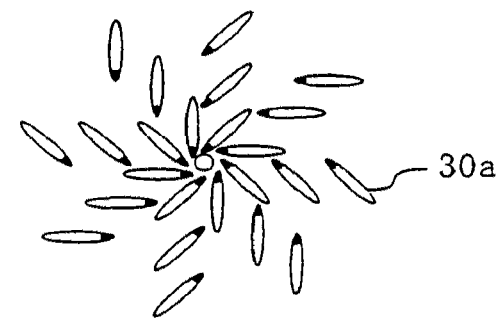
Figure 5C:
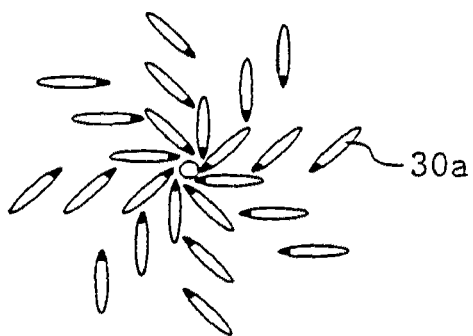

The radially-inclined orientation of the liquid crystal molecules 30a is more stable when it is clockwise or counterclockwise spiral radially-inclined orientation as shown in FIGS. 5B and 5C than when it is simple radially-inclined orientation as shown in FIG. 5A. In such spiral orientation, the orientation directions of the liquid crystal molecules 30a are not spirally changed along the thickness direction of the liquid crystal layer 30 as in the general twist orientation but the orientation directions of the liquid crystal molecules 30a are minimally changed along the thickness direction of the liquid crystal layer 30 when seen in a small region. Specifically, in a cross-section taken in any position along the thickness direction of the liquid crystal layer 30 (in any cross-section on a plane parallel to the layer surface), the orientation is the same as that of FIG. 5B or 5C and twist change along the thickness direction of the liquid crystal layer 30 is minimally caused. However, in the entire liquid crystal domain, the twist change is caused to some extent.

When a chiral agent is added to the nematic liquid crystal material having the negative dielectric anisotropy, the liquid crystal molecules 30a attain the counterclockwise or clockwise spiral radially-inclined orientation as shown in FIG. 5B or 5C around the center of the opening 14a or the unit solid portion 14b' under voltage application. The spiral direction depends upon the kind of chiral agent to be used. Accordingly, by placing the liquid crystal layer 30 within the opening 14 in the spiral radially-inclined orientation state under voltage application, the spiral direction of the radially inclined liquid crystal molecules, 30a around the liquid crystal molecules 30a oriented vertically to the substrate surface can be made the same in all the liquid crystal domains, resulting in realizing even display free from unevenness. Furthermore, since the spiral direction around the liquid crystal molecules 30a oriented vertically to the substrate surface is thus determined, the response speed in applying a voltage through the liquid crystal layer 30 can be improved.

When a chiral agent is added, the orientation of the liquid crystal molecules 30a can be spirally changed along the thickness direction of the liquid crystal layer 30 as in the general twist orientation. In an orientation state where the orientation of the liquid crystal molecules 30a is not spirally changed along the thickness direction of the liquid crystal layer 30, liquid crystal molecules 30a oriented vertically or parallel to the polarization axis of a polarizing plate do not cause a phase difference in incident light, and hence, incident light passing through a region in such an orientation state makes no contribution to the transmittance. In contrast, in the orientation state where the orientation of the liquid crystal molecules 30a is spirally changed along the thickness direction of the liquid crystal layer 30, also liquid crystal molecules 30a oriented vertically or parallel to the polarization axis of the polarizing plate cause a phase difference in incident light, and the optical activity of the light can be utilized. Accordingly, the incident light passing through a region in such an orientation state can make contribution to the transmittance, resulting in realizing a liquid crystal display device capable of bright display.

Although the opening 14a is in the substantially star-shape and the unit solid portion 14b' is in the substantially circular shape and they are disposed in the square lattice arrangement in FIG. 1A, the shapes and the arrangement of the opening 14a and the unit solid portion 14b' are not limited to those shown in FIG. 1A.

Figure 6A:
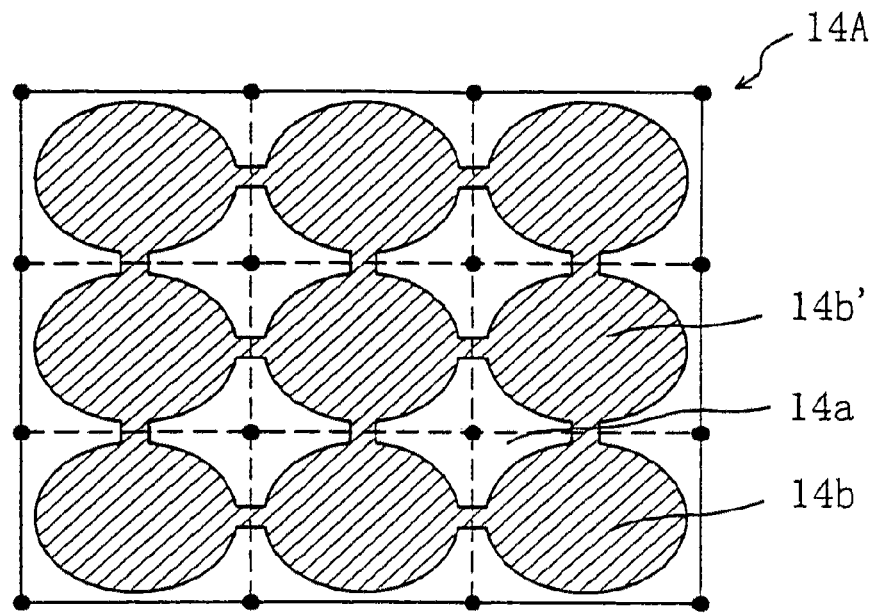
FIGS. 6A and 6B are top views for schematically showing other picture element electrodes usable in the liquid crystal display device of Embodiment 1.
Figure 6B:
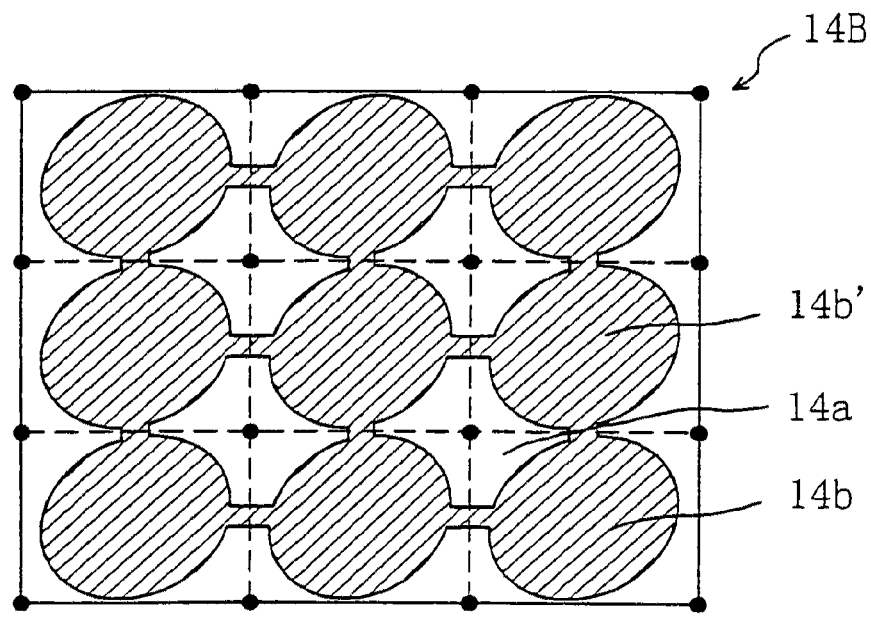

FIGS. 6A and 6B are top views of picture element electrodes 14A and 14B having openings 14a and unit solid portions 14b' in different shapes.

The openings 14a and the unit solid portions 14b' of the picture element electrodes 14A and 14B shown in FIGS. 6A and 6B are in the shapes slightly strained as compared with the opening 14a and the unit solid portion 14b' shown in FIG. 1A. The openings 14a and the unit solid portions 14b' of the picture element electrodes 14A and 14B have a two-fold rotation axis (not a four-fold rotation axis) and are regularly arranged so as to form a rectangular unit lattice. Each opening 14a is in a strained star-shape, and each unit solid portion 14b' is in an elliptical shape (strained circular shape). Also when any of the picture element electrodes 14A and 14B is used, a liquid crystal display device with high display quality and a good viewing angle characteristic can be obtained.

Figure 7A:
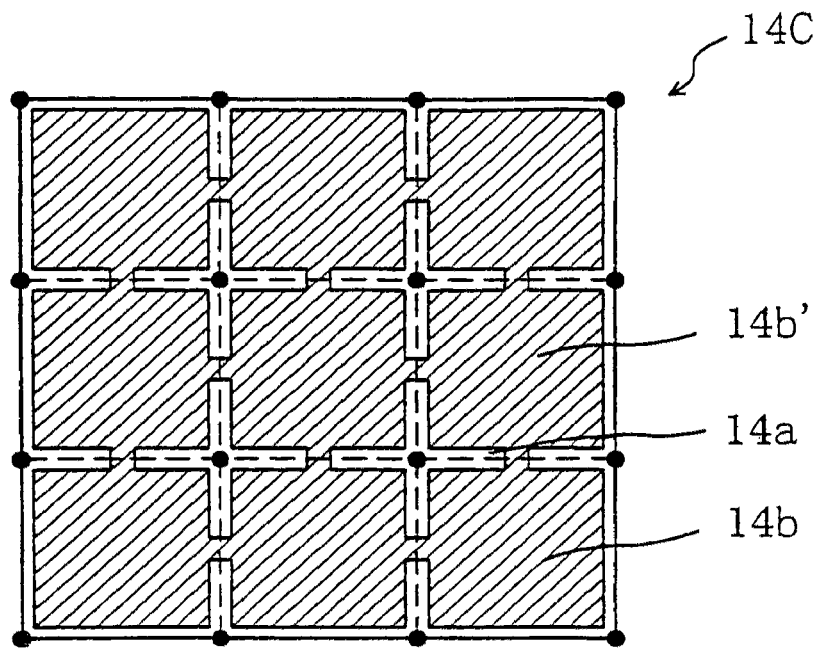
FIGS. 7A and 7B are top views for schematically showing still other picture element electrodes usable in the liquid crystal display device of Embodiment 1.
Figure 7B:
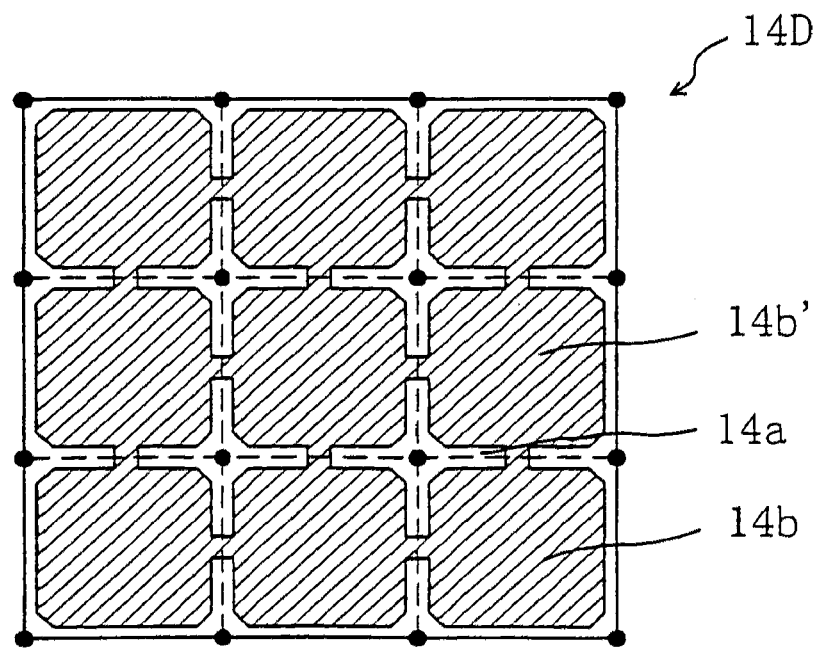

Furthermore, any of picture element electrodes 14C and 14D respectively shown in FIGS. 7A and 7B may be used.

In each of the picture element electrodes 14C and 14D, openings 14a each in substantially a cross-shape are disposed in a square lattice arrangement so as to form a unit solid portion 14b' in substantially a square shape. Needless to say, they may be strained and arranged to form a rectangular unit lattice. Also when such unit solid portions 14b' in a substantially rectangular shape (including a square shape) are thus regularly arranged, a liquid crystal display device having high display quality and a good viewing angle characteristic can be obtained.

However, the opening 14a and/or the unit solid portion 14b' are preferably in a circular or elliptical shape as compared with a rectangular shape because the radially-inclined orientation can be stabilized when they are circular or elliptical. This is probably because the edge portions of the openings 14a are continuously (smoothly) changed when they are circular or elliptical so that the orientation directions of the liquid crystal molecules 30a can be continuously (smoothly) changed.

Figure 8A:
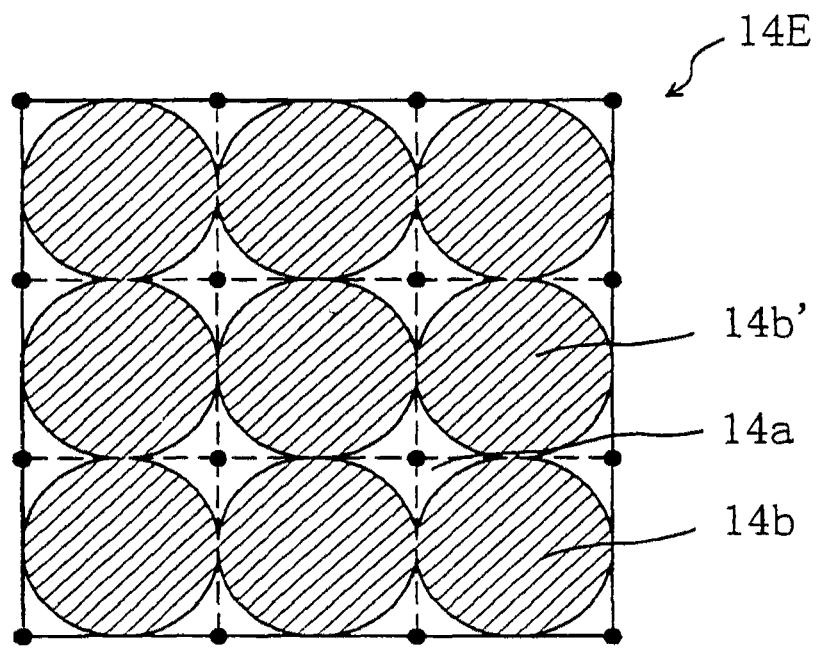
FIGS. 8A and 8B are top views for schematically showing still other picture element electrodes usable in the liquid crystal display device of Embodiment 1.
Figure 8B:
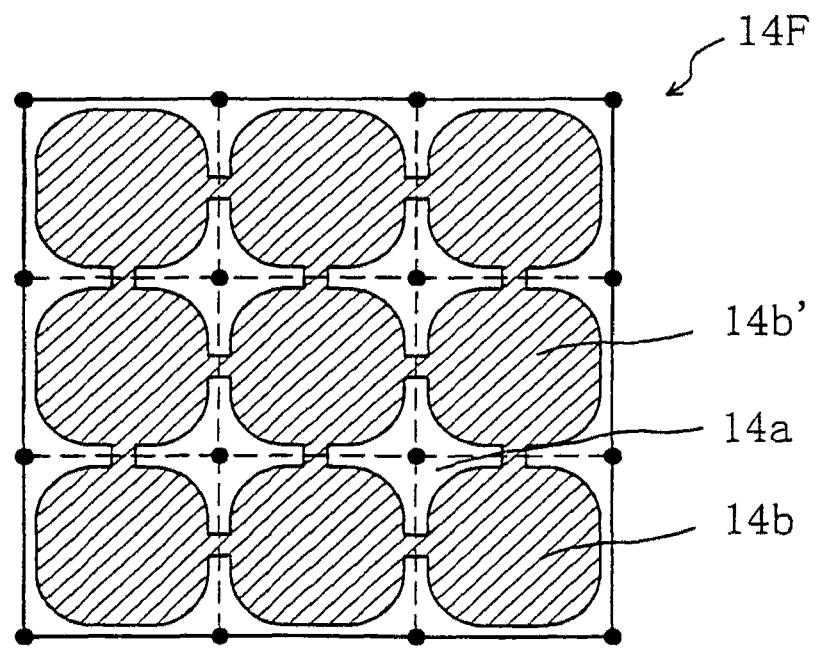

From the viewpoint of the aforementioned continuity of the orientation directions of the liquid crystal molecules 30a, any of picture element electrodes 14E and 14F respectively shown in FIGS. 8A and 8B may be used. The picture element electrode 14E of FIG. 8A is a modification of the picture element electrode 14 of FIG. 1A and has an opening 14a formed from four arcs alone. The picture element electrode 14F of FIG. 8B is a modification of the picture element electrode 14D of FIG. 7B and has an opening 14a having arc-shaped edges adjacent to unit solid portions 14b'. The opening 14a and the unit solid portion 14b' of each of the picture element electrodes 14E and 14F have a four-fold rotation axis and are disposed in the square lattice arrangement (with a four-fold rotation axis). However, the opening 14a and the unit solid portion 14b' may be strained to have a two-fold rotation axis and disposed in rectangular lattice arrangement (with a two-fold rotation axis) as shown in FIGS. 6A and 6B.

Figure 9:
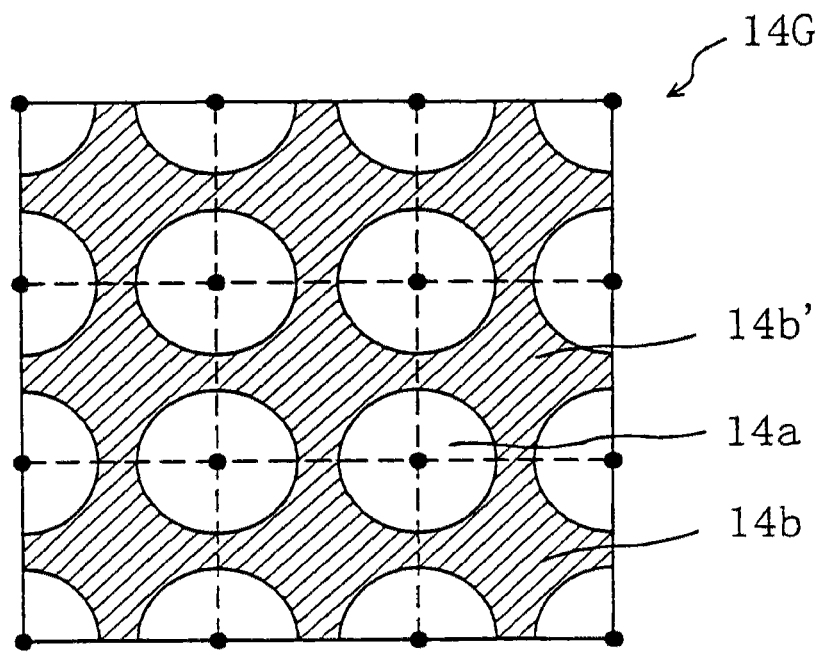
FIG. 9 is a top view for schematically showing still, another picture element electrode usable in the liquid crystal display device of Embodiment 1.
Figure 10A:
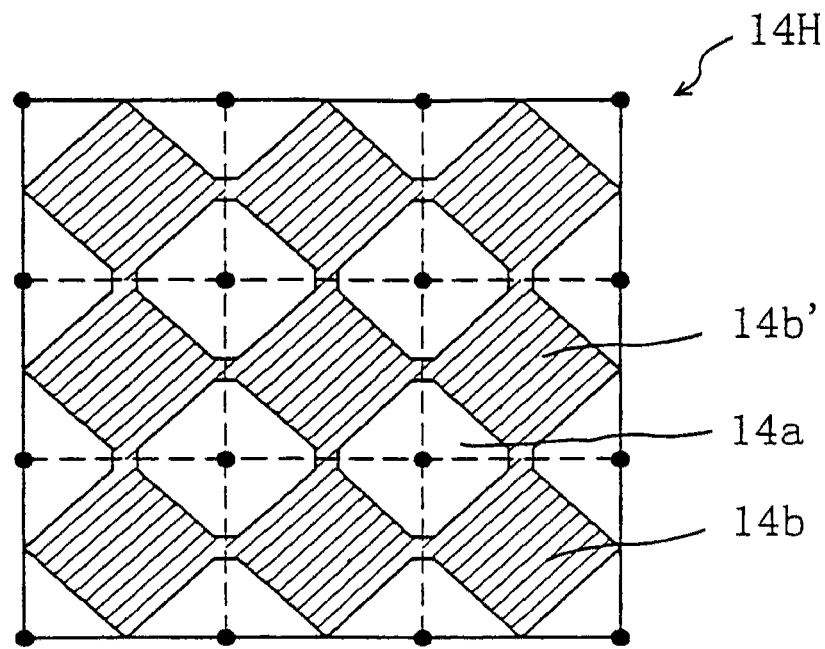
FIGS. 10A and 10B are top views for schematically showing still other picture element electrodes usable in the liquid crystal display device of Embodiment 1.
Figure 10B:
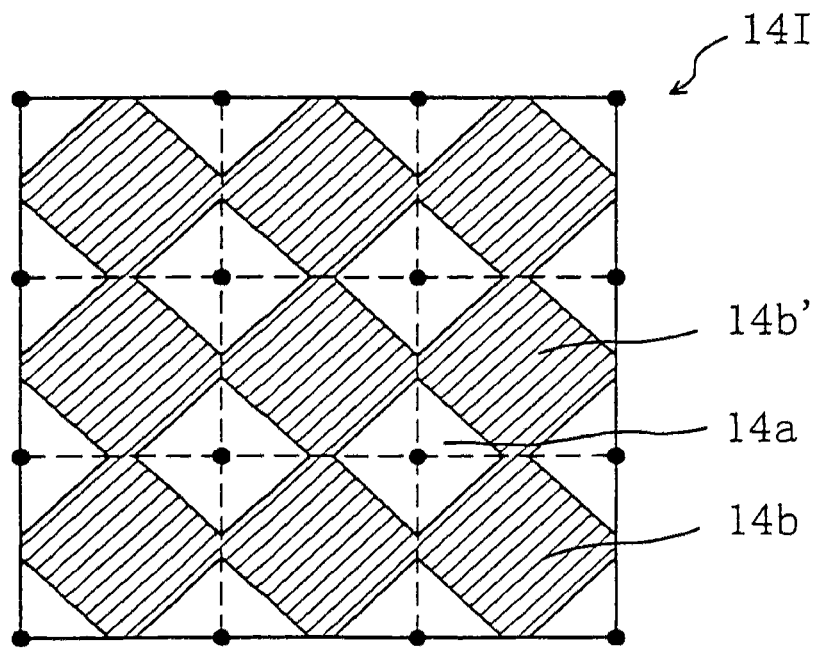

In the aforementioned examples, the opening 14a is formed in the substantially star-shape or the substantially cross-shape, and the unit solid portion 14b' is formed in the substantially circular shape, the substantially elliptical shape, the substantially square (rectangular) shape or the substantially rectangular shape with round corners. In contrast, the relationship between the opening 14a and the unit solid portion 14b' may be negatively/positively reversed. For example, FIG. 9 shows a picture element electrode 14G having a pattern obtained by negatively/positively reversing the pattern of the opening 14a and the unit solid portion 14b of the picture element electrode 14 of FIG. 1A. The picture element electrode 14G having such a negatively/positively reversed pattern can exhibit substantially the same function as the picture element electrode 14 of FIG. 1. In the case where the opening 14a and the unit solid portion 14b' are both in a substantially square shape as in picture element electrodes 14H and 14I respectively shown in FIGS. 10A and 10B, a negatively/positively reversed pattern is the same as the original pattern.

Also in the pattern of FIG. 9 obtained by negatively/positive reversing the pattern of FIG. 1A, some (approximately a half or a quarter) of the opening 14a are preferably formed at the edge portions of the picture element electrode 14 so as to form a rotationally symmetrical unit solid portion 14b'. Thus, the effect derived from the inclined electric field can be obtained also at the edges of the picture element region similarly to the center of the picture element region, so as to realize stable radially-inclined orientation in the entire picture element region.

Now, it will be described whether a negative pattern or a positive pattern should be employed by exemplifying the picture element electrode 14 of FIG. 1A and the picture element electrode 14G of FIG. 9 having the pattern obtained by negatively/positively reversing the pattern of the opening 14a and the unit solid portion 14b' of the picture element electrode 14.

In either of the negative and positive patterns, the length of the edges of the opening 14a is the same. Accordingly, there is no difference between these patterns in the function to generate the inclined electric field. However, the area ratio of the unit solid portions 14b' (the ratio to the entire area of the picture element electrode 14) may be different in these patterns. Specifically, the patterns may be different in the area of a solid portion 14b (where the conducting film actually exists) for generating the electric field applied to the liquid crystal molecules of the liquid crystal layer.

A voltage applied to a liquid crystal domain formed in the opening 14a is lower than a voltage applied to a liquid crystal domain formed in the solid portion 14b. Therefore, for example, in normally black mode display, the liquid crystal domain formed in the opening 14a is darker. In other words, as the area ratio of the opening 14a is higher, the display luminescence tends to be lowered. Accordingly, the area ratio of the solid portion 14b is preferably higher.

It depends upon the pitch (size) of the unit lattice in which of the pattern of FIG. 1A and the pattern of FIG. 9 the area ratio of the solid portion 14b is higher.

Figure 11A:
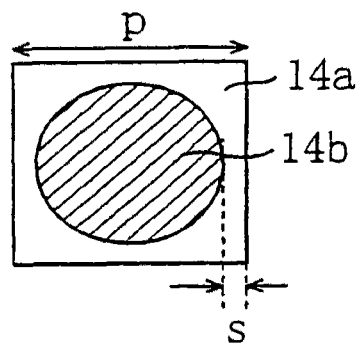
FIG. 11A is a diagram for schematically showing a unit lattice of a pattern shown in FIG. 1A.
Figure 11B:
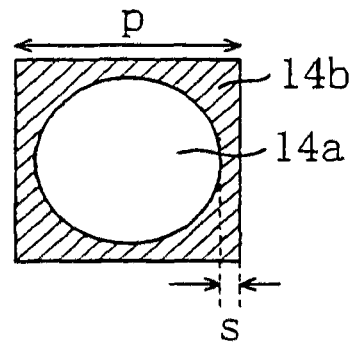
FIG. 11B is a diagram for schematically showing a unit lattice of a pattern shown in FIG. 9.

FIG. 11A shows the unit lattice of the pattern of FIG. 1A, and FIG. 11B shows the unit lattice (whereas having the opening 14a as the center) of the pattern of FIG. 9. In FIG. 11A, portions for mutually connecting the adjacent unit solid portions 14b' (namely, branch portions extending in the four directions from the circular portion) in FIG. 1 are omitted. It is herein assumed that the length (pitch) of one side of the square unit lattice is p and that the length of space between the opening 14a or the unit solid portion 14b' and the unit lattice (side space) is s.

A variety of picture element electrodes 14 respectively having different pitches p and different side spaces s are fabricated, so as to examine the stability of the radially-inclined orientation and the like. As a result, it is first found that, in order to generate an inclined electric field necessary for attaining the radially-inclined orientation by using a picture element electrode 14 having the pattern of FIG. 11A (hereinafter referred to as the positive pattern), the side space s should be approximately 2.75 μm or more. On the other hand, with respect to a picture element electrode 14 having the pattern of FIG. 11B (hereinafter referred to as the negative pattern), it is found that the side space s should be approximately 2.25 μm or more for generating the inclined electric field for attaining the radially-inclined orientation. With the side spaces s set to these lower limit values, the area ratios of the solid portion 14b obtained by varying the value of the pitch p are examined. The results are shown in Table 1 and FIG. 11C.

TABLE 1

| Pitch p (μm) | Area ratio of solid portion (%) | |
|---|---|---|
| | Positive pattern | Negative pattern |
| 20 | 41.3 | 52.9 |
| 25 | 47.8 | 47.2 |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

Figure 11C:
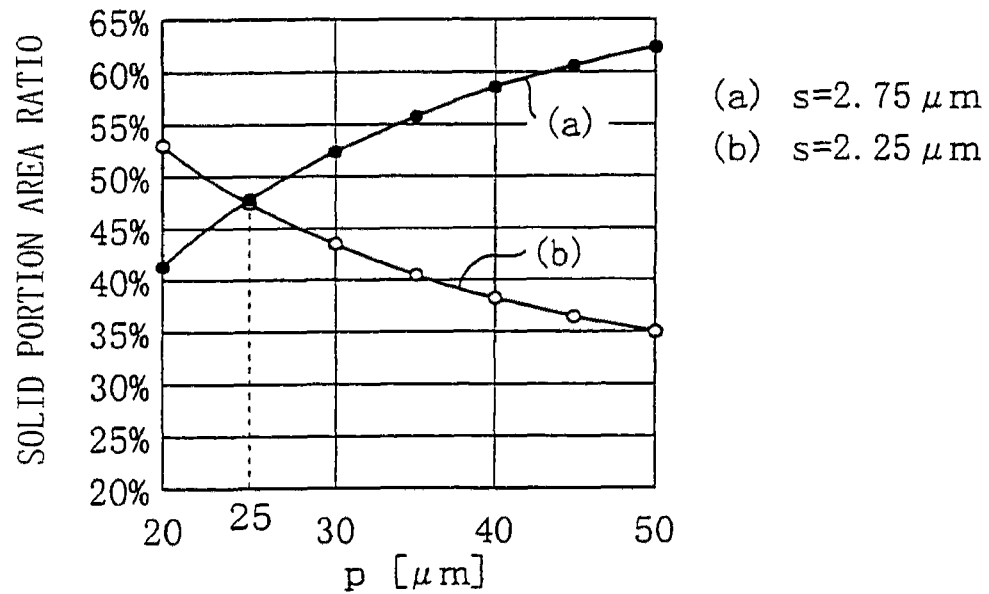
FIG. 11C is a graph for showing the relationship between a pitch p and an area ratio of a solid portion.

As is understood from Table 1 and FIG. 11C, when the pitch p is approximately 25 μm or more, the area ratio of the solid portion 14b is higher in the positive pattern (shown in FIG. 11A), and when the pitch p is smaller than approximately 25 μm, the area ratio of the solid portion 14b is higher in the negative pattern (shown in FIG. 11B). Accordingly, from the viewpoint of the display luminescence and the stability of orientation, the pattern to be employed is changed depending upon whether the pitch p is larger than or smaller than approximately 25 μm. For example, in the case where three or less unit lattices are formed in the lateral direction of a picture element electrode 14 with a width of 75 μm, the positive pattern as shown in FIG. 11A is preferred, and in the case where four or more unit lattices are formed, the negative pattern as shown in FIG. 11B is preferred. In employing any of the patterns other than the exemplified patterns of FIGS. 11A and 11B, a positive pattern or a negative pattern is appropriately selected so as to attain a higher area ratio of the solid portion 14b.

The number of unit lattices is obtained as follows: The size of a unit lattice is calculated so that one, two or a larger integral number of unit lattices can be arranged along the width or length of the picture element electrode 14. The area ratio of a solid portion is calculated with respect to each size of the unit lattice, so as to select the unit lattice size for maximizing the area ratio of the solid portion. However, the orientation-regulating force obtained by the inclined electric field is degraded and the stable radially-inclined orientation is difficult to attain when the diameter of the unit solid portion 14b' is smaller than 15 μm in employing a positive pattern and when the diameter of the opening 14a is smaller than 15 μm in employing a negative pattern. The lower limit values of these diameters are obtained when the liquid crystal layer 30 has a thickness of approximately 3 μm. In the case where the liquid crystal layer 30 has a smaller thickness, the stable radially-inclined orientation can be attained even when the diameter of the unit solid portion 14b' or the opening 14a is smaller than the lower limit value. In the case where the liquid crystal layer 30 has a larger thickness, the lower limits value of the diameter of the unit solid portion 14b' or the opening 14a required for attaining the stable radially-inclined orientation is larger than the aforementioned lower limit value.

As described in detail in Embodiment 2 below, the stability of the radially-inclined orientation can be improved by forming a protrusion within the opening 14a. The aforementioned conditions are applied when no protrusion is formed.

With respect to the positive pattern as shown in FIG. 11A, a variety of picture element electrodes 14 respectively having different shapes of the unit solid portion 14b' and different side spaces s are fabricated, so as to examine the stability of the radially-inclined orientation and the transmittance. Also, the orientation stability obtained by changing the cell thickness (the thickness of the liquid crystal layer 30) is also examined. In the examinations described below, a liquid crystal display device of a normally black mode equipped with a 18.1-inch SXGA panel is used.

First, picture element electrodes 14 including unit solid portions 14b' respectively in the shapes as shown in FIGS. 12A, 12B, 12C and 12D are evaluated for their orientation stability with the pitch p set to 42.5 μm, the side space s set to 4.25 μm, 3.50 μm or 2.75 μm and the cell thickness set to 3.70 μm or 4.15 μm. In the 18.1-inch SXGA panel, the unit lattices can be most efficiently arranged (without wasting any area of the picture element region) when the pitch p is 42.5 μm.

Figure 12A:
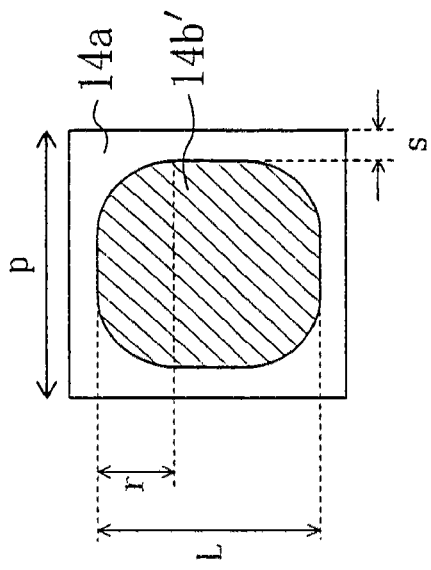
FIG. 12A is a diagram for schematically showing a unit lattice of a picture element electrode having a unit solid portion formed in a substantially circular shape.
Figure 12B:
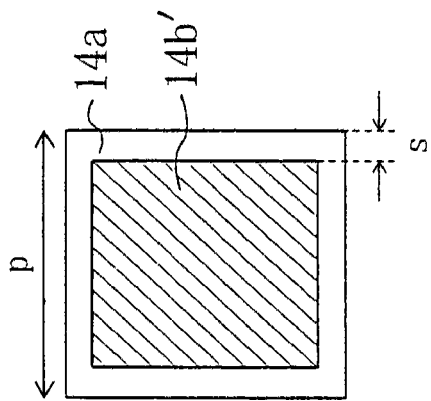
FIGS. 12B and 12C are diagrams for schematically showing unit lattices of picture element electrodes having unit solid portions formed in a substantially square shape with substantially arc-shaped corners.
Figure 12C:
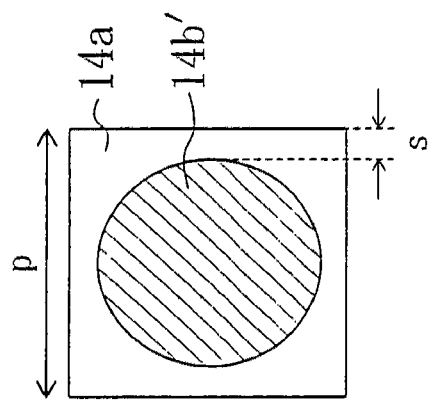
Figure 12D:
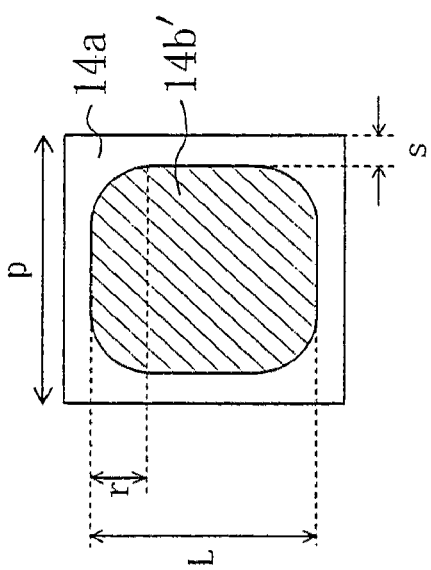
FIG. 12D is a diagram for schematically showing a unit lattice of a picture element electrode having a unit solid portion formed in a substantially square shape.

FIG. 12A is a diagram for schematically showing the unit lattice of a picture element electrode 14 having a unit solid portion 14b' in a substantially circular shape, FIGS. 12B and 12C are diagrams for schematically showing the unit lattices of picture element electrodes 14 each having a unit solid portion 14b' in a substantially square shape with substantially arc-shaped corners, and FIG. 12D is a diagram for schematically showing the unit lattice of a picture element electrode 14 including a unit solid portion 14b' in a substantially square shape. The unit solid portions of FIGS. 12B and 12C are different from each other in the ratio between a radius r of curvature approximately expressing the shape of the substantially arc-shaped corner and a length L of one side of the unit solid portion, which is 1:3 in FIG. 12B and 1:4 in FIG. 12C. In FIGS. 12A, 12B, 12C and 12D, the portions mutually connecting the adjacent unit solid portions 14b' in FIG. 1 (the branch portions extending toward the four directions from the circular portion) are omitted.

The degree of the orientation stability can be evaluated by, for example, examining the presence of a residual image in displaying a dynamic image. In displaying a dynamic image in which a black box is moving with a intermediate gray scale background, the degree of the orientation stability tends to affect the display. When the degree of the orientation stability is comparatively low, a white tailing residual image may occur. This white tailing residual image may be caused when a nematic liquid crystal material including a chiral agent is used as the liquid crystal material. The cause of the occurrence of the white tailing residual image will be described later.

Table 2 shows the results of visual evaluation of the degree of occurrence of the white tailing residual image obtained with the aforementioned various parameters varied. In Table 2, the shapes of the unit solid portions 14b' respectively shown in FIGS. 12A, 12B, 12C and 12D are designated as a circle, a barrel A, a barrel B and a square. Also, in Table 2, ⊚ denotes that the tailing residual image is not observed, ○ denotes that the tailing residual image is minimally observed and Δ denotes that the tailing residual image is observed.

TABLE 2

| | Side space s (μm) | | | | | |
|---|---|---|---|---|---|---|
| | 4.25 | | 3.50 | | 2.75 | |
| | Cell thickness(μm) | | | | | |
| | 3.70 | 4.15 | 3.70 | 4.15 | 3.70 | 4.15 |
| Circle | ⊚ | ⊚ | ⊚ | ⊚ | ⊚ | ○ |
| Barrel A | ⊚ | ⊚ | ⊚ | Δ | Δ | Δ |
| Barrel B | ⊚ | ⊚ | Δ | Δ | Δ | Δ |
| Square | ⊚ | Δ | Δ | Δ | Δ | Δ |

As shown in Table 2, with respect to the shape of the unit solid portion 14b', the orientation stability is higher in the order of the circle, the barrel A, the barrel B and the square. This is because the continuity in the orientation direction of the liquid crystal molecules 30a in the radially-inclined orientation state is higher as the shape of the unit solid portion 14b' is more approximate to a circle. Also as shown in Table 2, the orientation stability is higher as the side space s is larger. This is because the effect to control the orientation by the inclined electric field is more remarkably exhibited as the side space s is larger. Furthermore, the orientation stability is higher as the cell thickness is smaller. This is because the effect to control the orientation by the inclined electric field is more remarkably exhibited as the cell thickness is smaller.

In order to evaluate the orientation stability, the degree of occurrence of unevenness through pressure (pressure residual image) is also evaluated. As a result, it is confirmed that the orientation stability is higher as the cell thickness is smaller.

The pressure residual image is evaluated by examining the degree at which orientation turbulence caused by applying a stress to the panel surface of the liquid crystal display device remains as display unevenness after removing the stress.

Next, the transmittance is evaluated with the various parameters varied as in the evaluation of the orientation stability. Table 3 shows the results of the transmittance measured in white display (under application of a voltage of 6.0 V through the liquid crystal layer) in a liquid crystal display device with a cell thickness of 3.70 μm. Table 3 shows transmittance ratios calculated by assuming that the transmittance of a liquid crystal display device using a picture element electrode 14 including a unit solid portion 14b' in the shape of the barrel B and having a side space s of 4.25 μm is 1. Also, a parenthesized numerical value in Table 3 is an actually measured value of the transmittance (namely, the front transmittance obtained by assuming that the light intensity of a backlight source in white display is 100).

TABLE 3

| | Side space s (μm) | | |
|---|---|---|---|
| | 4.25 | 3.50 | 2.75 |
| Circle | 0.885 | 0.917 | 0.940 |
| | (3.06) | (3.17) | (3.25) |
| Barrel A | 0.953 | 0.989 | 1.024 |
| | (3.29) | (3.42) | (3.54) |
| Barrel B | 1.000 | 1.031 | |
| | (3.45) | (3.56) | |
| Square | 1.028 | | |
| | (3.55) | | |

As shown in Table 3, with respect to the shape of the unit solid portion 14b', the transmittance is higher in the order of the square, the barrel B, the barrel A and the circle. This is because, when the side space s is the same, the area ratio of the solid portion 14b is higher as the shape of the unit solid portion 14b' is more approximate to a square, and hence, the area (defined on a plane seen from the substrate normal direction) of a portion of the liquid crystal layer directly affected by the electric fields generated by the electrodes is larger, resulting in increasing the effective aperture ratio. Also as shown in Table 3, the transmittance is higher as the side space s is smaller. This is because as the side space s is smaller, the area ratio of the solid portion 14b is higher, and hence, the effective aperture ratio is higher.

As described above, the orientation stability is higher as the shape of the unit solid portion 14b' is more approximate to a circle and as the side space s is larger. Also, the orientation stability is higher as the cell thickness is smaller.

Furthermore, since the effective aperture ratio is higher as the area ratio of the solid portion 14b is higher, the transmittance is higher as the shape of the unit solid portion 14b' is more approximate to a square (or a rectangle) and as the side space s is smaller.

Accordingly, in consideration of desired orientation stability and transmittance, the shape of the unit solid portion 14b', the side space s and the cell thickness are determined.

When the unit solid portion 14b' is in a substantially square shape with substantially arc-shaped corners as shown in FIGS. 12B and 12C, both the orientation stability and the transmittance can be comparatively high. Needless to say, the aforementioned effect can be attained when the unit solid portion 14b' is in a substantially rectangular shape with substantially arc-shaped corners. The corner of the unit solid portion 14b' formed from a conducting film may not be in an arc-shape precisely due to the restriction in fabrication process but may be in an obtuse-angled polygonal shape (a shape formed from a plurality of angles exceeding 90 degrees). The corner may be formed not only in the shape of a quarter arc or a regular polygonal shape (for example, part of a regular polygon) but also in the shape of a slightly strained arc (such as a part of an ellipse) or a strained polygonal shape. Alternatively, the corner may be in a shape obtained by combining a curve and an obtuse angle. The substantially arc-shaped corner herein includes corners in any of the aforementioned shapes. For the same reason in the production process, also in the unit solid portion 14b' in the substantially circular shape as shown in FIG. 12A, the shape may not be a precise circle but may be a polygonal shape or a slightly strained circle.

In the liquid crystal display devices whose orientation stability and transmittance are listed in Tables 2 and 3, both the orientation stability and the transmittance can be comparatively high in using a picture element electrode 14 including a unit solid portion in the shape of the barrel B and having a side space s of 4.25 μm.

The structure of the liquid crystal display device of Embodiment 1 is substantially the same as that of a conventional vertical alignment type liquid crystal display device except that the picture element electrode 14 is an electrode having the openings 14a, and the present liquid crystal display device can be fabricated by any of the known fabrication methods.

In order to vertically orient the liquid crystal molecules having the negative dielectric anisotropy, the vertical alignment layers (not shown) are typically formed on the faces of the picture element electrode 14 and the counter electrode 22 facing the liquid crystal layer 30.

As the liquid crystal material, a nematic liquid crystal material having the negative dielectric anisotropy is used. Also, a liquid crystal display device of a guest-host mode may be fabricated by adding a dichroic pigment. A liquid crystal display device of a guest-host mode does not require a polarizing plate.

Embodiment 2

Figure 13A:
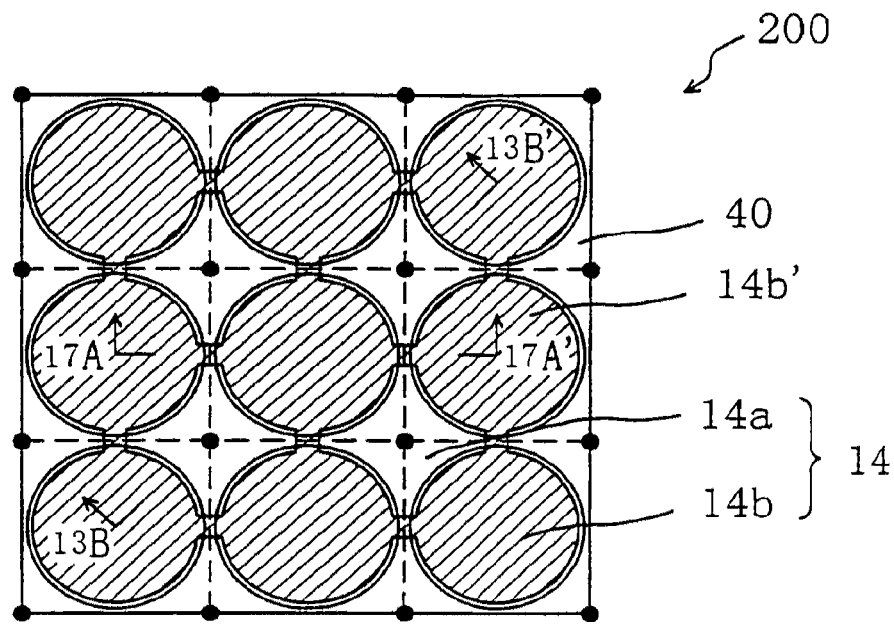
FIG. 13A is a top view for schematically showing the structure of one picture element region of a liquid crystal display device 200 according to Embodiment 2 of the invention.
Figure 13B:
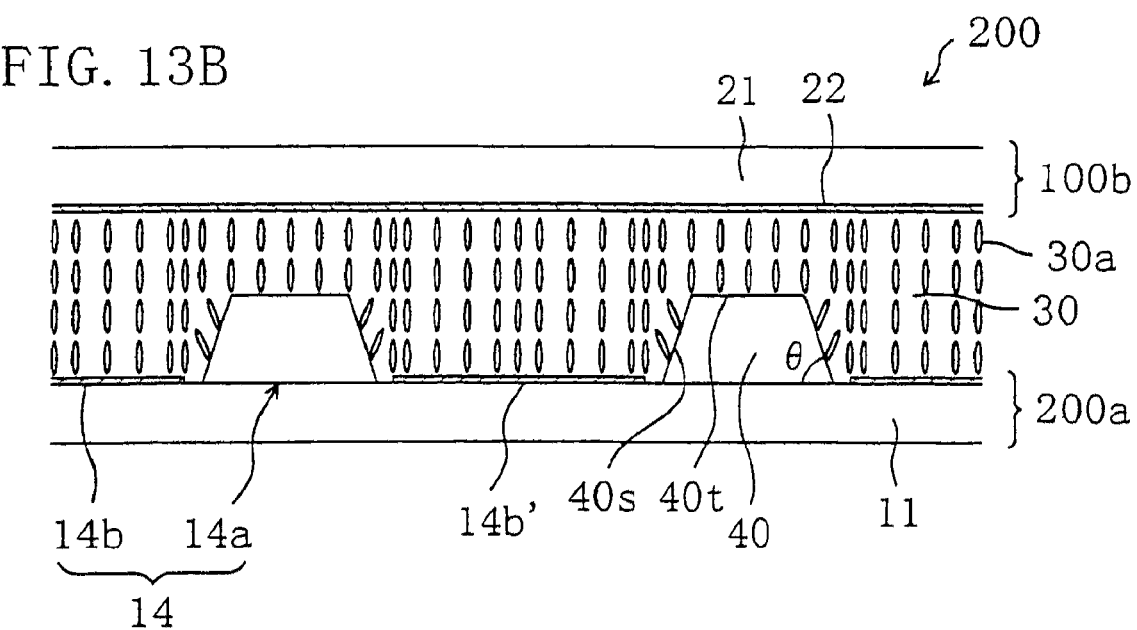
FIG. 13B is a cross-sectional view thereof taken along line 13B-13B' of FIG. 13A.

The structure of one picture element region of a liquid crystal display device 200 according to Embodiment 2 of the invention will now be described with reference to FIGS. 13A and 13B. In all the drawings referred to below, like reference numerals are used to refer to like elements having substantially the same functions as those of the liquid crystal display device 100, so as to omit the description. FIG. 13A is a top view seen from the substrate normal direction, and FIG. 13B is a cross-sectional view taken along line 13B-13B' of FIG. 13A. FIG. 13B shows a state where no voltage is applied through the liquid crystal layer.

As shown in FIGS. 13A and 13B, the liquid crystal display device 200 is different from the liquid crystal display device 100 of Embodiment 1 shown in FIGS. 1A and 1B in a TFT substrate 200a including a protrusion 40 within each opening 14a of the picture element electrode 14. On the protrusion 40, a vertical alignment film (not shown) is provided.

The cross-sectional structure of the protrusion 40 taken along a plane direction of the substrate 11 is the same as the shape of the opening 14a as is shown in FIG. 13A, and is herein a substantially star-shape. The adjacent protrusions 40 are mutually connected, so as to completely surround the unit solid portion 14b' substantially circularly. The cross-sectional structure of the protrusion 40 taken vertically to the plane direction of the substrate 11 is in a trapezoidal shape as shown in FIG. 13B. Specifically, the protrusion has a top face 40t parallel to the substrate surface and side faces 40s inclined at a taper angle θ (<90° against the substrate face. Since the vertical alignment film (not shown) is formed so as to cover the protrusion 40, the side face 40s of the protrusion 40 has orientation-regulating force for orienting the liquid crystal molecules 30a of the liquid crystal layer 30 in the same direction as the orientation-regulating direction of the inclined electric field, so as to stabilize the radially-inclined orientation.

This function of the protrusion 40 will now be described with reference to FIGS. 14A, 14B, 14C, 14D, 15A and 15B.

First, the relationship between the orientation of a liquid crystal molecule 30a and the shape of a face having a vertical alignment property will be described with reference to FIGS. 14A, 14B, 14C and 14D.

Figure 14A:
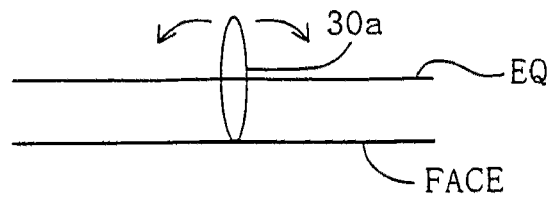
FIGS. 14A, 14B, 14C and 14D are schematic diagrams for explaining the relationship between orientation of a liquid crystal molecule 30a and the shape of a surface with a vertical alignment property.

As shown in FIG. 14A, a liquid crystal molecule 30a positioned on a horizontal face is oriented vertically to the face by the orientation-regulating force of the face having the vertical alignment property (typically, a surface of a vertical alignment film). When an electric field expressed by an equipotential line EQ vertical to the axial direction of the liquid crystal molecule 30a is applied to this vertically oriented liquid crystal molecule 30a, torque is, applied to the liquid crystal molecule 30a for inclining it in the clockwise direction or in the counterclockwise direction in equivalent probabilities. Accordingly, in the liquid crystal layer 30 disposed between parallel plate type electrodes opposing each other, the torque is applied in the clockwise direction to some liquid crystal molecules 30a and in the counterclockwise direction to other liquid crystal molecules 30a. As a result, the change to the orientation state in accordance with the voltage applied through the liquid crystal layer 30 sometimes may not be smoothly caused.

Figure 14B:
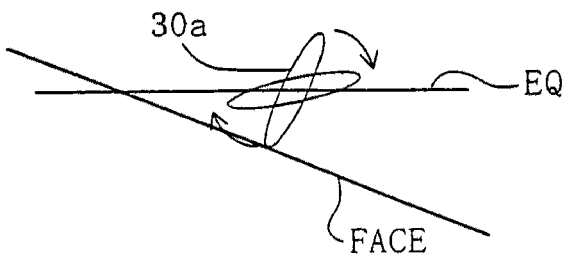
Figure 14C:
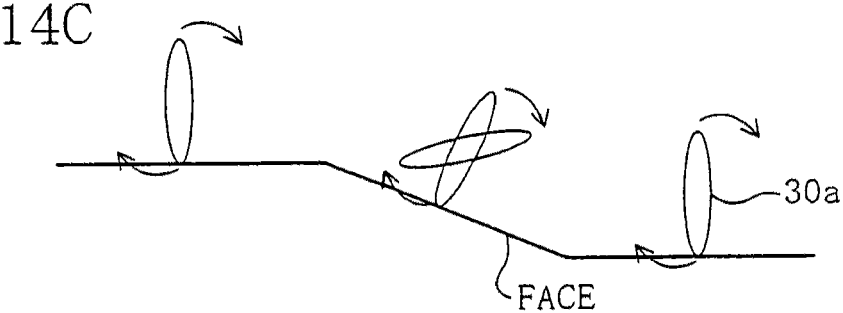

As shown in FIG. 14B, when the electric field expressed by a horizontal equipotential line EQ is applied to a liquid crystal molecules 30a oriented vertically to an inclined face, the liquid crystal molecule 30a is inclined in a direction for orienting parallel to the equipotential line EQ with smaller inclination (in the clockwise direction in the drawing). Furthermore, as shown in FIG. 14C, a liquid crystal molecule 30a oriented vertically to the horizontal face is inclined in the same direction (the clockwise direction) as another liquid crystal molecule 30a positioned on the inclined face so as to make continuous (match) their orientations.

Figure 14D:
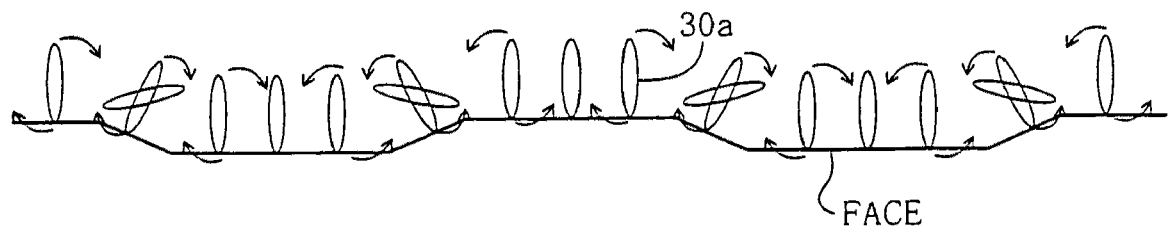

As shown in FIG. 14D, on an irregular face whose cross-section is in a continuous trapezoidal shape, liquid crystal molecules 30a positioned on the top or lower horizontal faces, are oriented so as to match with the orientation directions of liquid crystal molecules 30a positioned on the inclined faces.

In the liquid crystal display device of this embodiment, the radially-inclined orientation is stabilized by making the orientation-regulating direction obtained by such a face shape (protrusion) accord with the orientation-regulating direction obtained by the inclined electric field.

Figure 15A:
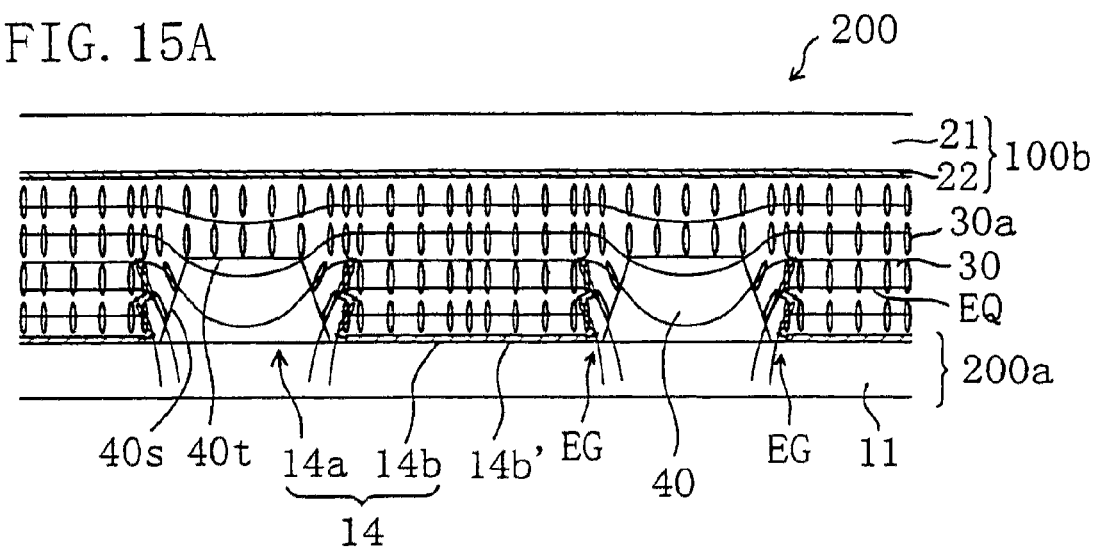
FIGS. 15A and 15B are diagrams for showing states where a voltage is applied through a liquid crystal layer 30 of the liquid crystal display device 200, and specifically FIG. 15A schematically shows a state where orientation starts to change (ON initial state) and FIG. 15B schematically shows a stationary state.
Figure 15B:
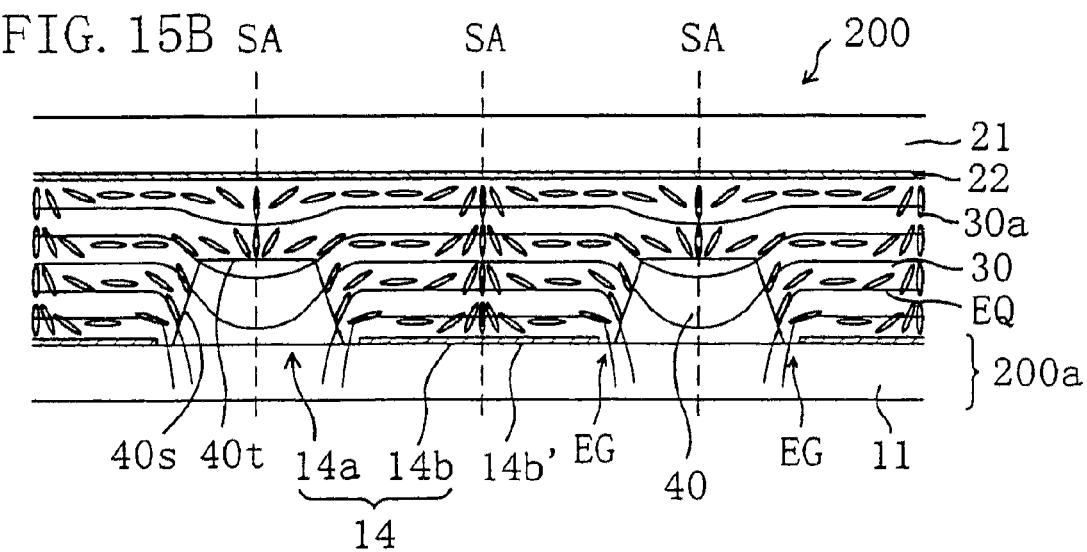

FIGS. 15A and 15B show states obtained by applying a voltage through the liquid crystal layer 30 of FIG. 13B, and specifically, FIG. 15A schematically shows the state where the orientation of the liquid crystal molecules 30a starts to change in accordance with the voltage applied through the liquid crystal layer 30 (the ON initial state) and FIG. 15B schematically shows the state where the orientation of the liquid crystal molecules 30a changed in accordance with the applied voltage attains the stationary state. In FIGS. 15A and 15B, a line EQ denotes an equipotential line.

When the picture element electrode 14 and the counter electrode 22 have the same potential (namely, when no voltage is applied through the liquid crystal layer 30), the liquid crystal molecules 30a within the picture element region are oriented vertically to the faces of the substrates 11 and 21 as shown in FIG. 13B. At this point, a liquid crystal molecule 30a in contact with the vertical alignment film (not shown) formed on the side face 40s of the protrusion 40 is oriented vertically to the side face 40s, and a liquid crystal molecule 30a in the vicinity of the side face 40s is oriented to be inclined as shown in the drawing due to the interaction (property as an elastic substance) with the liquid crystal molecules 30a around.

When a voltage is applied through the liquid crystal layer 30, potential gradient expressed by the equipotential line EQ of FIG. 15A is formed. The equipotential line EQ is parallel to the faces of the solid portion 14b and the counter electrode 22 within a region of the liquid crystal layer 30 positioned between the solid portion 14b of the picture element electrode 14 and the counter electrode 22 and drops in a region corresponding to the opening 14a of the picture element electrode 14, and an inclined electric field expressed by an inclined portion of the equipotential line EQ is formed in a region of the liquid crystal layer 30 at the edge portion of the opening 14a (the inside periphery of the opening 14a including the boundary).

Owing to this inclined electric field, a liquid crystal molecule 30a positioned on the edge portion EG is inclined (rotated) in the clockwise direction at the edge portion EG on the right hand side in the drawing and in the counterclockwise direction at the edge portion EG on the left hand side in the drawing as described above, so as to orient parallel to the equipotential line EQ. The orientation-regulating direction by this inclined electric field accords with the orientation-regulating direction obtained by the side face 40s positioned at each edge portion EG.

As described above, when the change of the orientation starting from the liquid crystal molecules 30a positioned on the inclined portions of the equipotential line EQ is proceeded to attain the stationary state, the orientation state schematically shown in FIG. 15B is obtained. The liquid crystal molecules 30a positioned in the vicinity of the center of the opening 14a, namely, in the vicinity of the top face 40t of the protrusion 40, are affected substantially equally by the orientations of the liquid crystal molecules 30a positioned at the opposing edge portions EG of the opening 14a, and hence keep the orientation vertical to the equipotential line EQ. The liquid crystal molecules 30a positioned away from the center of the opening 14a (namely, the top face 40t of the protrusion 40) are inclined due to the influence of the orientation of the liquid crystal molecules 30a positioned at the closer edge portion EG, so as to form the inclined orientation symmetrical about the center SA of the opening 14a (the top face 40t of the protrusion 40). Also, in a region corresponding to the unit solid portion 14b' substantially surrounded by the openings 14a and the protrusion 40, the inclined orientation symmetrical about the center SA of the unit solid portion 14b' is formed.

In this manner, also in the liquid crystal display device 200 of Embodiment 2, liquid crystal domains having the radially-inclined orientation are formed correspondingly to the openings 14a and the unit solid portions 14b' in the same manner as in the liquid crystal display device 100 of Embodiment 1. Since the protrusion 40 is formed so as to completely surround the unit solid portion 14b' substantially circularly, a liquid crystal domain is formed correspondingly to the substantially circular region surrounded by the protrusion 40. Furthermore, the side face of the protrusion 40 formed within the opening 14a works to incline the liquid crystal molecules 30a positioned in the vicinity of the edge portion EG of the opening 14a in the same direction as the orientation direction caused by the inclined electric field, resulting in stabilizing the radially-inclined orientation.

Naturally, the orientation-regulating force obtained by the inclined electric field works merely under application of voltage and depends upon the magnitude of the electric field (i.e., the magnitude of the applied voltage). Accordingly, when the electric field has small magnitude (namely, when the applied voltage is low), the orientation-regulating force by the inclined electric field is weak, and hence, the radially-inclined orientation may be destroyed due to floating of the liquid crystal material when an external force is applied to the liquid crystal panel. Once the radially-inclined orientation is destroyed, the radially-inclined orientation cannot be restored until a voltage sufficiently high for generating the inclined electric field exhibiting sufficiently strong orientation-regulating force is applied. In contrast, the orientation-regulating force by the side face 40s of the protrusion 40 works regardless of the applied voltage and is very strong as is known as an anchoring effect of an alignment film. Accordingly, even when the radially-inclined orientation is once destroyed due to the floating of the liquid crystal material, the liquid crystal molecules 30a positioned in the vicinity of the side face 40s of the protrusion 40 keep their orientation directions the same as those in the radially-inclined orientation. Therefore, the radially-inclined orientation can be easily restored when the floating of the liquid crystal material is stopped.

In this manner, the liquid crystal display device 200 of Embodiment 2 has not only the same characteristic as that of the liquid crystal display device 100 of Embodiment 1 but also a characteristic of high resistance against an external force. Accordingly, the liquid crystal display device 200 is suitably used in a PC or PDA generally used as portable equipment to which an external force is frequently applied.

When the protrusion 40 is formed from a dielectric substance with high transparency, the protrusion 40 can, advantageously increase the contribution to display of a liquid crystal domain formed correspondingly to the opening 14a. On the other hand, when the protrusion 40 is formed from an opaque dielectric substance, light leakage derived from retardation of the liquid crystal molecules 30a oriented to be inclined owing to the side face 40s of the protrusion can be advantageously prevented. It can be determined depending upon the application of the liquid crystal display device which type of dielectric substance is used. In either case, when the dielectric substance is a photosensitive resin, a step of patterning the dielectric substance in accordance with the pattern of the openings 14a can be advantageously simplified. In order to attain sufficient orientation-regulating force, the height of the protrusion 40 is preferably within a range between approximately 0.5 μm and approximately 2 μm when the liquid crystal layer 30 has a thickness of approximately 3 μm. In general, the height of the protrusion 40 is preferably in a range between approximately 1/6 through approximately 2/3 of the thickness of the liquid crystal layer 30.

As described above, the liquid crystal display device 200 includes the protrusion 40 within the opening 14a of the picture element electrode 14, and the side face 40s of the protrusion 40 has the orientation-regulating force for orienting the liquid crystal molecules 30a of the liquid crystal layer 30 in the same direction as the orientation-regulating direction obtained by the inclined electric field. Preferable conditions for the side face 40s to attain the orientation-regulating force in the same direction as the orientation-regulating direction of the inclined electric field will now be described with reference to FIGS. 16A, 16B and 16C.

Figure 16A:
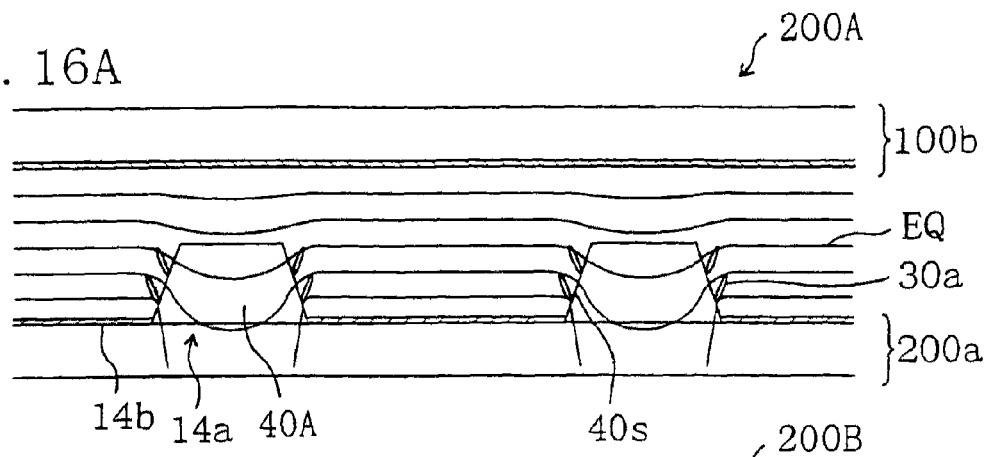
FIGS. 16A, 16B and 16C are respectively schematic cross-sectional views of liquid crystal display devices 200A, 200B and 200C of Embodiment 2 that are different in the arrangement of an opening and a protrusion.
Figure 16B:
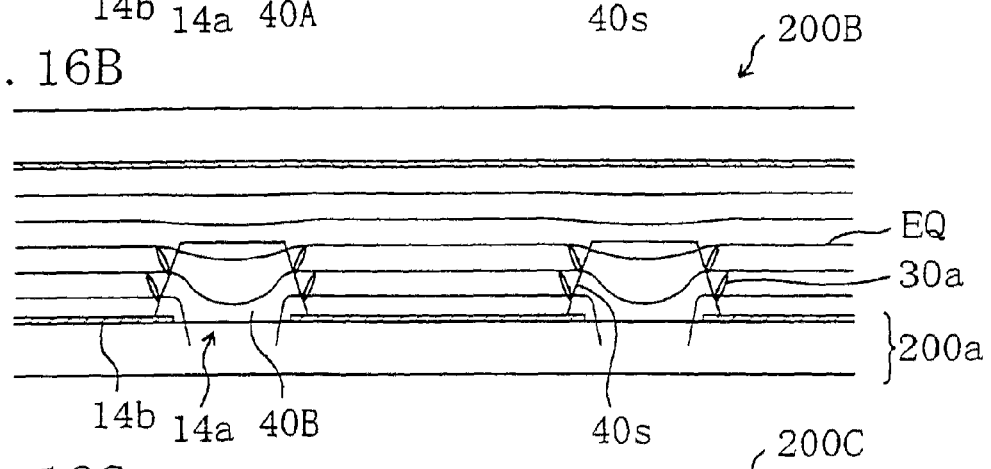
Figure 16C:
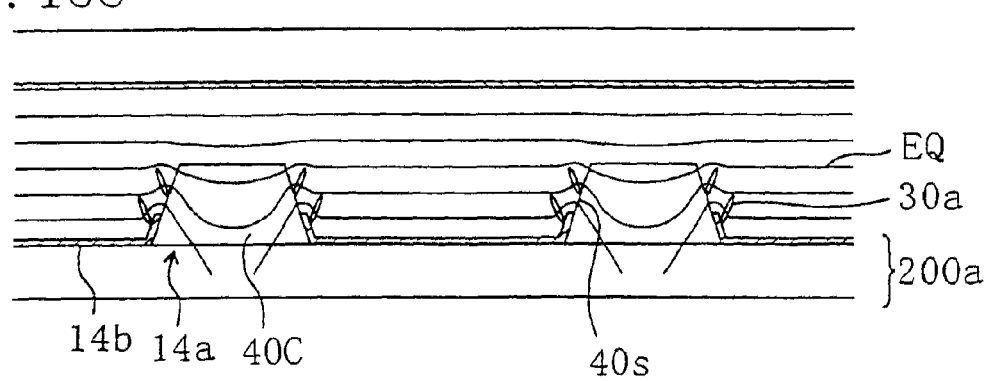

FIGS. 16A, 16B and 16C are schematic cross-sectional views of liquid crystal display devices 200A, 200E and 200C, respectively, all of which correspond to FIG. 15A. All of the liquid crystal display devices 200A, 200B and 200C have the protrusions within the openings 40a and are different from the liquid crystal display device 200 in the positional relationship between the entire protrusion 40 as a single structure and the opening 14a.

In the aforementioned liquid crystal display device 200, the entire protrusion 40 as a single structure is formed within the opening 14a and the bottom of the protrusion 40 is smaller than the opening 14a as shown in FIG. 15A. In the liquid crystal display device 200A of FIG. 16A, the bottom of the protrusion 40A accords with the opening 14a, and in the liquid crystal display device 200E of FIG. 16B, the protrusion 408 has a bottom larger than the opening 14a so that the protrusion 40B covers a part of the solid portion (conducting film) 14b around the opening 14a. In each of the protrusions 40, 40A and 40B, the solid portion 14b is not formed on the side face 40s. As a result, the equipotential line EQ is substantially flat on the solid portion 14b and drops in the opening 14a as shown in the respective drawings. Accordingly, the side face 40s of each of the protrusions 40A and 40B of the liquid crystal display devices 200A and 200B can exhibit the orientation-regulating force in the same direction as the orientation-regulating direction of the inclined electric field similarly to the protrusion 40 of the liquid crystal display device 200, so as to stabilize the radially-inclined orientation.

In contrast, the bottom of the protrusion 40C of the liquid crystal display device 200C of FIG. 16C is larger than the opening 14a, and a part of the solid portion 14b around the opening 14a is formed on the side face 40s of the protrusion 40C. Owing to the solid portion 14b formed on the side face 40s, a crest is formed in the equipotential line EQ. The crest of the equipotential line EQ has a gradient reverse to that of the equipotential line EQ dropping in the opening 14a, which means that an inclined electric field is generated in the reverse direction to the inclined electric field for orienting the liquid crystal molecules 30a to be radially inclined. Accordingly, in order to attain the side face 40s exhibiting the orientation-regulating force in the same direction as the orientation-regulating direction of the inclined electric field, it is preferred that the solid portion (conducting film) 14b is not formed on the side face 40s.

Next, the cross-sectional structure of the protrusion 40 taken along line 17A-17A' of FIG. 13A will be described with reference to FIG. 17.

Figure 17A:
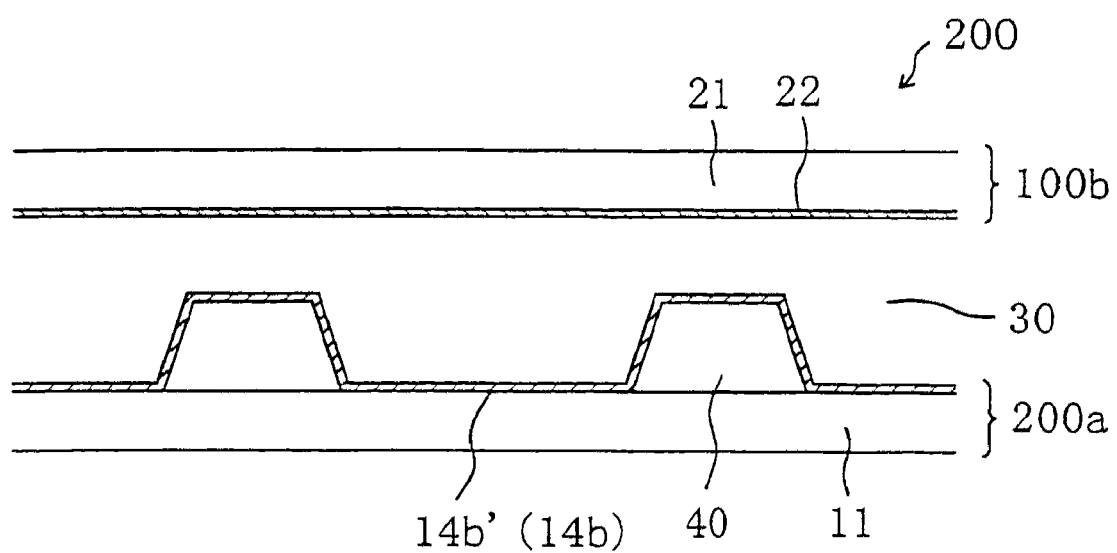
FIG. 17 is a cross-sectional view for schematically showing the cross-sectional structure of the liquid crystal display device 200 taken along line 17A-17A' of FIG. 13A.

Since the protrusion 40 of FIG. 13A is formed so as to completely surround the unit solid portion 14b' substantially circularly as described above, the portions for mutually connecting the adjacent unit solid portions 14b' (the branch portions extending in the four directions from the circular portion) are formed on the protrusion 40 as shown in FIG. 17. Accordingly, there is a risk of disconnection caused on the protrusion 40 in depositing the conducting film for forming the solid portion 14b of the picture element electrode 14, or peeling may be highly probably caused in a subsequent step of the fabrication process.

Figure 18A:
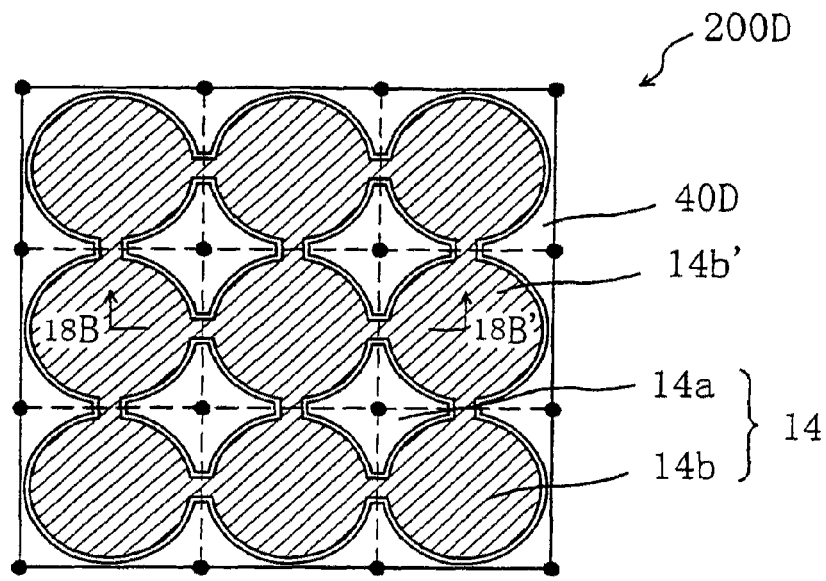
FIGS. 18A and 18B are diagrams for schematically showing the structure of one picture element region of a liquid crystal display device 200D according to Embodiment 2, and specifically
Figure 18B:
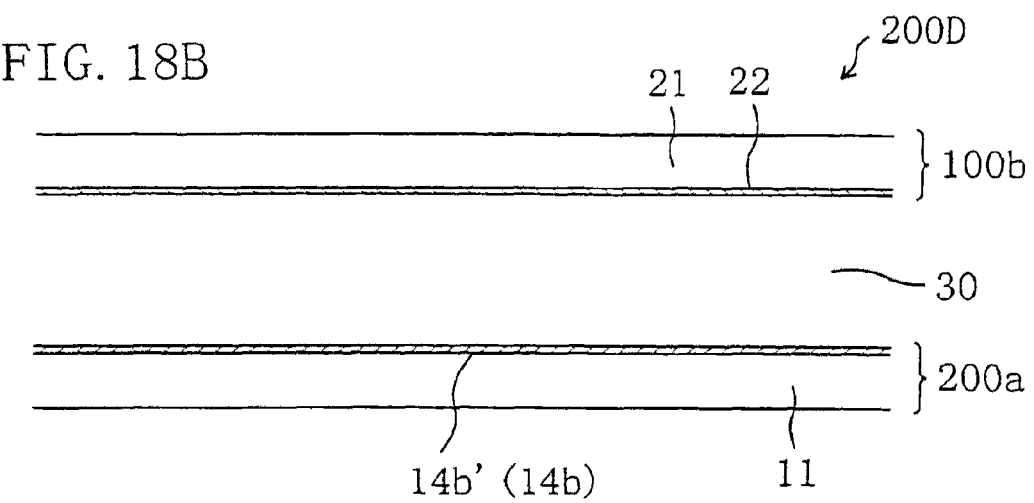

Therefore, as in a liquid crystal display device 200D shown in FIGS. 18A and 18B, an independent protrusion 40D is formed to be completely contained within the opening 14a. Thus, the conducting film for forming the solid portion 14b is formed on the flat surface of the substrate 11, and hence, the risk of disconnection and peeling can be avoided. Although the protrusion 40D is not formed so as to completely surround the unit solid portion 14b' substantially circularly, a liquid crystal domain in the substantially circular shape is formed correspondingly to the unit solid portion 14b', so as to stabilize the radially-inclined orientation similarly to the aforementioned liquid crystal display device.

The effect to stabilize the radially-inclined orientation by forming the protrusion 40 in the opening 14a is exhibited not only in the opening 14a having the aforementioned pattern but also in the opening 14a having any of the patterns described in Embodiment 1, and the same effect can be attained in employing any of the patterns. In order to sufficiently exhibit the effect to stabilize the radially-inclined orientation against an external force by the protrusion 40, the pattern (seen from the substrate normal direction) of the protrusion 40 preferably has a shape for surrounding a region of the liquid crystal layer 30 as large as possible. Accordingly, the effect to stabilize the orientation by the protrusion 40 can be more remarkably exhibited in a positive pattern, for example, having a circular unit solid portion 14b' than in a negative pattern having a circular opening 14a.

(Arrangement of Polarizing Plate and Phase Plate)

In the so-called vertical alignment type liquid crystal display device including a liquid crystal layer in which liquid crystal molecules having the negative dielectric anisotropy are vertically oriented under application of no voltage, a display can be produced in a variety of display modes. For example, not only a birefringence mode for producing a display by controlling the birefringence of the liquid crystal layer with an electric field but also an optical rotating mode and a combination of the optical rotating mode and the birefringence mode can be employed as the display mode. When a pair of polarizing plates are provided on the outside of the pair of substrates (for example, the TFT substrate and the counter substrate) in each of the liquid crystal display devices described in Embodiments 1 and 2, a liquid crystal display device of the birefringence mode can be obtained. Also, a phase compensating device (typically, a phase plate) may be provided if necessary. Furthermore, a liquid crystal display device capable of bright display can be obtained by using substantially circularly polarized light.

In the liquid crystal display device in which the liquid crystal domains are placed in the spiral radially-inclined orientation state as shown in FIGS. 5B and 5C, the display quality can be further improved by optimizing the positions of the polarizing plates. Now, preferred positions of the polarizing plates will be described. Herein, the description will be given by exemplifying a liquid crystal display device for producing a display in the normally black mode in which a pair of polarizing plates are provided on the outside of a pair of substrates (for example, a TFT substrate and a counter substrate) so as to have their polarization axes substantially perpendicularly to each other. The spiral radially-inclined orientation state is realized by using, for example, a nematic liquid crystal material having the negative dielectric anisotropy including a chiral agent. In the following description, the "spirally radially-inclined orientation" is sometimes simply referred to as "spiral orientation".

First, the orientation states of liquid crystal molecules obtained when liquid crystal domains are in the spiral orientation state will be described with reference to FIGS. 19A, 19B and 19C. FIG. 19A is a diagram for schematically showing the orientation state of the liquid crystal molecules obtained immediately after applying a voltage through the liquid crystal layer, and FIGS. 19B and 19C are diagrams for schematically showing the orientation state of the liquid crystal molecules obtained in the orientation stable time (stationary state).

Immediately after applying a voltage through the liquid crystal layer, the liquid crystal molecules 30a are placed in a simple radially-inclined orientation state in a plurality of liquid crystal domains as shown in FIG. 19A. When the orientation is further proceeded thereafter, the liquid crystal molecules 30a are inclined in predetermined directions on the plane of the liquid crystal layer, and in the orientation stable time (stationary state), the liquid crystal molecules 30a are in the clockwise or counterclockwise spiral orientation as shown in FIG. 19B or 19C.

At this point, when the liquid crystal molecules 30a are inclined in the counterclockwise direction, the liquid crystal domain is in the clockwise spiral orientation state as shown in FIG. 19B, and when the liquid crystal molecules 30a are inclined in the clockwise direction, the liquid crystal domain is in the counterclockwise spiral orientation state as shown in FIG. 19C. The direction of the spiral orientation depends upon, for example, the kind of chiral agent added to the liquid crystal material.

The degree of inclination of the liquid crystal molecules 30a on the plane is regulated, as shown in FIGS. 19B and 19C, by an angle $\theta$ against the 12 o'clock direction on the display surface (that is, the upper direction of the display surface and also simply referred to as the 12 o'clock direction) of a liquid crystal molecule 30a' positioned in the 12 o'clock direction on the display surface in regard to the center of each of the plural liquid crystal domains. The center of the liquid crystal domain typically substantially accords with the center of the opening or the solid portion.

The liquid crystal molecule 30a' disposed in the aforementioned position may actually be inclined at an angle different from the angle $\theta$. Herein, the inclination angles of liquid crystal molecules 30a' disposed in the aforementioned position against the 12 o'clock direction on the display surface and the existing probabilities of the liquid crystal molecules 30a' are examined, so as to define the inclination angle of the liquid crystal molecule 30a' with the highest probability as the angle $\theta$. Typically, the inclination angle of a liquid crystal molecule 30a' positioned in the vicinity of the center in the thickness direction of the liquid crystal layer substantially accords with the angle $\theta$. The angle of a liquid crystal molecule 30a' against the 12 o'clock direction is, strictly speaking, an angle between the azimuth direction of the orientation direction of the liquid crystal molecule 30a' and the 12 o'clock direction.

In the liquid crystal display device in which the liquid crystal domains are in the spiral orientation state as described above, the light transmittance obtained when the liquid crystal domains are in the spiral orientation state can be improved when a pair of polarizing plates are disposed so that the polarization axis of one polarizing plate can be inclined in the same direction as the inclination of the aforementioned liquid crystal molecule by an angle exceeding degree but smaller than $2\theta$ against the 12 o'clock direction. Thus, bright display can be obtained. Now, this will be described in more detail by using examples.

Figure 20:
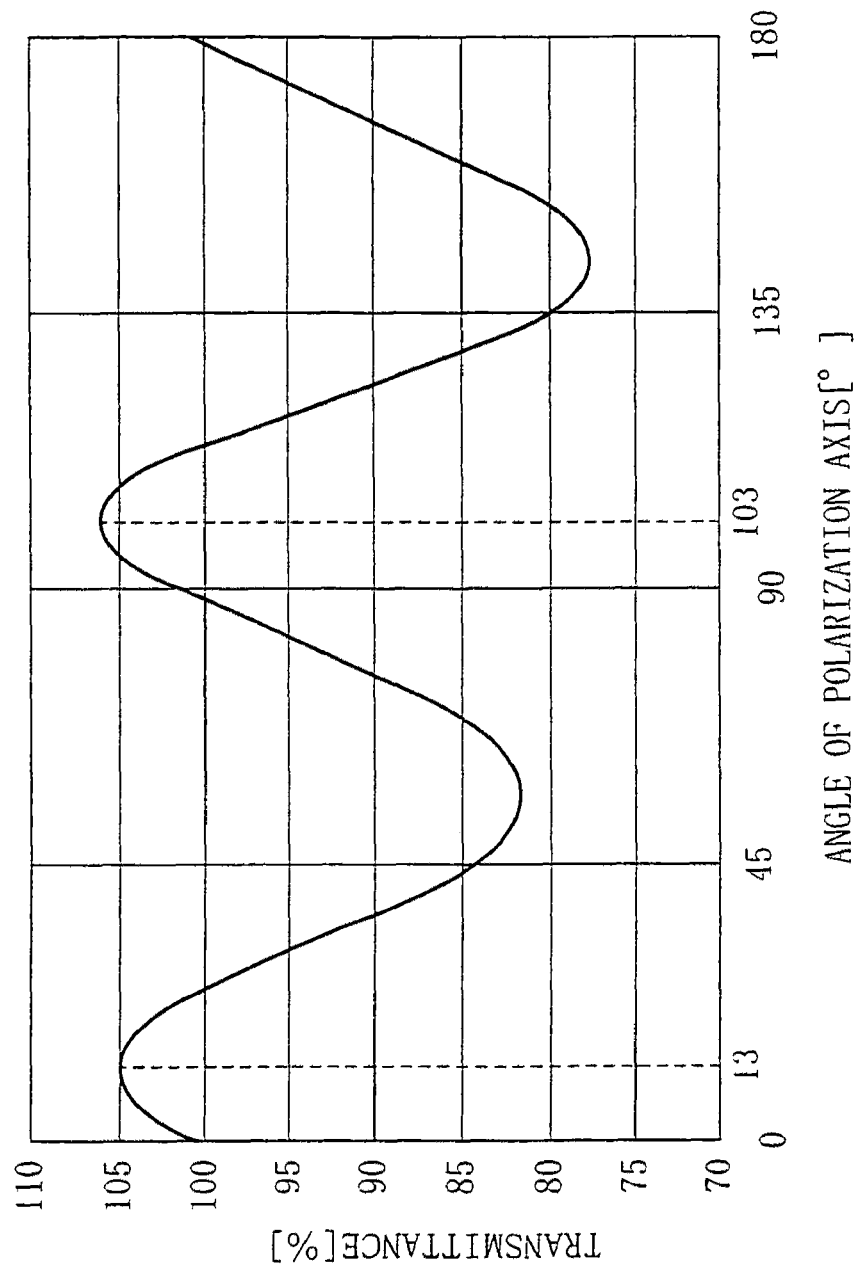
FIG. 20 is a graph in which the ordinate indicates the transmittance in a white display state of a liquid crystal display device according to an embodiment of the invention and the abscissa indicates the angle of a polarization axis against the 12 o'clock direction.

First, with reference to FIG. 20, description will be given on the change of transmittance obtained by changing the inclination angle of the polarization axis against the 12 o'clock direction by rotating the pair of polarizing plates kept in a crossed Nicols state about the liquid crystal panel in white display state, namely, in the state where the liquid crystal domains are in the spiral radially-inclined orientation state under application of a predetermined voltage through the liquid crystal layer. FIG. 20 is a graph having the ordinate indicating the transmittance in the white display state of a liquid crystal display device including a liquid crystal layer (with a thickness of 3.8 μm) formed from a liquid crystal material with a chiral pitch of 16 μm and the abscissa indicating the angle of the polarization axis against the 12 o'clock direction. In this case, the transmittance obtained when the angle of the polarization axis against the 12 o'clock direction is 0 degree is assumed as 100%. Also, the liquid crystal molecules of the liquid crystal layer included in this liquid crystal display device are in the clockwise spiral orientation state as shown in FIG. 19B in the orientation stable time, and the liquid crystal molecule positioned in the 12 o'clock direction is inclined in the counterclockwise direction by approximately 13 degrees, against the 12 o'clock direction (namely, $\theta \approx 13°$). In drawings referred to in the following description, this liquid crystal display device (namely, the liquid crystal display device in which the liquid crystal molecules are in the clockwise spiral orientation state in the orientation stable time and the liquid crystal molecule positioned in the o'clock direction is inclined in the counterclockwise direction by approximately 13 degrees against the 12 o'clock direction) is shown unless otherwise mentioned.

As shown in FIG. 20, the transmittance is increased as the polarization axis is inclined in the counterclockwise direction against the 12 o'clock direction and is the maximum when the angle of the polarization axis against the 12 o'clock direction is approximately 13 degrees (namely, e). When the polarization axis is further inclined, the transmittance is lowered, and when the angle of the polarization axis against the 12 o'clock direction is approximately 26 degrees (namely, $2\theta$), the transmittance becomes equal to that obtained when the angle is 0 degree. When the angle exceeds 26 degrees, the transmittance becomes lower than that obtained when the angle is 0 degree.

The light transmittance is changed as described above because the area of shade regions of the liquid crystal domain changes in accordance with the inclination angle of the polarization axis against the 12 o'clock direction. The shade region corresponds to a region defined by liquid crystal molecules oriented vertically or parallel to the polarization axis, and the liquid crystal layer in the shade region minimally causes a phase difference in incident light. Accordingly, the incident light passing through the shade region makes little contribution to the transmittance. Therefore, the transmittance obtained when the liquid crystal domain is in the spiral orientation state depends upon the area of the shade region. The transmittance is lower as the area of the shade region is larger, and the transmittance is higher as the area of the shade region is smaller.

Figure 21A:
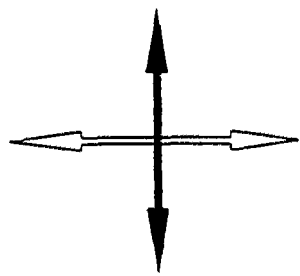
FIG. 21A is a diagram for schematically showing arrangement of a polarizing plate and FIG. 21B is a diagram for schematically showing shade regions SR in a liquid crystal domain obtained when the polarizing plate is arranged as shown in FIG. 21A.
Figure 21B:
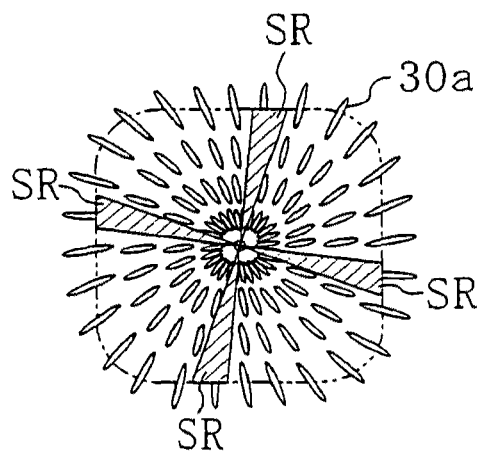
Figure 22A:
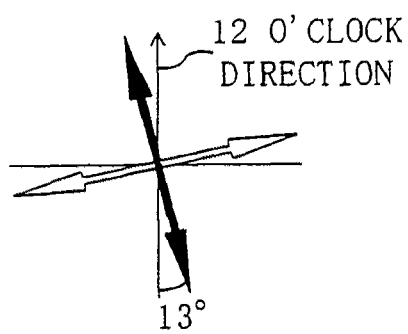
FIG. 22A is a diagram for schematically showing another arrangement of a polarizing plate and FIG. 22B is a diagram for schematically showing shade regions SR in a liquid crystal domain obtained when the polarizing plate is arranged as shown in FIG. 22A.
Figure 22B:
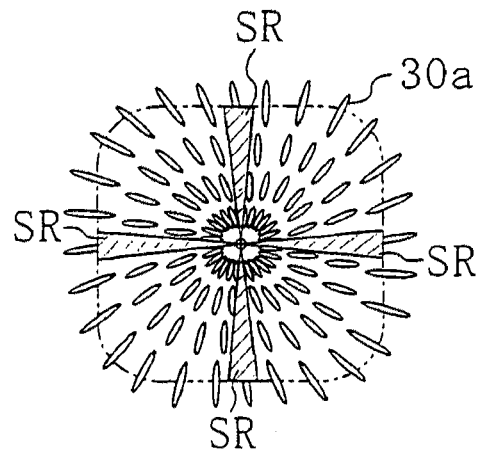

The change of the shade region in accordance with the inclination angle of the polarization axis will now be described with reference to FIGS. 21A, 21B, 22A and 22B. FIGS. 21A and 21B are diagrams for schematically showing shade regions SR of a liquid crystal domain obtained when the polarization axis is parallel to the 12 o'clock direction, and FIGS. 22A and 22B are diagrams for schematically showing shade regions SR obtained when the polarization axis is inclined by approximately 13 degrees against the 12 o'clock direction.

When the polarization axis is parallel to the 12 o'clock direction as shown in FIG. 21A, the shade regions SR are observed in directions shifted in the clockwise direction respectively from the 12 o'clock direction, the 3 o'clock direction, the 6 o'clock direction and the 9 o'clock direction in regard to the center of the liquid crystal domain. In contrast, when the polarization axis is inclined by approximately 13 degrees against the 12 o'clock direction as shown in FIG. 22A, the shade regions SR are observed in the 12 o'clock direction, the 3 o'clock direction, the 6 o'clock direction and the 9 o'clock direction in regard to the center of the liquid crystal domain.

When the area of the shade regions SR obtained when the polarization axis is parallel to the 12 o'clock direction as shown in FIG. 21B is assumed to be S1 and the area of the shade regions SR obtained when the polarization axis is inclined by approximately 13 degrees (namely, θ) against the o'clock direction is assumed to be S2, the area S1 is larger than the area S2 (S1>S2). This is because the existing probability of liquid crystal molecules oriented vertically or parallel to the polarization axis is lower in the case where the polarization axis is inclined by approximately 13 degrees against the 12 o'clock direction than in the case where the polarization axis is parallel to the 12 o'clock direction.

In this manner, assuming that the liquid crystal molecule positioned in the 12 o'clock direction in regard to the center of the liquid crystal domain is inclined from the 12 o'clock direction by the angle θ, the polarizing plates are disposed so that the polarization axis of one of the polarizing plates can be inclined from the 12 o'clock direction by the angle exceeding 0 degree and smaller than 2 θ in the same direction as the inclination direction of the liquid crystal molecule. Thus, the existing probability of the liquid crystal molecules oriented vertically or parallel to the polarization axis is lower than in the case where the polarization axis is parallel to the 12 o'clock direction. Accordingly, the light transmittance obtained when the liquid crystal domain is in the spiral radially-inclined orientation state can be improved by disposing the polarizing plates in the aforementioned manner, resulting in realizing bright display.

Furthermore, when the polarizing plates are disposed so that the polarization axis of one polarizing plate can be inclined at substantially the same angle as the angle θ as shown in FIG. 22A, the shade regions SR are positioned in the 12 o'clock direction, the 3 o'clock direction, the 6 o'clock direction and the 9 o'clock direction in regard to the center of the liquid crystal domain as shown in FIG. 22B. As a result, the existing probability of the liquid crystal molecules oriented vertically or parallel to the polarization axis can be further lowered. Therefore, when the polarizing plates are thus disposed, the light transmittance can be further increased, resulting in realizing further bright display.

In the above description, the preferable arrangement of the polarizing plates is described from the viewpoint of the improvement in the transmittance. Furthermore, when the pair of polarizing plates are arranged so that the polarization axis of one of the polarizing plates can be inclined in the same direction as the inclination of the aforementioned liquid crystal molecule by an angle exceeding 0 degree and smaller than θ against the 12 o'clock direction, not only bright display can be realized but also occurrence of a white tailing phenomenon (a phenomenon in which a white tailing residual image is observed) and a black tailing phenomenon (a phenomenon in which a black tailing residual image is observed) described below can be suppressed, resulting in realizing display with high quality.

The white tailing phenomenon may occur, for example, in the case where an image of a black box moving with a intermediate gray scale background is displayed in a liquid crystal display device. FIG. 23 is a diagram for schematically showing the white tailing phenomenon. When an image where a black box is moving in the rightward direction with a intermediate gray scale background as shown in FIG. 23 is displayed, a region with higher luminescence than the intermediate gray scale is formed on the left hand side of the black box so as to be observed as a white tailing residual image.

Figure 24:
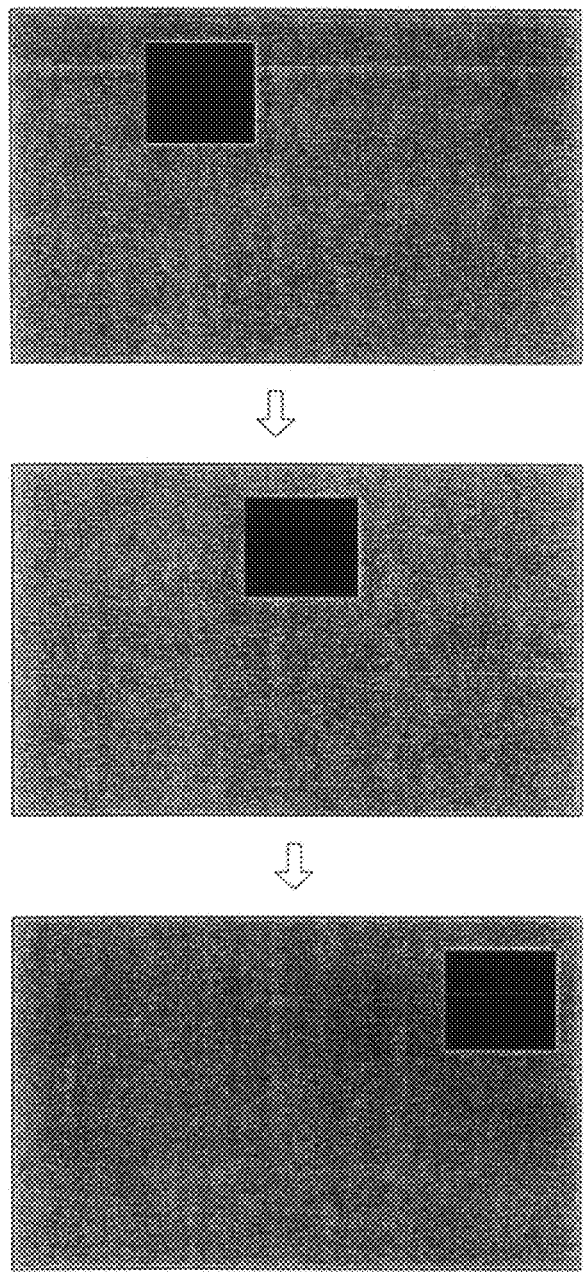
FIG. 24 is a diagram for schematically showing the state where the tailing phenomenon is prevented in a liquid crystal display device of the invention.

The white tailing phenomenon comparatively easily occurs when, for example, the polarization axis is parallel to the 12 o'clock direction. In contrast, for example, in the liquid crystal display device whose transmittance change is shown in FIG. 20, when the polarizing plates are arranged so that the polarization axis can be inclined by approximately 13 degrees against the 12 o'clock direction, the white tailing phenomenon can be prevented from occurring in displaying the image where the black box is moving in the rightward direction with the intermediate gray scale background as shown in FIG. 24.

Figure 25:
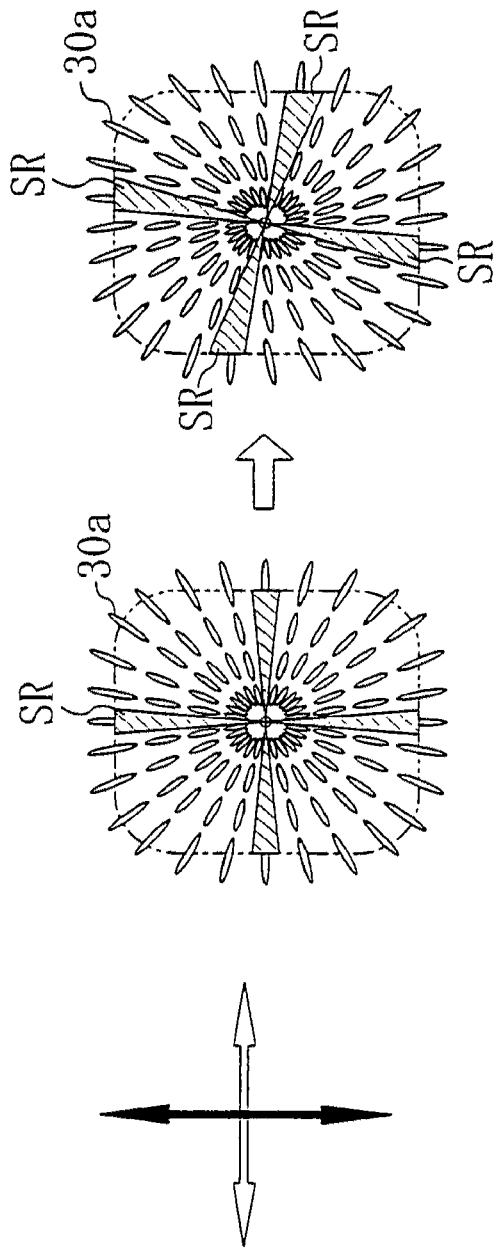
FIG. 25A is a diagram for schematically showing arrangement of a polarizing plate.
FIG. 25B is a diagram for schematically showing shade regions SR obtained immediately after voltage application when the polarizing plate is arranged as shown in FIG. 25A.
FIG. 25C is a diagram for schematically showing shade regions SR obtained in the orientation stable time (stationary state) when the polarizing plate is arranged as shown in FIG. 25A.
Figure 26:
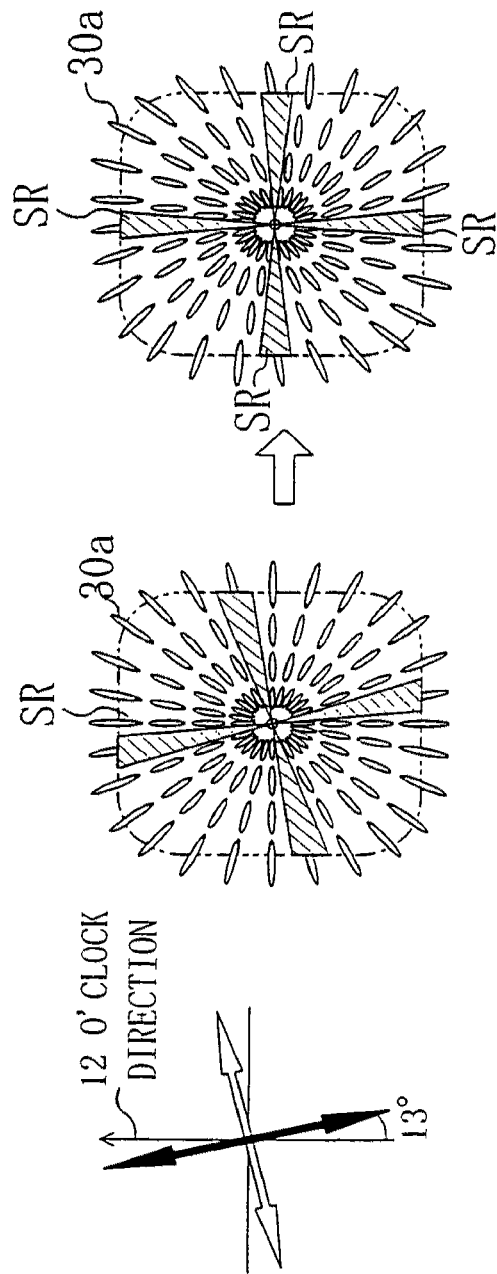
FIG. 26A is a diagram for schematically showing arrangement of a polarizing plate.
FIG. 26B is a diagram for schematically showing shade regions SR obtained immediately after voltage application when the polarizing plate is arranged as shown in FIG. 26A.
FIG. 26C is a diagram for schematically showing shade regions SR obtained in the orientation stable time (stationary state) when the polarizing plate is arranged as shown in FIG. 26A.

The reason will be described with reference to FIGS. 25A, 25B, 25C, 26A, 26B and 26C. FIGS. 25A, 25B and 25C are diagrams for schematically showing shade regions SR in a liquid crystal domain obtained when the polarization axis of the polarizing plate is parallel to the 12 o'clock direction. FIG. 25A shows the polarization axis of the polarizing plate, FIG. 25B shows the shade regions SR obtained immediately after applying a voltage through the liquid crystal layer, and FIG. 25C shows the shade regions SR obtained in the orientation stable time (stationary state). FIGS. 26A, 26B and 26C are diagrams for schematically showing shade regions SR obtained in a liquid crystal domain when the polarization axis of the polarizing plate is inclined by approximately 13 degrees against the 12 o'clock direction. FIG. 26A shows the polarization axis of the polarizing plate, FIG. 26B shows the shade regions SR obtained immediately after applying a voltage through the liquid crystal layer and FIG. 26C shows the shade regions SR obtained in the orientation stable time (stationary state).

First, the case where the polarization axis of one of the pair of the polarizing plates is parallel to the 12 o'clock direction as shown in FIG. 25A will be described. When the polarizing plates are thus arranged, the shade regions SR are observed in the 12 o'clock direction, the 3 o'clock direction, the 6 o'clock direction and the 9 o'clock direction in regard to the center of the liquid crystal domain as shown in FIG. 25B. Also, in the orientation stable time, the shade regions are observed in directions shifted in the clockwise direction respectively from the 12 o'clock direction, the 3 o'clock direction, the 6 o'clock direction and the 9 o'clock direction in regard to the center of the liquid crystal domain as shown in FIG. 25C.

When the area of the shade regions SR obtained immediately after voltage application shown in FIG. 25B is assumed to be S1' and the area of the shade regions SR obtained in the orientation stable time shown in FIG. 25C is assumed to be S1, the area S1 is larger than the area S1', and the transmittance is higher immediately after the voltage application than in the orientation stable time. Therefore, when the image in which the black box is moving in the rightward direction with the intermediate gray scale background is displayed as shown in FIG. 23, in picture element regions where the black box has just passed, namely, picture element regions that are being changed from the black display state to the intermediate gray scale display state, the transmittance is transiently higher than that obtained in the intermediate gray scale state (the transmittance obtained in the orientation stable time). As a result, this transiently high transmittance is observed as a white tailing residual image.

In contrast, when the polarizing plates are disposed so that the polarization axis of one polarizing plate be inclined by approximately 13 degrees against the 12 o'clock direction as shown in FIG. 26A, the shade regions SR are observed in directions shifted in the counterclockwise direction respectively from the 12 o'clock direction, the 3 o'clock direction, the 6 o'clock direction and the 9 o'clock direction in regard to the center of the liquid crystal domain as shown in FIG. 26B in the simple radially-inclined orientation state attained immediately after the voltage application. Alternatively, in the orientation stable time, the shade regions SR are observed in the 12 o'clock direction, the 3 o'clock direction, the 6 o'clock direction and the 9 o'clock direction in regard to the center of the liquid crystal domain as shown in FIG. 26C.

When the area of the shade regions SR obtained immediately after the voltage application shown in FIG. 26B is assumed to be S2' and the area of the shade regions SR obtained in the orientation stable time shown in FIG. 26C is assumed to be S2, the area S2 is smaller than the area S2', and the transmittance is higher in the orientation stable time than immediately after the voltage application. Furthermore, when the polarizing plates are thus arranged, the transmittance is the highest in the orientation stable time. Therefore, when the image where the black box is moving in the rightward direction with the intermediate gray scale background is displayed as shown in FIG. 24, in picture element regions where the black box has just passed, namely, picture element regions that are being changed from the black display state to the intermediate gray scale display state, the transmittance never becomes transiently higher than the transmittance of the intermediate gray scale state (the transmittance obtained in the orientation stable time). As a result, the occurrence of the white tailing phenomenon can be definitely prevented in the liquid crystal display device in which the polarizing plates are thus arranged.

Figure 27:
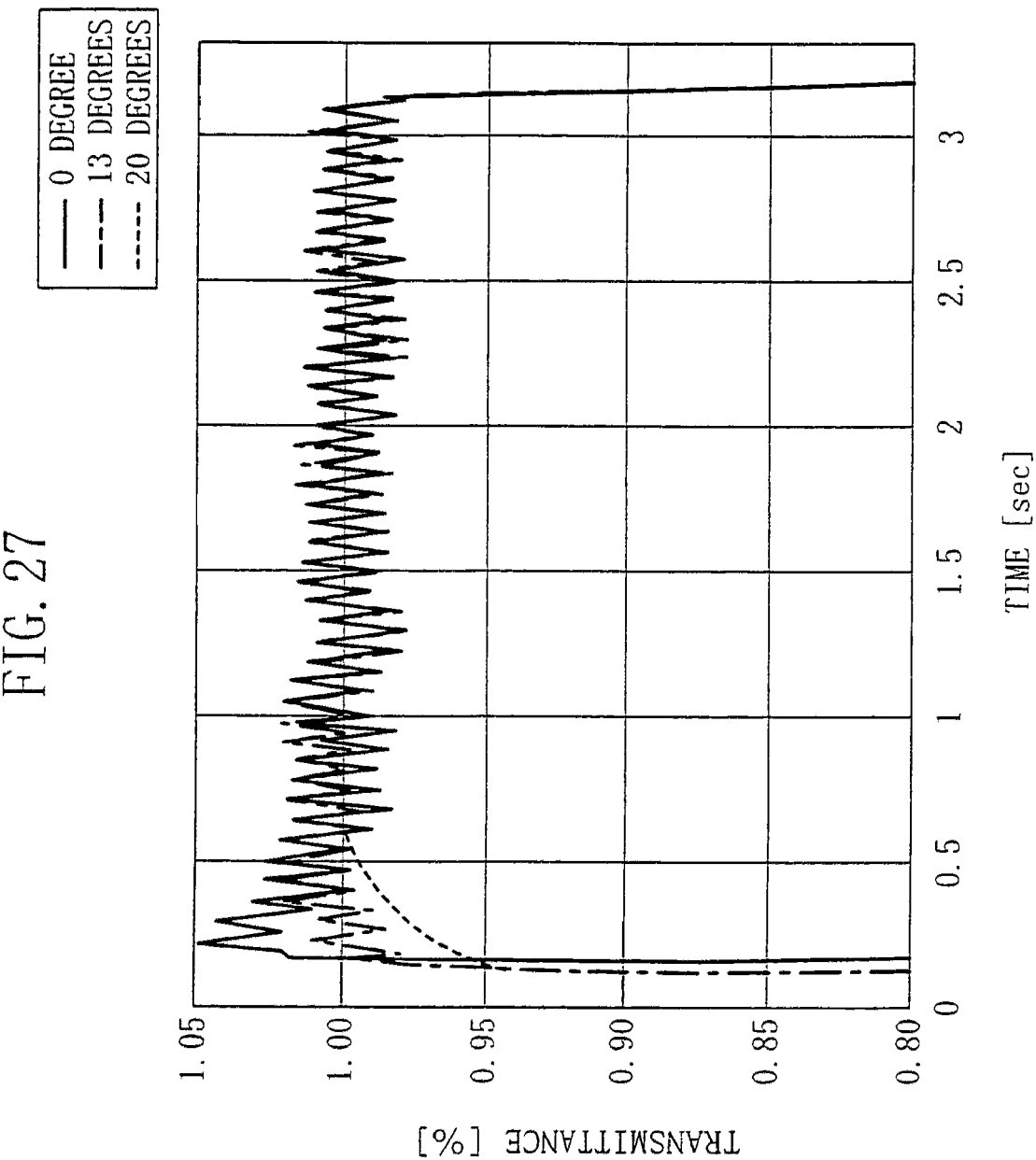
FIG. 27 is a graph for showing change with time of the transmittance in accordance with change of a picture element region from a black display state to a intermediate gray scale display state obtained when the angle of the polarization axis against the 12 o'clock direction is 0 degree, approximately 13 degrees or approximately 20 degrees.

FIG. 27 shows change with time of the transmittance obtained by changing a given picture element region from the black display state to the intermediate gray scale display state when the polarization axis is parallel to the 12 o'clock direction and when the polarization axis is inclined by approximately 13 degrees against the 12 o'clock direction. In this graph, the transmittance obtained in the intermediate gray scale display state is assumed to be 1.00 and the time when a voltage is applied through the liquid crystal layer of this picture element region is assumed to be 0 sec.

In the case where the polarization axis is parallel to the 12 o'clock direction, the transmittance largely exceeds 1.00 immediately after the voltage application and becomes predetermined transmittance (the transmittance of the intermediate gray scale display state) thereafter as shown with a solid line in FIG. 27. Therefore, when the polarizing plates are thus arranged, the white tailing phenomenon may occur.

In contrast, in the case where the polarization axis is inclined by approximately 13 degrees against the 12 o'clock direction, the transmittance never largely exceeds 1.00 immediately after the voltage application as shown with a dashed line in FIG. 27. Therefore, the occurrence of the white tailing phenomenon can be definitely prevented when the polarizing plates are thus arranged.

In the above description, the case where the polarization axis is inclined by approximately 13 degrees, (namely, the angle θ) against the 12 o'clock direction is described as an example of the arrangement of the polarizing plates for preventing the occurrence of the white tailing phenomenon. When the polarizing plates are thus arranged, the transmittance is the highest in the orientation stable time as described above, and hence, the occurrence of the white tailing phenomenon can be definitely prevented.

However, the arrangement for preventing the occurrence of the white tailing phenomenon is not limited to the aforementioned arrangement for attaining the highest transmittance in the orientation stable time. Alternatively, the occurrence of the white tailing phenomenon can be suppressed when the polarizing plates are arranged so that a difference between transient highest transmittance and the transmittance obtained in the orientation stable time can be smaller than that in the case where the polarization axis is parallel to the 12 o'clock direction.

For example, when the polarization axis is inclined in the same direction as the inclination direction of the liquid crystal molecule by an angle exceeding 0 degree and equal to θ or less against the 12 o'clock direction, the occurrence of the white tailing phenomenon can be suppressed, resulting in realizing display with high quality. Also, when the polarization axis is inclined within the aforementioned range, not only the occurrence of the white tailing phenomenon can be suppressed but also the transmittance obtained in the orientation stable time can be increased, resulting in realizing bright display. Within the aforementioned range, as the inclination angle of the polarization axis is larger, the white tailing phenomenon can be further suppressed. When the polarization axis is inclined by an angle substantially equal to θ/2, the occurrence of the white tailing phenomenon can be substantially avoided.

The arrangement for suppressing the occurrence of the white tailing phenomenon is not limited to the aforementioned arrangement, and depending upon the arrangement of the polarizing plates, the change of the transmittance caused in changing a picture element region from the black display state to the intermediate gray scale display state is too slow to cause a black tailing phenomenon.

The black tailing phenomenon occurs, similarly to the white tailing phenomenon, for example, in displaying an image where a black box is moving with the intermediate gray scale background in a liquid crystal display device. FIG. 28 is a diagram for schematically showing the black tailing phenomenon. As shown in FIG. 28, when the image where the black box is moving in the rightward direction with the intermediate gray scale background is displayed, a region with higher luminescence than the black display state but lower luminescence than the intermediate gray scale display, state is formed on the left hand side of the black box, so as to be observed as a black tailing residual image.

The black tailing phenomenon comparatively easily occurs when the polarization axis of the polarizing plate is inclined at an angle exceeding θ against the 12 o'clock direction. For example, when the polarization axis is inclined by approximately 20 degrees against the 12 o'clock direction, the change of the transmittance from the black display state to the intermediate gray scale display state is too slow as schematically shown with a two-dot chain line in FIG. 27. Therefore, in displaying the image where the black box is moving as described above, picture element regions where the black box has just passed cannot rapidly attain the intermediate gray scale display state, which may result in the black tailing phenomenon.

For example, when the polarization axis is inclined in the same direction as the inclination direction of the liquid crystal molecule by an angle exceeding 0 degree and smaller than θ against the 12 o'clock direction, the occurrence of the black tailing phenomenon can be suppressed, resulting in realizing display with high quality. Also, when the polarization axis is inclined within the aforementioned range, not only the occurrence of the black tailing phenomenon is suppressed but also the transmittance obtained in the orientation stable time can be increased, resulting in realizing bright display. When the inclination angle of the polarization axis is the angle exceeding 0 degree and equal to θ or less against the 12 o'clock direction and in the same direction as the inclination direction of the liquid crystal molecule, the black tailing phenomenon can be further suppressed as the inclination angle of the polarization axis is smaller. When the polarization axis is inclined by an angle substantially the same as θ/2, the occurrence of the black tailing phenomenon can be substantially avoided.

The occurrence of the white tailing phenomenon and the black tailing phenomenon can be suppressed by optimizing the arrangement of the polarizing plates as described above. From the viewpoint of suppressing the occurrence of the tailing phenomenon and improvement of the transmittance, the pair of polarizing plates are preferably arranged so that the polarization axis of one polarizing plate can be inclined in the same direction as the inclination direction of the liquid crystal molecule by the angle exceeding 0 degree and equal to θ or less. When the polarizing plates are thus arranged, bright display can be realized and the occurrence of the tailing phenomenon (including the white tailing phenomenon and the black tailing phenomenon) can be suppressed, resulting in realizing display with high quality. Furthermore, when the polarizing plates are arranged so that the polarization axis of one polarizing plate is inclined by an angle substantially the same as θ/2, the occurrence of the white tailing phenomenon and the black tailing phenomenon can be substantially avoided, resulting in realizing display with higher quality.

The spiral orientation of the liquid crystal domain can be obtained by using a liquid crystal material including a chiral agent as described above. At this point, there are cases where the orientation of the liquid crystal molecules is spirally changed along the thickness direction of the liquid crystal layer in accordance with the amount of chiral agent to be added and where such spiral orientation change is minimally caused. In either case, the display quality can be improved by optimizing the arrangement of the polarizing plates as described above.

(Width and Number of Branch Portions)

As described above, the picture element electrode 14 of the liquid crystal display device 100 or 200 of this invention includes a plurality of openings 14a and a solid portion 14b. A unit solid portion 14b' disposed within a unit lattice formed by the openings 14a is typically electrically connected to an adjacent unit solid portion 14b'. Portions for electrically connecting the adjacent unit solid portions 14b', for example, branch portions extending toward four directions from the circular portion as shown in FIG. 1A naturally receive the same potential as another portion of the unit solid portion, and hence, these branch portions also affect the orientation-regulating effect obtained by the inclined electric field.

Figure 29:
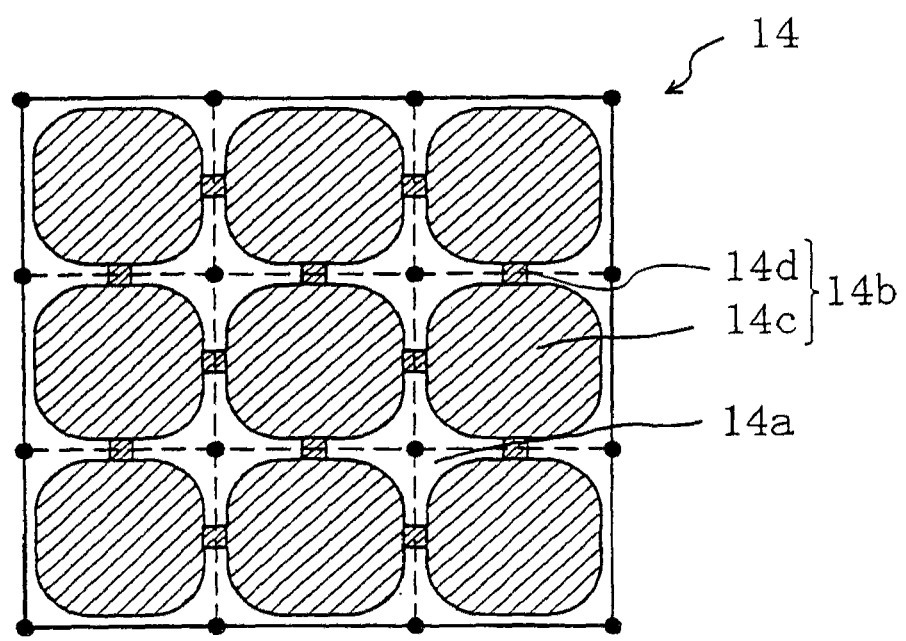
FIG. 29 is a top view for schematically showing a picture element electrode used in a liquid crystal display device according to an embodiment of the invention.

As shown in FIG. 29, the solid portion 14b typically includes a plurality of island portions 14c and a plurality of branch portions 14d for electrically connecting adjacent pairs of the island portions 14c. Herein, the island portion 14c corresponds to a portion of the conducting film positioned within a unit lattice excluding the branch portions 14d.

Liquid crystal molecules of a region of the liquid crystal layer 30 positioned on the island portion 14c are controlled in their orientation by the inclined electric field generated on a boundary between the island portion 14c and the opening 14a (namely, the edge portion of the opening 14a). In order to realize a stable orientation state and a good response characteristic, the inclined electric field for controlling the orientation of the liquid crystal molecules 30a should be made to work on a large number of liquid crystal molecules 30a, and for this purpose, the boundaries between the island portions 14c and the openings 14a are preferably formed in a large number.

When the branch portions 14d are present between the island portions 14c as shown in FIG. 29, the number of boundaries between the island portions 14c and the openings 14a is reduced owing to the branch portions 14d, and hence, the number of edge portions where the inclined electric fields for controlling the orientation of the liquid crystal molecules 30a disposed on the island portions 14c is reduced. In other words, the branch portion 14d present between the island portions 14c degrades the orientation-regulating effect derived from the inclined electric field. Accordingly, as the width of each branch portion 14d is smaller or as the number of branch portions 14d is smaller, the degradation of the orientation-regulating effect can be further suppressed so as to improve the response characteristic.

Also, since the inclined electric field is generated on the boundary between the branch portion 14d and the opening 14a, the liquid crystal molecules 30a positioned on the branch portion 14d are controlled in their orientation. The orientation of the liquid crystal molecules 30a positioned on the branch portion 14d also affects the orientation state of liquid crystal molecules 30a positioned on the island portion 14c, resulting in affecting the response characteristic. This will now be described in more detail.

Figure 30:
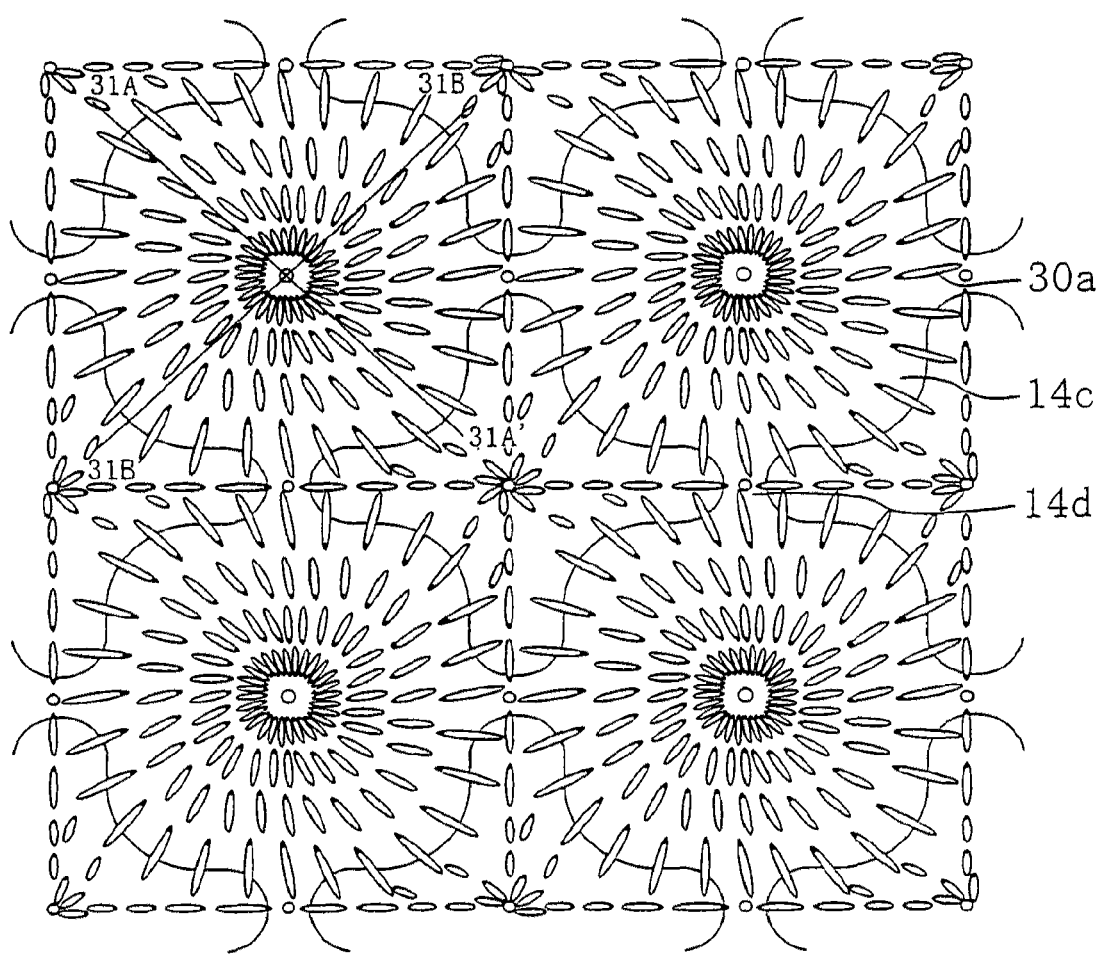
FIG. 30 is a top view for schematically showing an orientation state of liquid crystal molecules under voltage application.
Figure 31:
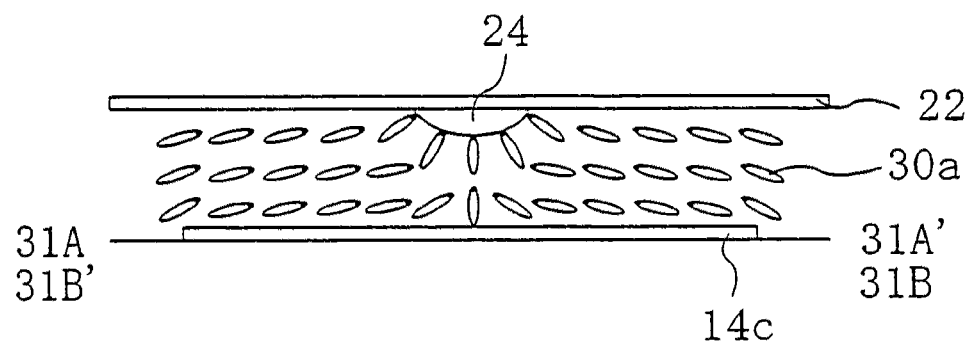
FIG. 31 is a cross-sectional view taken along line 31A-31A' or 31B-31B' of FIG. 30 for schematically showing the orientation state of the liquid crystal molecules under voltage application.

First, with reference to FIGS. 30 and 31, the orientation state of a region of the liquid crystal layer 30 positioned on the island portion 14c will be described. FIG. 30 is a schematic top view of the orientation state of the liquid crystal molecules 30a under voltage application, and FIG. 31 is a cross-sectional view thereof taken along line 31A-31A' or 31B-31B' f FIG. 30. In a liquid crystal display device shown in these drawings; the island portion 14c is formed in a barrel shape (a square with arc-shaped corners), a liquid crystal material including a chiral agent is used, and the liquid crystal layer 30 is in a spiral radially-inclined orientation state. Also in this liquid crystal display device, a bowl-shaped protrusion (a protrusion having one spherical face) 24 for fixing the center of the radially-inclined orientation in the vicinity of the center of the unit solid portion 14b' and improving the orientation stability is formed on the counter electrode 22 provided on the counter substrate 100b as shown in FIG. 31, but the following description does not differ even when such a protrusion 24 is not provided.

As shown in FIG. 30, when a voltage is applied through the liquid crystal layer 30, the orientation directions of the liquid crystal molecules 30a are regulated by the inclined electric fields respectively generated on the boundaries between the openings 14a and the island portions 14c (the edge portions of the openings 14a), so that the region of the liquid crystal layer 30 positioned on each island portion 14c is placed in the spiral radially-inclined orientation state.

In a cross-section taken along a direction where no branch portion 14d exists as in the cross-section taken along line 31A-31A' or 31B-31B' of FIG. 30, orientation-regulating force for inclining all the liquid crystal molecules 30a from the edge portions of the opening 14a toward the center of the island portion 14c works as shown in FIG. 31. In the case where the island portion 14c is formed in a circular shape, the strength of the orientation-regulating force is the same in any cross-sections taken along directions where no branch portion 14d exists. However, in the case where the island portion 14c is in the barrel shape as shown in FIG. 30, the strength of the orientation-regulating force depends upon the distance between the center of the island portion 14c and the edge portion.

In this manner, the region of the liquid crystal layer 30 positioned on the island portion 14c is stably placed in the spiral radially-inclined orientation state having its orientation center in the vicinity of the center of the island portion 14c under the voltage application. This state is herein designated as a first stable state for simplifying the following description.

Figure 32:
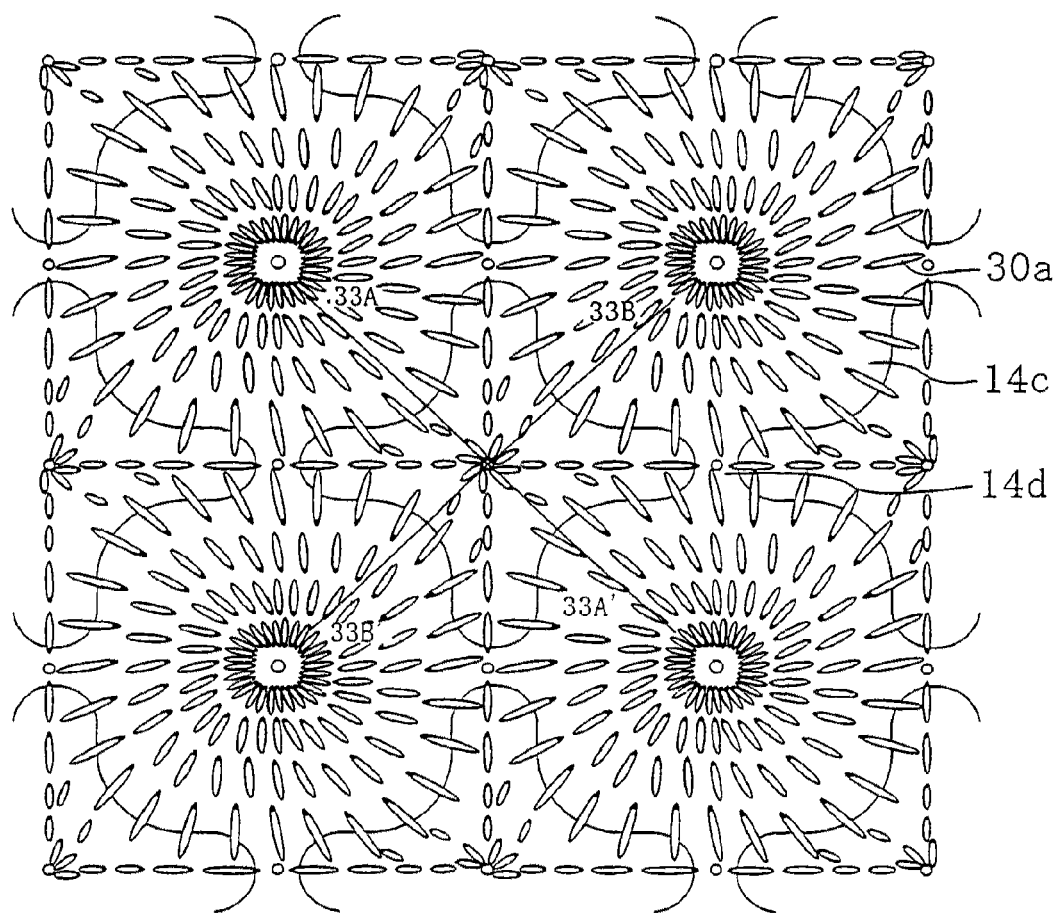
FIG. 32 is a top view for schematically showing an orientation state of liquid crystal molecules under voltage application.

Next, with reference to FIGS. 32 and 33, the orientation state of a region of the liquid crystal layer 30 positioned on the opening 14a will be described. FIG. 32 is a schematic top view of the orientation state of the liquid crystal molecules 30a under voltage application, and FIG. 33, is a cross-sectional view thereof taken along line 33A-33A' or 33B-33B' of FIG. 32.

Figure 33:
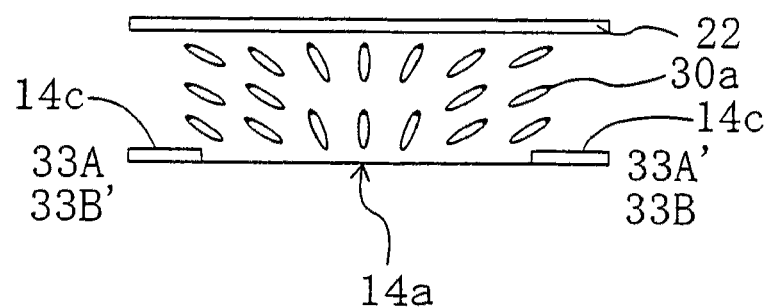
FIG. 33 is a cross-sectional view taken along line 33A-33A' or 33B-33B' of FIG. 32 for schematically showing the orientation state of the liquid crystal molecules under voltage application.

In a cross-section along a direction where no branch portion 14d exists as in the cross-section taken along line 33A-33A' or 33B-33B' of FIG. 32, orientation-regulating force for inclining all the liquid crystal molecules 30a from the edge portions of the opening 14a toward the center of the opening 14a works as shown in FIG. 33. However, the liquid crystal molecules 30a of the region of the liquid crystal layer 30 positioned on the opening 14a are not directly affected by the electric fields generated by the electrodes, and hence, they are inclined at an angle smaller than the inclination angle of the liquid crystal molecules 30a positioned on the island portion 14c.

In this manner, the region of the liquid crystal layer 30 positioned on the opening 14a are stably placed in the radially-inclined orientation state having its orientation center in the vicinity of the opening 14a under the voltage application.

Figure 34:
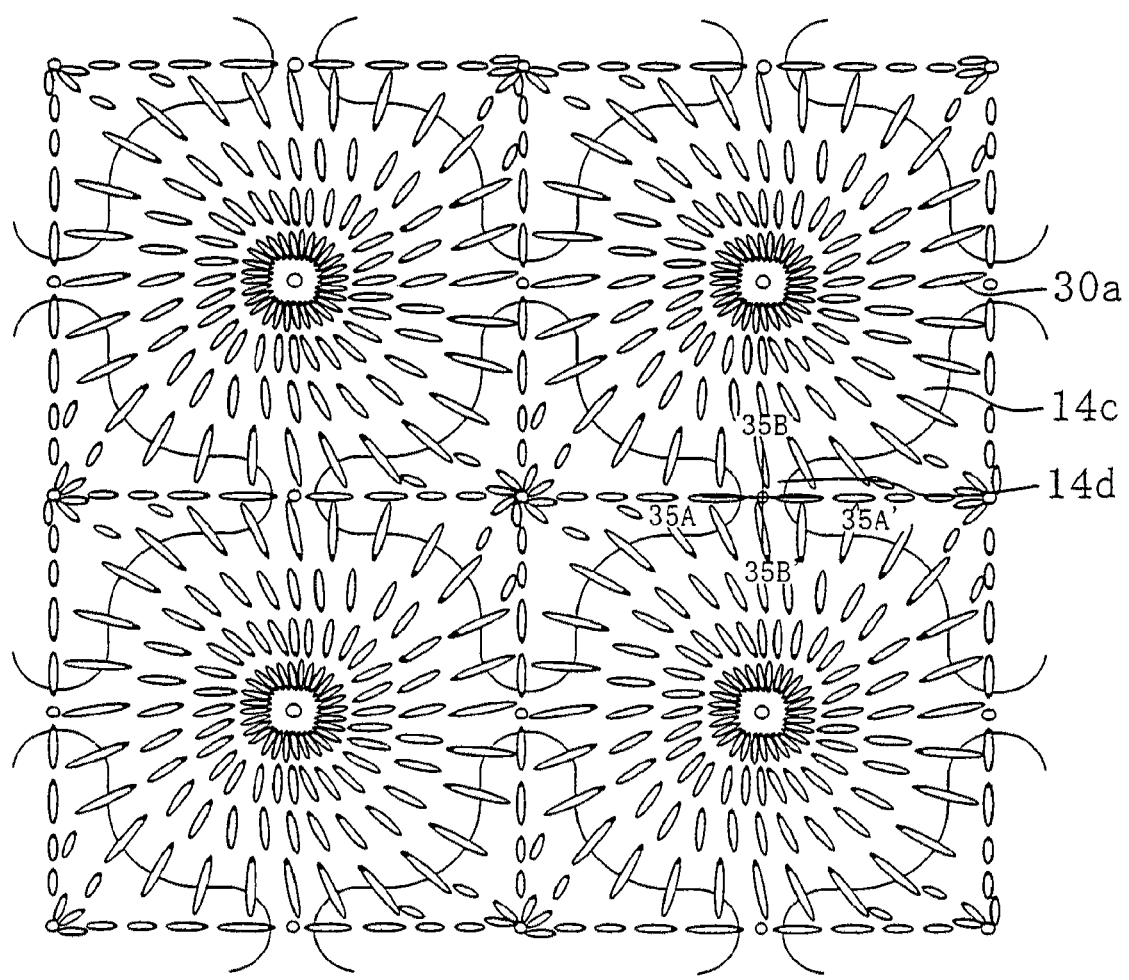
FIG. 34 is a top view for schematically showing an orientation state of liquid crystal molecules under voltage application.

Subsequently, with reference to FIGS. 34, 35A and 35B, the orientation state of a region of the liquid crystal layer 30 positioned on the branch portion 14d will be described. FIG. 34 is a schematic top view of the orientation state of the liquid crystal molecules 30a under voltage application, FIG. 35A is a cross-sectional view thereof taken along line 35A-35A' of FIG. 34, and FIG. 35B is a cross-sectional view thereof taken along line 35B-35B' of FIG. 34.

In a cross-section taken along a direction crossing the boundary between the branch portion 14d and the opening 14a as in the cross-section taken along line 35A-35A' of FIG. 34, the orientation directions of the liquid crystal molecules 30a are regulated by the inclined electric field generated on the boundary between the branch portion 14d and the opening 14a as shown in FIG. 35A. On the other hand, in a cross-section taken along a direction crossing the branch portion 14d and the island portion 14c as in the cross-section taken along line 35B-35B' of FIG. 34, the liquid crystal molecules 30a are inclined so as to match with the orientation state of the region of the liquid crystal layer 30 positioned on the adjacent island portion 14c as shown in FIG. 35B.

Figure 36:
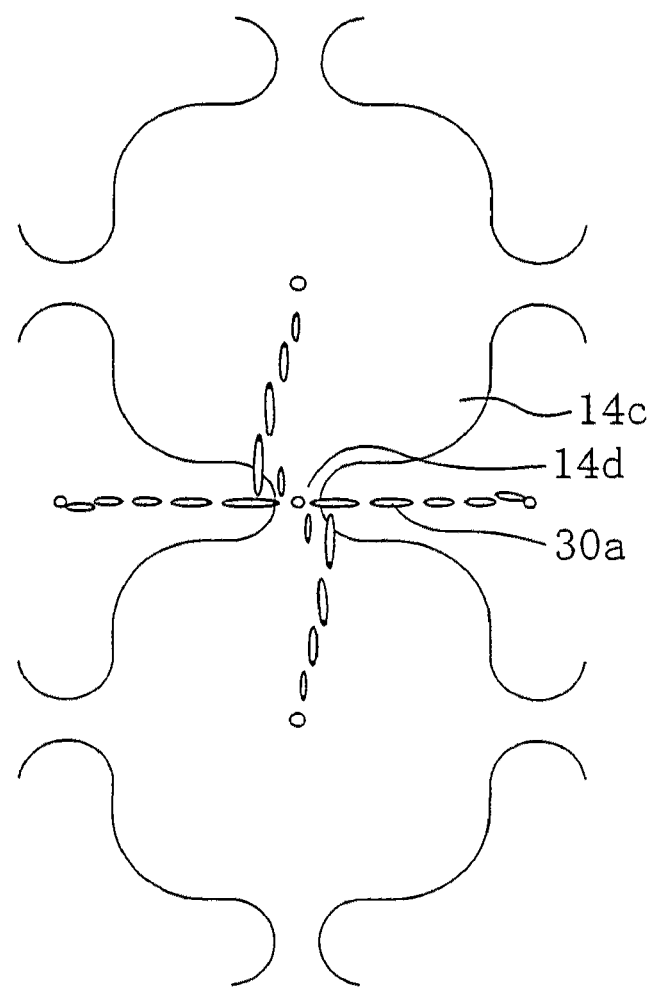
FIG. 36 is a top view for schematically showing an orientation state of liquid crystal molecules under voltage application.

Accordingly, the liquid crystal molecules 30a of the region of the liquid crystal layer 30 positioned on the branch portion 14d are oriented, as shown in FIG. 36, so as to match with the orientation of the liquid crystal molecules 30a positioned on the adjacent island portion 14c and the orientation of the liquid crystal molecules 30a positioned on the opening 14a (correspondingly to the aforementioned first stable state). In FIG. 36, liquid crystal molecules 30a having orientation axes along the vertical direction on the display surface (the 12 o'clock direction and the 6 o'clock direction) and the horizontal direction on the display surface (the 3 o'clock direction and the 9 o'clock direction) are shown.

The orientation-regulating force obtained in the section taken along line 35B-35B' (that is, very weak orientation-regulating force working for keeping continuity in the orientations of surrounding liquid crystal molecules) is much weaker than the orientation-regulating force of the inclined electric field generated at the edge portion of the opening 14a. Furthermore, the inclination direction of the liquid crystal molecule 30a obtained by the aforementioned orientation-regulating force is reverse (namely, the liquid crystal molecules 30a are oriented in the shape of a cone opening downward (toward the substrate 100a)) to the inclination direction of the liquid crystal molecules 30a obtained by the inclined electric field generated on the boundary between the branch portion 14d and the opening 14a (namely, the liquid crystal molecules 30a are oriented in the shape of a cone opening upward (toward the substrate 100b)). Therefore, balance of the orientation-regulating forces working on the liquid crystal molecules 30a positioned on the branch portion 14d can be easily lost.

Figure 37:
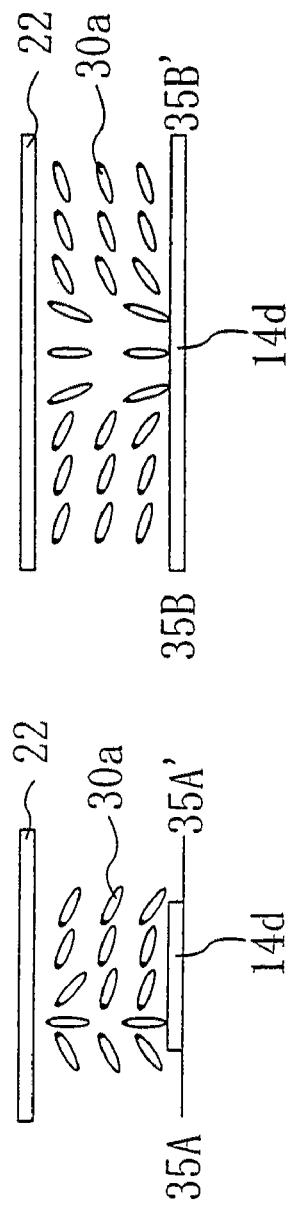
FIGS. 37A and 37B are cross-sectional views respectively taken along lines 35A-35A' and 35B-35B' of FIG. 34 for schematically showing the orientation state of the liquid crystal molecules under voltage application.

Accordingly, the liquid crystal molecules 30a vertically oriented (namely, the liquid crystal molecules 30a positioned at the orientation center) in the cross-section along the direction crossing the boundary between the branch portion 14d and the opening 14a (corresponding to the cross-section taken along line 35A-35A' of FIG. 34) tend to move toward the boundary between the branch portion 14d and the opening 14a as shown in FIGS. 37A and 37B.

Figure 38:
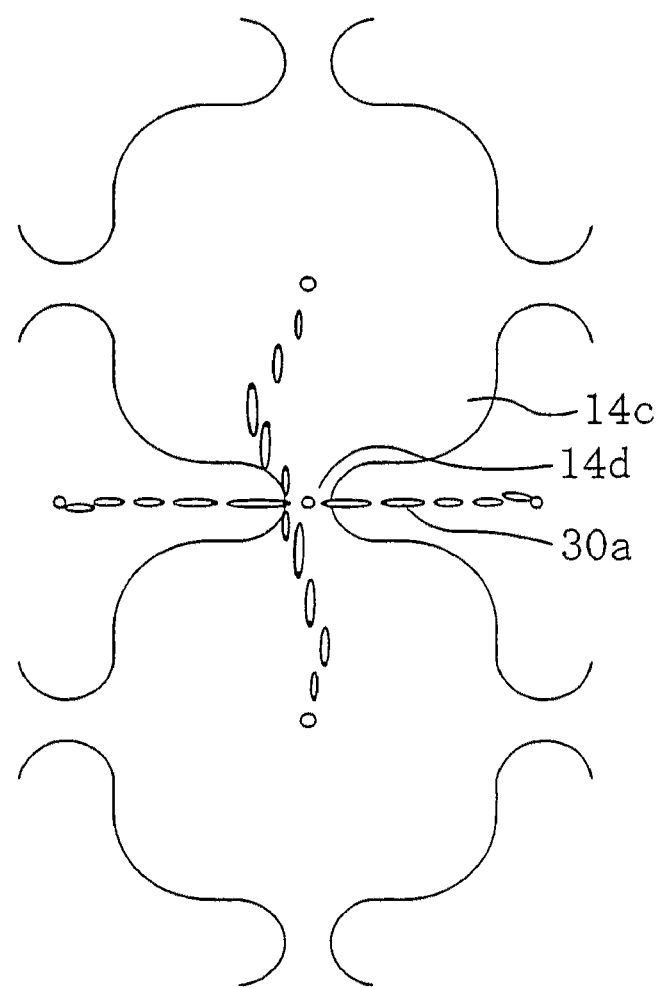
FIG. 38 is a top view for schematically showing an orientation state of liquid crystal molecules under voltage application.

Owing to the influence of such a shift of the orientation of the liquid crystal molecules 30a positioned on the branch portion 14d (namely, the positional shift of the vertically oriented liquid crystal molecules 30a), the spiral orientation of the region of the liquid crystal layer 30 positioned on the island portion 14c is changed from the first stable state shown in FIG. 36 to a second stable state shown in FIG. 38. This affects the response characteristic of the liquid crystal display device, so that it can take comparatively long time to stabilize the orientation to attain the stationary state.

Figure 39:
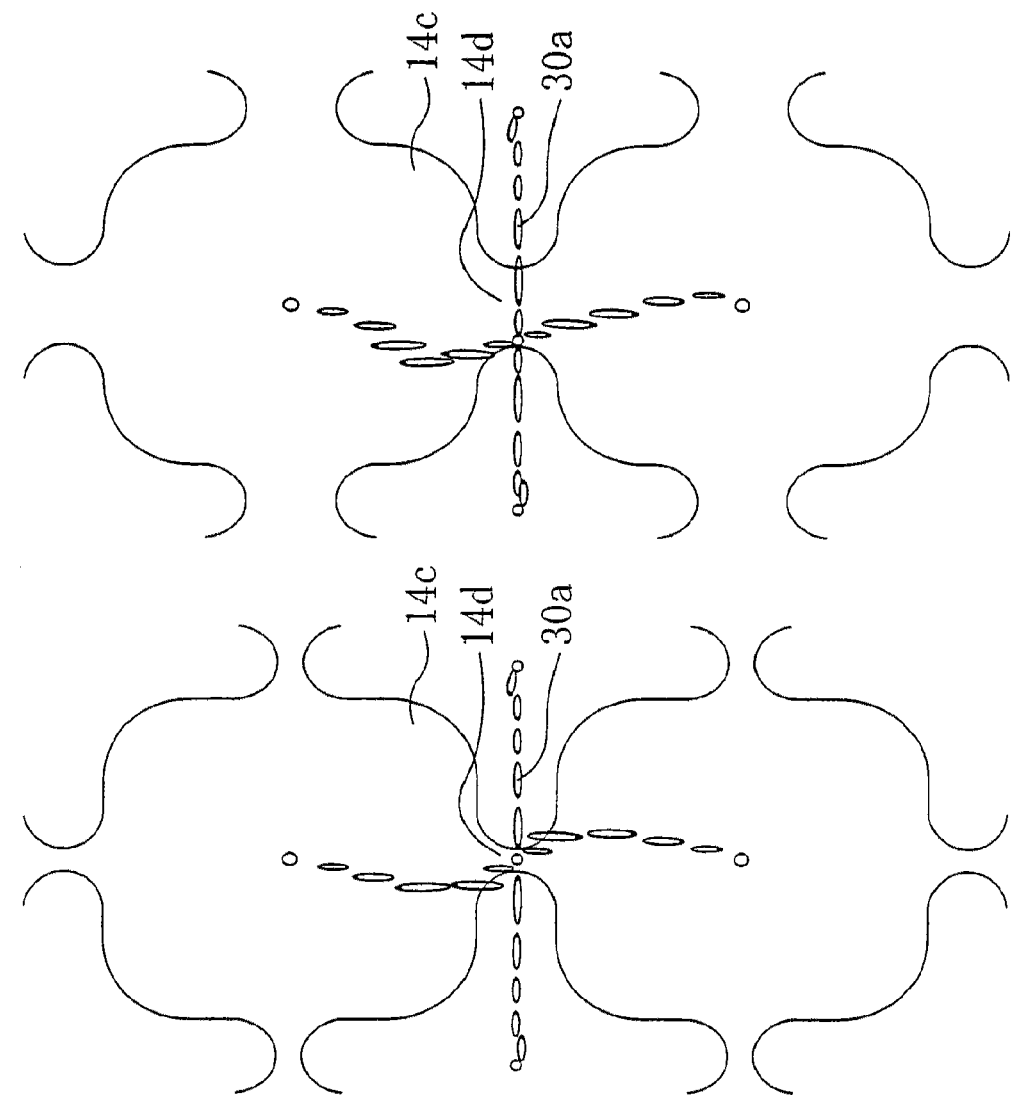
FIGS. 39A and 39B are top views for schematically showing orientation states of liquid crystal molecules under voltage application respectively obtained when a branch portion of a picture element electrode has a comparatively small width and when the branch portion of the picture element electrode has a comparatively large width.

The orientation state of the liquid crystal molecules 30a positioned on the branch portion 14d that affects the response characteristic as described above largely depends upon the presence (number) and the width of the branch portions 14d. When each branch portion 14d has a comparatively large width as shown in FIG. 39B, the balance of the orientation-regulating forces working on the liquid crystal molecules positioned on the branch portion 14d can be easily lost, so as to largely affect the orientation stable state of the liquid crystal molecules 30a positioned on the island portion 14c. In contrast, when each branch portion 14d has a comparatively small width as shown in FIG. 39A, the orientation-regulating forces are well balanced on the liquid crystal molecules 30a positioned on the branch portion 14d, so that the orientation state of the liquid crystal molecules 30a positioned on the island portion 14c can also be stabilized comparatively early, resulting in improving the response characteristic of the liquid crystal display device.

Figure 40:
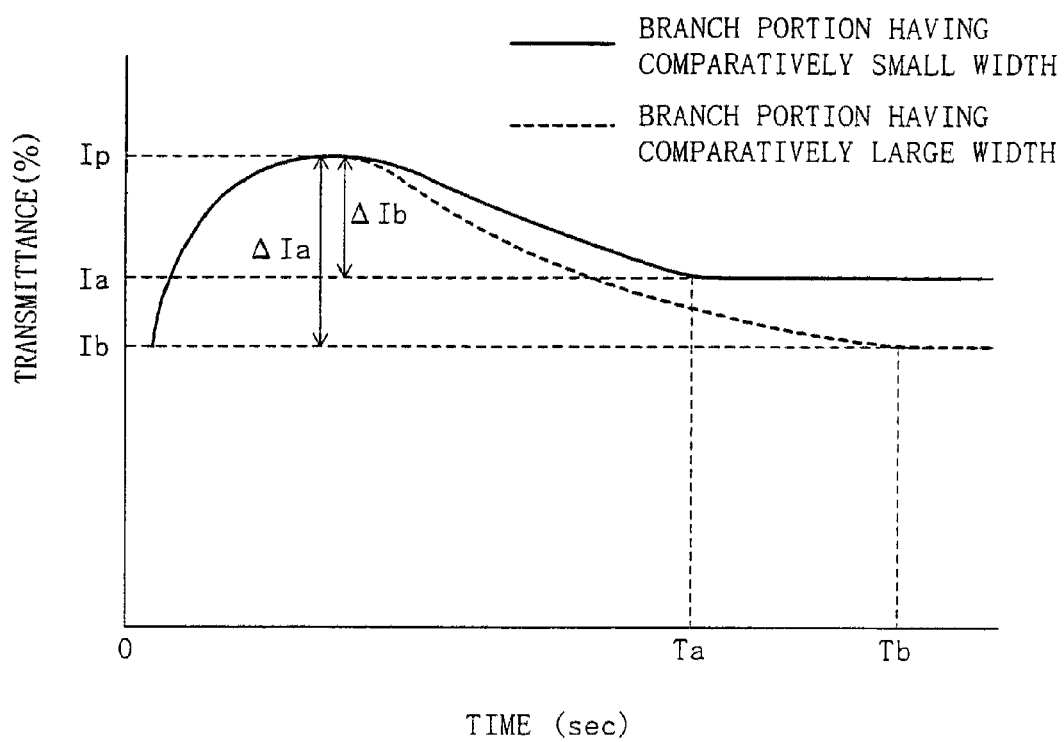
FIG. 40 is a graph for schematically showing change with time of transmittance under application of voltage through a liquid crystal layer obtained when the branch portion has a comparatively small width and when the branch portion has a comparatively large width.

The influence of the width of the branch portion 14d on the response characteristic will be more specifically described with reference to FIG. 40. FIG. 40 is a graph for schematically showing change with time of transmittance attained by applying a voltage through the liquid crystal layer 30 when the branch portion 14d has a comparatively small width (of, for example, 5.5 μm) and when the branch portion 14d has a comparatively large width (of, for example, 7.5 μm). In this case, a pair of polarizing plates are provided so as to have their polarization axes respectively in parallel to the 12 o'clock direction and the 3 o'clock direction.

As described with reference to FIG. 27, in the case where the polarization axis of the polarizing plate is in parallel to the 12 o'clock direction, the transmittance once becomes the maximum (maximum transmittance Ip of FIG. 40)) immediately after the voltage application and becomes substantially constant thereafter. The liquid crystal layer 30 is once placed in the simple radially-inclined orientation state immediately after the voltage application and is changed to the spiral radially-inclined orientation state, and at this point, the orientation passes through the first stable state shown in FIG. 36 and then attains the second stable state shown in FIG. 38.

As shown in FIG. 40, time Ta necessary for attaining the second stable state when the branch portion 14d has a comparatively small width is shorter than time Tb necessary for attaining the second stable state when the branch portion 14d has a comparatively large width (Ta<Tb). Thus, as the branch portion 14d has a smaller width, a better response characteristic can be attained (the response speed is faster).

Also, transmittance Ia attained in the second stable state when the branch portion 14d has a comparatively small width is higher than transmittance Ib attained in the second stable state when the branch portion 14d has a comparatively large width (Ia>Ib).

Figure 41A:
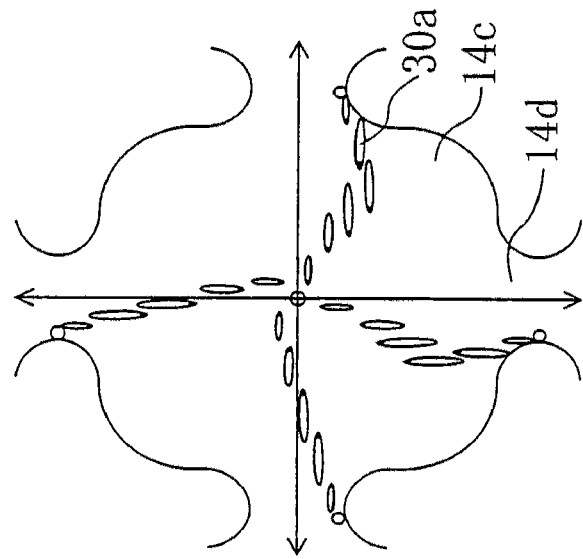
FIGS. 41A and 41B are top views for schematically showing liquid crystal molecules oriented in a direction parallel to a polarization axis in a second stable state respectively obtained when a branch portion 14d has a comparatively small width and when the branch portion 14d has a comparatively large width.
Figure 41B:
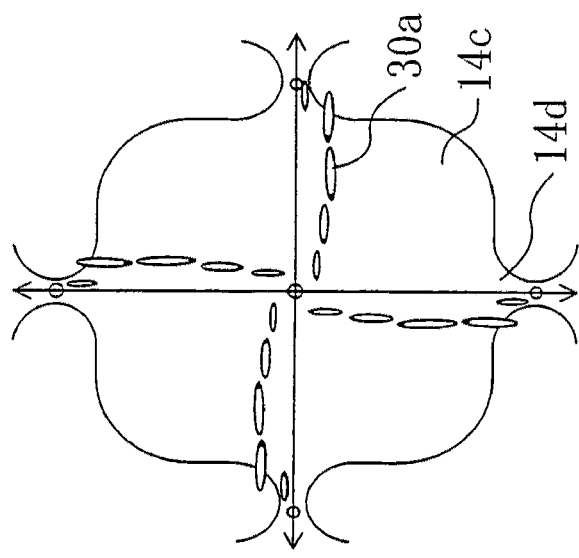

The reason will be described with reference to FIGS. 41A and 41B. FIGS. 41A and 41B are diagrams for schematically showing liquid crystal molecules 30a oriented in a direction parallel to the polarization axes in the second stable state, and specifically, FIG. 41A shows the orientation obtained when the branch portion 14d has a comparatively small width and FIG. 41B shows the orientation obtained when the branch portion 14d has a comparative large width. In FIGS. 41A and 41B, arrows denote the directions of the polarization axes of the pair of polarizing plates, and in this case, the polarization axes of the polarizing plates are respectively in parallel to the 12 o'clock direction and the 3 o'clock direction.

In the case where the polarizing plates are thus arranged, a region where the liquid crystal molecules 30a oriented in the direction parallel to the polarization axes of the polarizing plates exit corresponds to a shade region for transmitting substantially no light.

In the case where the branch portion 14d has a comparatively small width, the liquid crystal molecules 30a oriented in the directions parallel to the polarization axes are present substantially along the 12 o'clock direction, the 3 o'clock direction, the 6 o'clock direction and the 9 o'clock direction as shown in FIG. 41A. Therefore, the shade regions are observed substantially along the polarization axes. In contrast, in the case where the branch portion 14d has a comparatively large width, the liquid crystal molecules 30a oriented in the directions parallel to the polarization axes are present also in positions shifted from the 12 o'clock direction, the 3 o'clock direction, the 6 o'clock direction and the 9 o'clock direction as shown in FIG. 41B. Therefore, the positions where the shade regions are observed are different from those shown in FIG. 41A.

The area of the shade regions is the minimum when they are observed along the polarization axes. Therefore, the area of the shade regions is smaller in the case where the branch portion 14d has a comparatively small width as shown in FIG. 41A than in the case where the branch portion 14d has a comparatively large width as shown in FIG. 41B. Accordingly, the transmittance attained in the second stable state is higher in the case where the branch portion 14d has a comparatively small width.

As described above, the transmittance Ia attained in the second stable state when the branch portion 14d has a comparatively small width is higher than the transmittance Ib attained in the second stable state when the branch portion 14d has a comparatively large width. Therefore, change ÄIa of the transmittance between immediately after the voltage application and the second stable state obtained when the branch portion 14d has a comparatively small width is smaller than change ÄIb of the transmittance between immediately after the voltage application and the second stable state obtained when the branch portion 14d has a comparatively large width (ÄIa<ÄIb). Accordingly, the white tailing phenomenon as shown in FIG. 23 is less observed when the branch portion 14d has a comparatively small width than when the branch portion 14d has a comparatively large width, and hence, a good response characteristic can be attained.

As described above, as each branch portion 14d has a smaller width, the response characteristic is further improved. Also by comparatively reducing the number of branch portions 14d, the response characteristic can be improved.

Figure 42:
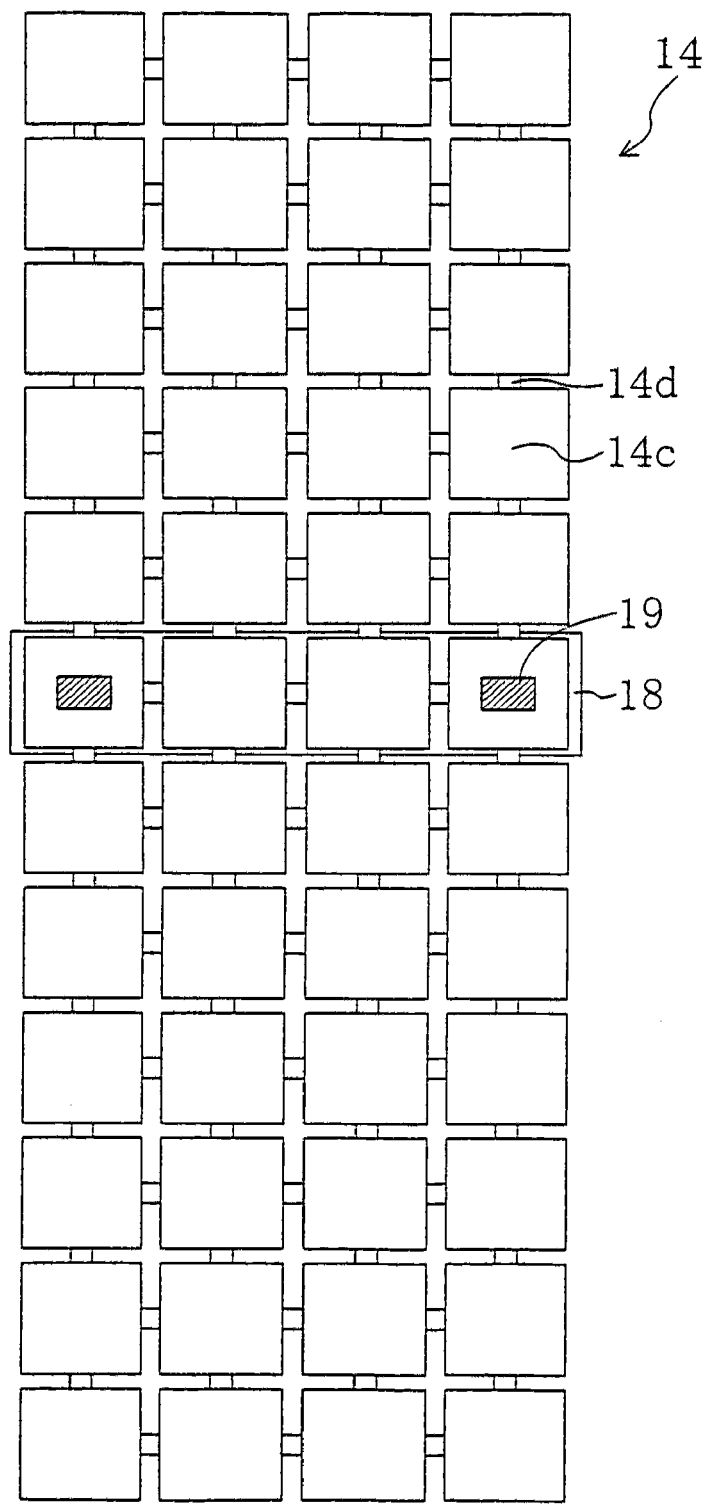
FIG. 42 is a top view for schematically showing a picture element electrode usable in a liquid crystal display device according to an embodiment of the invention.

In the picture element electrode 14 of the liquid crystal display device of this invention, all the adjacent pairs of island portions 14c may be mutually connected by the branch portions 14d as shown in FIG. 42. However, the response characteristic can be improved by appropriately omitting the branch portions 14d. The picture element electrode 14 is connected to a switching element, for example, through a contact hole 19 formed in a shade region 18 of FIG. 42, and the respective island portions 14c are mutually electrically connected through the branch portions 14d so as to function as substantially one conducting film. The shade region 18 corresponds to, for example, a region on a storage capacitance line on the TFT substrate and is a region which light from a backlight does not pass through and makes no contribution to the display.

Figure 43:
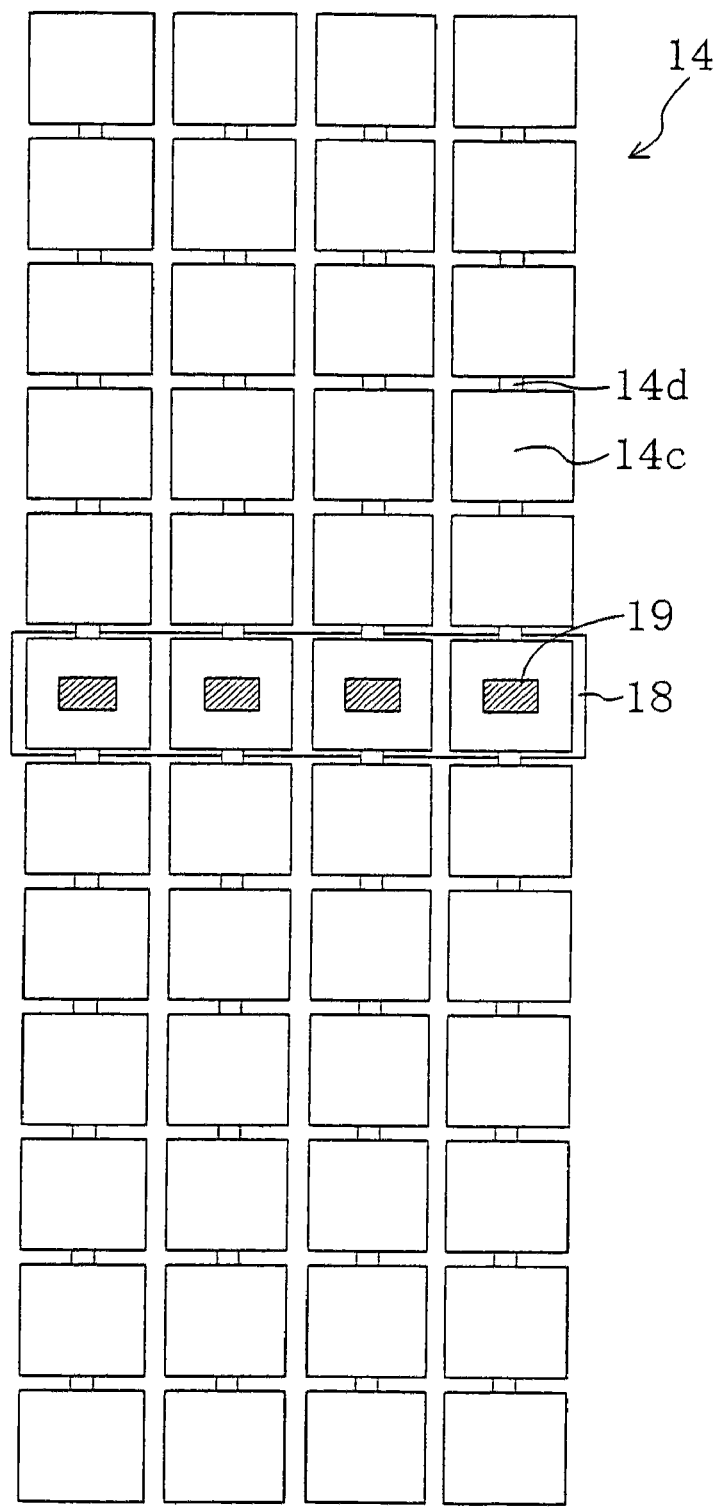
FIG. 43 is a top view for schematically showing another picture element electrode usable in the liquid crystal display device according to the embodiment of the invention.
Figure 44:
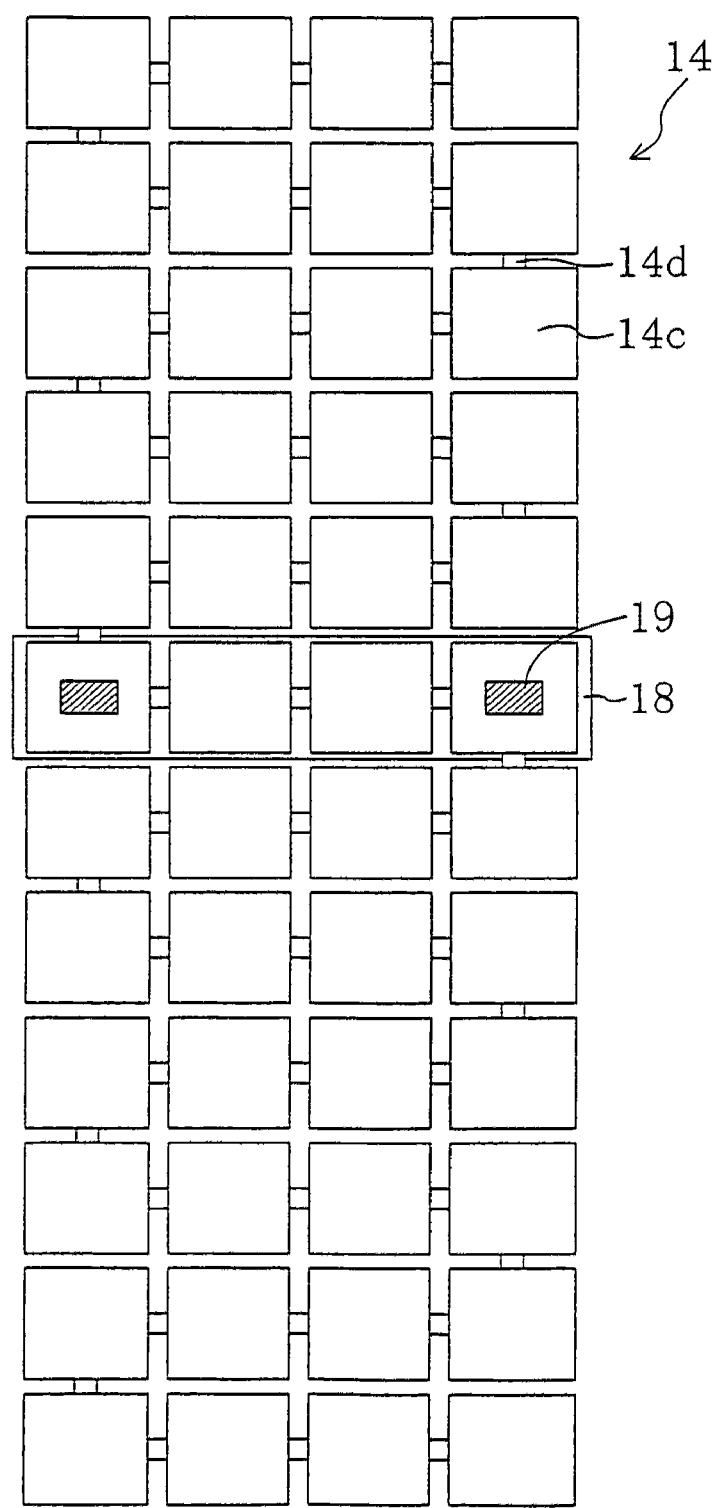
FIG. 44 is a top view for schematically showing still another picture element electrode usable in the liquid crystal display device according to the embodiment of the invention.

Specifically, when the number of branch portions 14d provided to each island portion 14c is, for example, two or less as shown in FIGS. 43 and 44, a good response characteristic can be attained.

Figure 45:
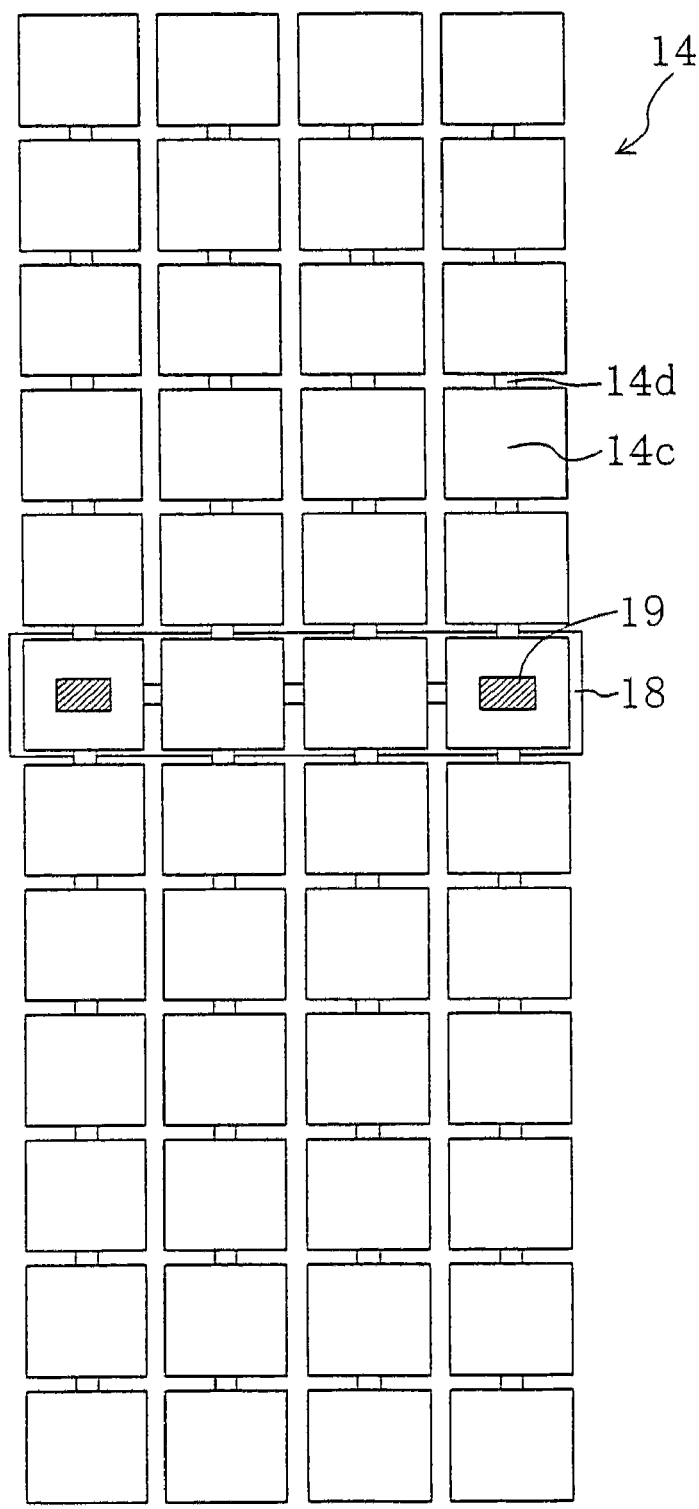
FIG. 45 is a top view for schematically showing still another picture element electrode usable in the liquid crystal display device according to the embodiment of the invention.
Figure 46:
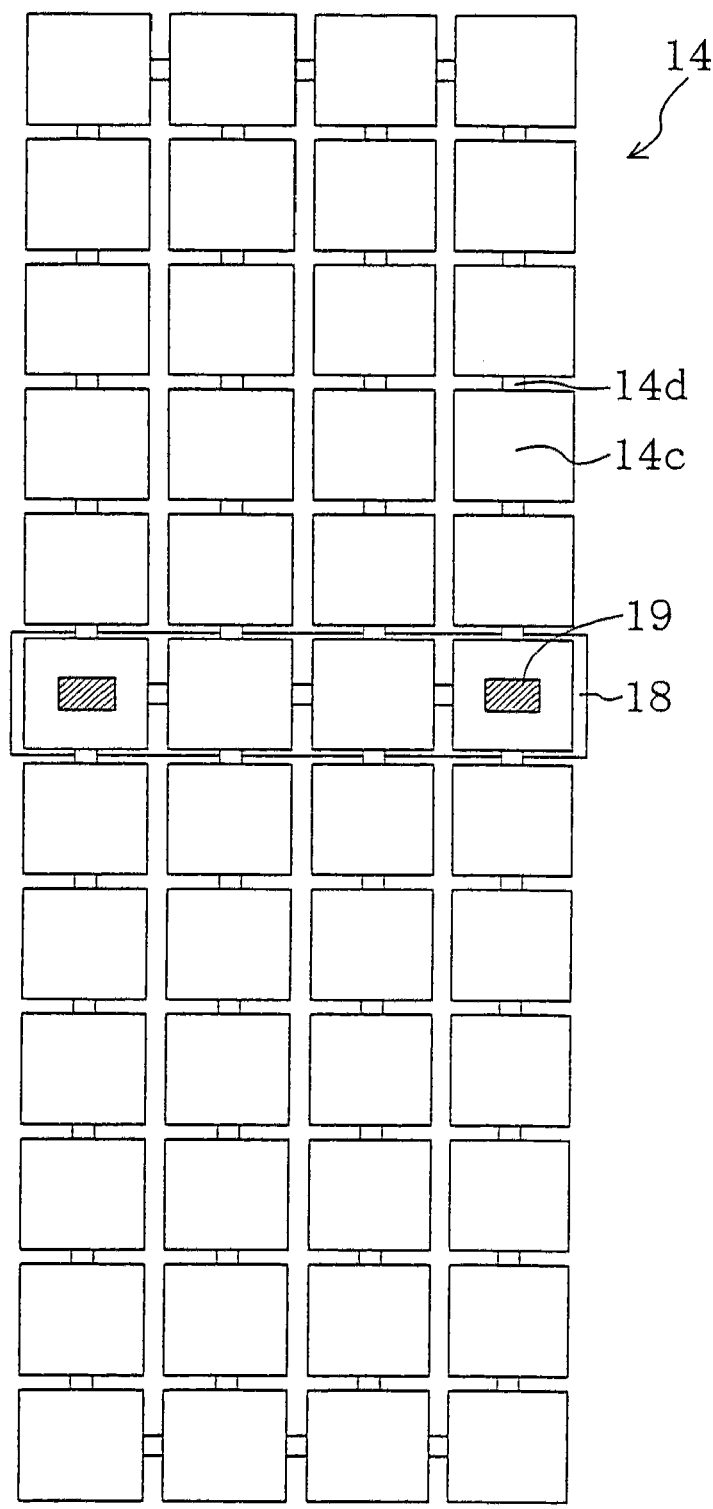
FIG. 46 is a top view for schematically showing still another picture element electrode usable in the liquid crystal display device according to the embodiment of the invention.

A branch portion 14d positioned in a region making no contribution to the display such as the shade region 18 minimally affects the response characteristic. Therefore, as shown in FIG. 45, the number of branch portions 14d provided to each island portion 14c in a region making contribution to the display may be two or less Needless to say, the structure of the solid portion 14b is not limited to those described above. When the branch portions 14d are partly omitted as compared with the structure of FIG. 42 and the island portions 14c have redundancy as shown in FIG. 46, a liquid crystal display device having a good response characteristic that can be fabricated at a high ratio of acceptable products can be obtained.

When the number of branch portions 14d is reduced as compared with the case where all the adjacent pairs of island portions 14c are connected through the branch portions 14d as shown in FIG. 42, the response characteristic can be improved. The number of branch portions 14d, namely, how many branch portions 14d are omitted, can be determined in accordance with a desired response characteristic.

For example, in the case where the plural island portions 14c are arranged in the form of an m×n matrix (wherein m and n are natural numbers of 2 or more), if all the adjacent island portions 14c are connected through the branch portions 14d, the number of branch portions 14d is (2mn−m−n). Accordingly, in the case where the island portions 14c are arranged in the form of the m×n matrix, the response characteristic can be improved when the number of branch portions is smaller than (2mn−m−n).

When the width and the number of branch portions 14d are optimized as described above, a good response characteristic can be attained.

The application of the invention is not limited to the exemplified liquid crystal display devices. When one of a pair of electrodes for applying a voltage through a liquid crystal layer in a picture element region is formed to have a plurality of openings disposed at least at the corners of the picture element region and a solid portion, a liquid crystal display device with a wide viewing angle characteristic can be realized. When the electrode is formed in the aforementioned manner, inclined electric fields are generated at the edge portions of the openings of the electrode when a voltage is applied. Accordingly, owing to the inclined electric fields generated at the edge portions of the plural openings disposed at least at the corners, liquid crystal domains that are in the radially-inclined orientation state are formed in the liquid crystal layer under voltage application, resulting in obtaining a wide viewing angle characteristic.

A unit solid portion (a region of the solid portion substantially surrounded with the openings) present in a given picture element region may be plural in number or a single unit solid portion surrounded with the openings disposed at the corners. In the case where the unit solid portion present in a given picture element region is single, the openings surrounding the unit solid portion may be a plurality of openings disposed at the corners or a substantially single opening continuously formed from a plurality of openings disposed at the corners.

When the region of the solid portion substantially surrounded with the openings (unit solid portion) is rotationally symmetrical, the stability of the radially-inclined orientation of the liquid crystal domain formed in the solid portion can be improved. For example, the unit solid portion may be in the shape of a substantially circle, a substantially square or a substantially rectangle.

When the unit solid portion is in a substantially circular shape, the radially-inclined orientation of the liquid crystal domain formed in the solid portion of the electrode can be stabilized. Since a liquid crystal domain formed in the solid portion made from a continuous conducting film is formed correspondingly to the unit solid portion, the shape and the arrangement of the openings are determined so that the unit solid portion can be in the substantially circular shape. Also, when the unit solid portion is in a substantially rectangular shape with substantially arc-shaped corners, the orientation stability and the transmittance (effective aperture ratio) can be comparatively increased.

According to the present invention, the liquid crystal domains having the radially-inclined orientation formed correspondingly to the openings formed in the picture element electrode can also make contribution to the display, and hence, the display quality of a conventional liquid crystal display device with a wide viewing angle characteristic can be further improved.

Moreover, when a protrusion is formed within the opening of the picture element electrode, the stability of the radially-inclined orientation is improved. Accordingly, it is possible to provide a liquid crystal display device with high reliability in which even when the radially-inclined orientation is destroyed by an external force, the radially-inclined orientation can be easily restored.

What is claimed is:
1. A liquid crystal display device comprising:
a first substrate;
a second substrate;
a vertical alignment type liquid crystal layer disposed between the first substrate and the second substrate; and
a plurality of picture element regions each defined by a first electrode provided on a face of the first substrate facing the liquid crystal layer and a second electrode provided on the second substrate so as to oppose the first electrode via the liquid crystal layer sandwiched therebetween,
wherein the first electrode includes a solid portion formed from a conducting film and a nonsolid portion not including a conducting film, in each of the plurality of picture element regions,
a pair of polarizing plates respectively provided outside of the first substrate and the second substrate and disposed with polarization axes thereof crossing each other substantially perpendicularly,
the polarization axis of one of the polarizing plates is substantially parallel to a direction in which the solid portion extends, and
when a voltage is applied between the first electrode and the second electrode, in each of the plurality of picture element regions, liquid crystal molecules of the liquid crystal layer are in a radially-inclined orientation state.
2. The liquid crystal display device of claim 1, wherein the solid portion includes an island portion and at least one branch portion extending from the island portion.
3. The liquid crystal display device of claim 2, wherein the island portion is substantially surrounded with the nonsolid portion.
4. The liquid crystal display device of claim 2, wherein the island portion is in a rotationally symmetrical shape.
5. The liquid crystal display device of claim 2, wherein the island portion is in a substantially cross-shape.
6. The liquid crystal display device of claim 2, wherein the at least one branch portion includes a branch portion extending in a direction crossing the polarization axis of one of the polarizing plates.
7. The liquid crystal display device of claim 2, wherein, when a voltage is applied between the first electrode and the second electrode, a region of the liquid crystal layer positioned on the nonsolid portion includes liquid crystal molecules oriented substantially parallel to a direction in which the nonsolid portion extends.

* * * * *